(12) United States Patent
Jang et al.

(10) Patent No.: US 10,803,862 B2
(45) Date of Patent: Oct. 13, 2020

(54) ELECTRONIC DEVICE AND METHOD FOR PROCESSING USER SPEECH

(71) Applicant: Samsung Electronics Co., Ltd., Gyeonggi-do (KR)

(72) Inventors: Dong-Ho Jang, Gyeonggi-do (KR);
Ga-Jin Song, Gyeonggi-do (KR);
Kyung-Tae Kim, Gyeonggi-do (KR);
Kyu-Young Kim, Gyeonggi-do (KR);
Yong Joon Jeon, Gyeonggi-do (KR);
Min-Sung Kim, Gyeonggi-do (KR);
Jin-Woong Kim, Gyeonggi-do (KR);
Kwang-Bin Lee, Gyeonggi-do (KR);
Ji-Young Lee, Gyeonggi-do (KR);
Jae-Choon Jun, Gyeonggi-do (KR);
Ho-Jun Jaygarl, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 71 days.

(21) Appl. No.: 15/957,452

(22) Filed: Apr. 19, 2018

(65) Prior Publication Data
US 2018/0308480 A1 Oct. 25, 2018

(30) Foreign Application Priority Data
Apr. 19, 2017 (KR) .......................... 10-2017-0050648

(51) Int. Cl.
*G10L 15/22* (2006.01)
*G06F 3/0484* (2013.01)
(Continued)

(52) U.S. Cl.
CPC ............ *G10L 15/22* (2013.01); *G06F 3/0484* (2013.01); *G06F 3/04883* (2013.01);
(Continued)

(58) Field of Classification Search
CPC ...... G10L 15/22; G10L 15/30; G10L 15/1815; G10L 2015/223; G06F 3/0484; G06F 3/04883; G06F 3/167; G06F 3/04886
See application file for complete search history.

(56) References Cited

U.S. PATENT DOCUMENTS

| 5,481,710 A | 1/1996 | Keane et al. |
| 9,570,086 B1 * | 2/2017 | Sanders .................. G10L 15/22 |

(Continued)

FOREIGN PATENT DOCUMENTS

| KR | 1020140103634 | 8/2014 |
| KR | 10-1464833 | 11/2014 |

(Continued)

OTHER PUBLICATIONS

International Search Report dated Jun. 22, 2018 issued in counterpart application No. PCT/KR2018/003048, 11 pages.
(Continued)

*Primary Examiner* — Sonia L Gay
(74) *Attorney, Agent, or Firm* — The Farrell Law Firm, P.C.

(57) ABSTRACT

An electronic device and method are provided for processing user speech. The electronic device includes a housing, a touchscreen display disposed in the housing and exposed through a first portion of the housing, a microphone disposed in the housing and exposed through a second portion of the housing, at least one speaker disposed in the housing and exposed through a third portion of the housing, a wireless communication circuit disposed in the housing, at least one processor disposed in the housing and electrically connected with the touchscreen display, the microphone, the speaker, and the wireless communication circuit, and a memory disposed in the housing and electrically connected with the processor, wherein the memory stores instructions executed to enable the at least one processor to receive a first user
(Continued)

input through the touchscreen display or the microphone, the first user input including a request to perform tasks using the electronic device, send data associated with the first user input through the wireless communication circuit to an external server, receive a response from the external server through the wireless communication circuit, the response including information about a plurality of states of the electronic device to perform the tasks in an order, perform the tasks by causing the electronic device to have the plurality of states having the order after receiving the response, receive a second user input through the touchscreen display or the microphone, the second user input including a request to cancel at least one of the performed tasks, and cause the electronic device to return to one of the plurality of states, based on the second user input.

21 Claims, 48 Drawing Sheets

(51) Int. Cl.
  *G06F 3/16* (2006.01)
  *G10L 15/30* (2013.01)
  *G06F 3/0488* (2013.01)
  *G10L 15/18* (2013.01)
(52) U.S. Cl.
  CPC .......... *G06F 3/04886* (2013.01); *G06F 3/167* (2013.01); *G10L 15/30* (2013.01); *G10L 15/1815* (2013.01); *G10L 2015/223* (2013.01)

(56) References Cited

U.S. PATENT DOCUMENTS

| | | |
|---|---|---|
| 2009/0030696 A1 | 1/2009 | Cerra et al. |
| 2011/0184730 A1 | 7/2011 | LeBeau et al. |
| 2012/0303368 A1 | 11/2012 | Ma |
| 2014/0047253 A1* | 2/2014 | Kim .................. H04L 65/607 713/320 |
| 2014/0237367 A1 | 8/2014 | Jung et al. |
| 2014/0285452 A1* | 9/2014 | Park .................. G06F 3/041 345/173 |
| 2014/0343950 A1* | 11/2014 | Simpson ............ G06F 3/167 704/275 |
| 2016/0351190 A1 | 12/2016 | Piernot et al. |
| 2017/0358305 A1* | 12/2017 | Kudurshian ........... G10L 13/02 |

FOREIGN PATENT DOCUMENTS

| | | |
|---|---|---|
| KR | 10-1584887 | 1/2016 |
| WO | WO 2016-111881 | 7/2016 |

OTHER PUBLICATIONS

European Search Report dated Mar. 26, 2020 issued in counterpart application No. 18788239.4-1203, 7 pages.

\* cited by examiner

| User speech sample | Task name | Application name | Task description | Intent | Corresponding cancellation task | Order | Application name | State ID | Whether temporary arrival state or not | State description |
|---|---|---|---|---|---|---|---|---|---|---|
| Turn ON notification of baseball club room | Message-Search-Result-Conversation view-Notification control -On | Messages | Turn On notification of baseball club room | Messages_103 | Messages_104 | 1 | Messages | Conversation Tab | | Start Message |
| | | | | | | 2 | Messages | Search | TRUE | Search Message |
| | | | | | | 3 | Messages | Search Result | TRUE | Show Search Result |
| | | | | | | 4 | Messages | Conversation View | TRUE | Conversation View |
| | | | | | | 5 | Messages | Drawer | TRUE | Drawer |
| | | | | | | 6 | Messages | Drawer Notification Control On | | Set Notification on |

FIG.38A

| User speech sample | Task name | Application name | Task description | Intent | Corresponding cancellation task | Order | Application name | State ID | Whether temporary arrival state or not | State description |
|---|---|---|---|---|---|---|---|---|---|---|
| Turn OFF notification of baseball club room | Message-Search-Result-Conversation view-Notification control-Off | Messages | Turn OFF notification of baseball club room | Messages_104 | Messages_103 | 1 | Messages | Conversation Tab | | Start Message |
| | | | | | | 2 | Messages | Search | TRUE | Search Message |
| | | | | | | 3 | Messages | Search Result | TRUE | Show Search Result |
| | | | | | | 4 | Messages | Conversation View | TRUE | Conversation View |
| | | | | | | 5 | Messages | Drawer | TRUE | Drawer |
| | | | | | | 6 | Messages | Drawer Notification Control Off | | Set Notification off |

| User speech sample | Task name | Application name | Task description | Intent | Corresponding cancellation task | Order | Application name | State ID | Whether temporary arrival state or not | State description |
|---|---|---|---|---|---|---|---|---|---|---|
| Notification setting of baseball club room | Message-Search-Result-Conversation view-Notification control | Messages | Show Notification setting of baseball club room | Messages_105 | | 1 | Messages | Conversation Tab | FALSE | Start Message |
| | | | | | | 2 | Messages | Search | TRUE | Search Message |
| | | | | | | 3 | Messages | Search Result | TRUE | Show Search Result |
| | | | | | | 4 | Messages | Conversation View | TRUE | Conversation View |
| | | | | | | 5 | Messages | Drawer | TRUE | Drawer |
| | | | | | | 6 | Messages | Drawer Notification Control Off | | Set Notification Control Setting |

ELECTRONIC DEVICE AND METHOD FOR PROCESSING USER SPEECH

PRIORITY

This application claims priority under 35 U.S.C. § 119(a) to Korean Patent Application Serial No. 10-2017-0050648, which was filed in the Korean Intellectual Property Office on Apr. 19, 2017, the entire disclosure of which is incorporated herein by reference.

BACKGROUND

1. Field of the Disclosure

The present disclosure relates generally to an electronic device and method for processing user speech.

2. Description of the Related Art

Current technologies are available for an electronic device to receive a user's voice through a voice recognition service or interface in order to provide various content or performing particular functions. Linguistic understanding is technology for recognizing and applying/processing language or text, which includes natural language processing, machine translation, dialog system, answering inquiries, and speech recognition/synthesis.

Automatic speech recognition (ASR) may receive user speech, extract acoustic feature vectors from the speech, and generate text corresponding to the received speech based on the feature vectors. ASR allows an electronic device to receive natural language inputs from the user. Herein, natural language refers to commonly used language, e.g., conversational language, as opposed to predefined voice commands.

Often, natural language cannot directly be understood by machines without separate analysis. Generally, natural language understanding (NLU) in speech recognition systems is classified into 1) a method for understanding voice language through semantic-stage grammar that is manually established, and 2) a method for understanding language by defining word strings as semantic structures, based on a language model generated by statistical methods.

Accordingly, electronic devices may provide various forms of speech-based services to users through speech recognition and natural language processing.

For example, an electronic device may identify and execute a command, such as a task or an action, as a result of NLU processing on user speech. The electronic device may perform the task included in the command. However, when an identified command corresponding to the user speech is different from a command that a user intends, the electronic device may not operate as the user desires. Further, when a plurality of tasks are performed based on the user speech, multiple unintended tasks may be performed.

SUMMARY

Accordingly, the present disclosure is made to address at least the problems and/or disadvantages described above and to provide at least the advantages described below. According to an aspect of the present disclosure, an electronic device may cancel at least one of a plurality of tasks previously-performed corresponding to user speech.

According to another aspect of the present disclosure, a task corresponding to user speech may be determined based on relevance to a task previously performed corresponding to previously received user speech.

In accordance with an aspect of the present disclosure, an electronic device is provided, which includes a housing, a touchscreen display disposed in the housing and exposed through a first portion of the housing, a microphone disposed in the housing and exposed through a second portion of the housing, at least one speaker disposed in the housing and exposed through a third portion of the housing, a wireless communication circuit disposed in the housing, at least one processor disposed in the housing and electrically connected with the touchscreen display, the microphone, the speaker, and the wireless communication circuit, and a memory disposed in the housing and electrically connected with the processor, wherein the memory stores instructions executed to enable the at least one processor to receive a first user input through the touchscreen display or the microphone, the first user input including a request to perform tasks using the electronic device, send data associated with the first user input through the wireless communication circuit to an external server, receive a response from the external server through the wireless communication circuit, the response including information about a plurality of states of the electronic device to perform the tasks in an order, perform the tasks by causing the electronic device to have the plurality of states having the order after receiving the response, receive a second user input through the touchscreen display or the microphone, the second user input including a request to cancel at least one of the performed tasks, and cause the electronic device to return to one of the plurality of states, based on the second user input.

In accordance with another aspect of the present disclosure, an electronic device is provided, which includes a housing, a touchscreen display disposed in the housing and exposed through a first portion of the housing, a microphone disposed in the housing and exposed through a second portion of the housing, at least one speaker disposed in the housing and exposed through a third portion of the housing, a wireless communication circuit disposed in the housing, at least one processor disposed in the housing and electrically connected with the touchscreen display, the microphone, the speaker, and the wireless communication circuit, and a memory disposed in the housing and electrically connected with the processor, wherein the memory stores instructions executed to enable the at least one processor to receive a first user input through the touchscreen display or the microphone, the first user input including a request for the electronic device to perform a first task, send first data associated with the first user input through the wireless communication circuit to an external server, receive a first response from the external server through the wireless communication circuit, the first response including first information about a plurality of first states having an order for the electronic device to perform the first task, perform the first task by causing the electronic device to have the plurality of first states having the order after receiving the first response, receive a second user input through the touchscreen display or the microphone, the second user input including a second request for the electronic device to perform a second task, and send second data associated with the second user input, along with at least part of the first information, to the external server, through the wireless communication circuit.

In accordance with another aspect of the present disclosure, an electronic device is provided, which includes a housing, a touchscreen display disposed in the housing and exposed through a first portion of the housing, a microphone disposed in the housing and exposed through a second portion of the housing, at least one speaker disposed in the housing and exposed through a third portion of the housing, a wireless communication circuit disposed in the housing, at least one processor disposed in the housing and electrically connected with the touchscreen display, the microphone, the speaker, and the wireless communication circuit, and a memory disposed in the housing and electrically connected with the processor, wherein the memory stores instructions executed to enable the at least one processor to control the touchscreen display to display a first screen, obtain first user speech through the microphone while displaying the first screen, control the touchscreen display to display a second screen associated with a first task of a plurality of tasks corresponding to the first user speech instead of the first screen, control the touchscreen display to display a third screen associated with a second task of the plurality of tasks corresponding to the first user speech, instead of the second screen, obtain a cancellation command to cancel at least one of the plurality of tasks, while displaying the third screen, select the first screen or the second screen using a result of analyzing the cancellation command, and control the touchscreen display to display the selected screen.

In accordance with another aspect of the present disclosure, an electronic device is provided, which includes a housing, a touchscreen display disposed in the housing and exposed through a first portion of the housing, a microphone disposed in the housing and exposed through a second portion of the housing, at least one speaker disposed in the housing and exposed through a third portion of the housing, a wireless communication circuit disposed in the housing, at least one processor disposed in the housing and electrically connected with the touchscreen display, the microphone, the speaker, and the wireless communication circuit, and a memory disposed in the housing and electrically connected with the processor, wherein the memory stores instructions executed to enable the at least one processor to control the touchscreen display to display a first screen, obtain first user speech through the microphone while displaying the first screen, control the touchscreen display to display a third screen associated with a last task of a plurality of tasks corresponding to the first user speech, instead of the first screen, obtain a cancellation command to cancel at least one of the plurality of tasks, while displaying the third screen, select the first screen or a second screen associated with a task prior in order to the last task among the plurality of tasks, based on a result of analyzing the cancellation command, and control the touchscreen display to display the selected screen.

BRIEF DESCRIPTION OF THE DRAWINGS

The above and other aspects, features, and advantages of certain embodiments of the present invention will be more apparent from the following detailed description taken in conjunction with the accompanying drawings, in which:

FIGS. 38A to 38C illustrate tables for storing and managing data associated with user speech processing according to an embodiment of the present disclosure.

DETAILED DESCRIPTION

Figure 1:
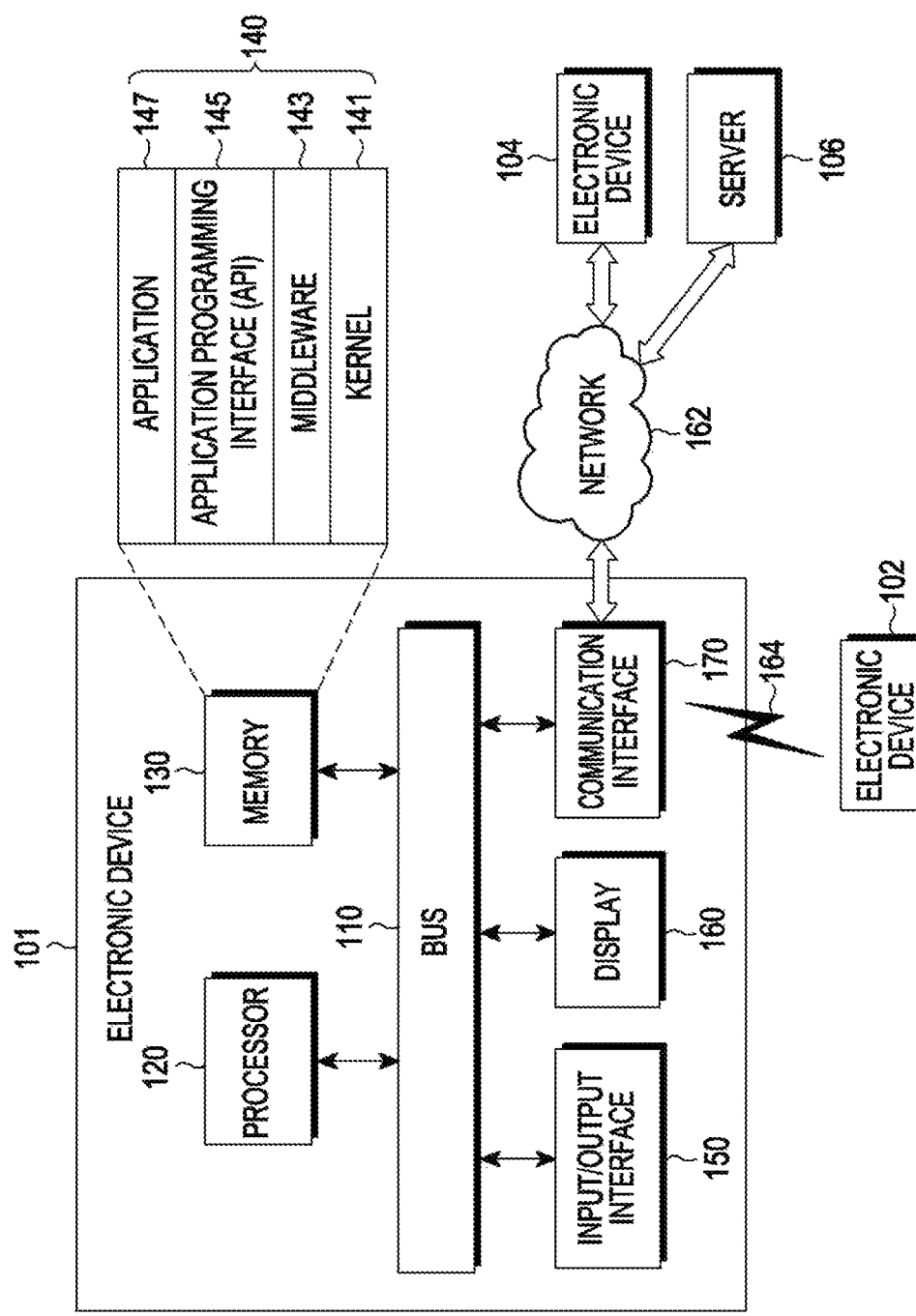
FIG. 1 illustrates an electronic device and a network according to an embodiment of the present disclosure.

Hereinafter, various embodiments of the present disclosure are described with reference to the accompanying drawings. However, the present disclosure is not limited to these described embodiments and/or the terminology used herein, and all changes and/or equivalents or replacements thereto fall within the scope of the present disclosure. The same or similar reference denotations may be used to refer to the same or similar elements throughout the specification and the drawings.

Singular forms, such as "a," "an," and "the," include plural references unless the context clearly dictates otherwise.

The terms "A or B" or "at least one of A and/or B" may include all possible combinations of A and B.

Numerical terms, such as "first" and "second," may modify various components regardless of importance and/or order and may be used to distinguish component from each other without limiting the components. For example, when an element (e.g., a first element) is referred to as being (operatively or communicatively) "coupled with/to," or "connected with/to" another element (e.g., a second element), the first element may be directly coupled or connected with/to the second element, or may be indirectly coupled or connected with/to the second element, e.g., via a third element.

The term "configured to" may be interchangeably used with other terms, such as "suitable for," "capable of," "modified to," "made to," "adapted to," "able to," and "designed to." Further, the term "configured to" may indicate that a device can perform an operation together with another device or parts. For example, "a processor configured (or set) to perform A, B, and C" may indicate a generic-purpose processor (e.g., a central processing unit (CPU) or an application processor (AP)) that may perform operations A, B, and C by executing one or more software programs stored in a memory device, or may indicate a dedicated processor (e.g., an embedded processor) for performing the operations.

Examples of an electronic device according to an embodiment of the present disclosure may include a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a medical device, a camera, and a wearable device. The wearable device may include an accessory-type device (e.g., a watch, a ring, a bracelet, an anklet, a necklace, glasses, contact lenses, or a head-mounted device (HMD)), a fabric or clothes integrated device (e.g., electronic clothes), a body attaching-type device (e.g., a skin pad or a tattoo), or a body implantable device.

The medical device may include a portable medical measuring device (e.g., a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device.

Further, an electronic device may include a smart home appliance, such as a television (TV), a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™ or PlayStation™), an electronic dictionary, an electronic key, a camcorder, or an electronic picture frame.

Additionally, an electronic device may include a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, a security device, a vehicular head unit, an industrial or home robot, a drone, an automatic teller machine (ATM), a point of sale (POS) device, or an Internet of things (IoT) device (e.g., a light bulb, various sensors, a sprinkler, a fire alarm, a thermostat, a street light, a toaster, fitness equipment, a hot water tank, a heater, or a boiler).

Further, an electronic device may be at least one of part of a piece of furniture, building/structure or vehicle, an electronic board, an electronic signature receiving device, a projector, or various measurement devices (e.g., devices for measuring water, electricity, gas, or electromagnetic waves).

An electronic device may also be a flexible device.

Further, an electronic device may be a combination of the above-described devices.

Herein, the term "user" may refer to a human or another device (e.g., an artificial intelligence electronic device) using an electronic device.

FIG. 1 illustrates an electronic device and a network according to an embodiment of the present disclosure.

Referring to FIG. 1, an electronic device 101 is included in a network environment. The electronic device 101 includes a bus 110, a processor 120, a memory 130, an input/output interface 150, a display 160, and a communication interface 170. Alternatively, the electronic device 101 may exclude at least one of the components or may add another component.

The bus 110 may include a circuit for connecting the components 110 to 170 with one another and transferring communications (e.g., control messages or data) between the components. The processor 120 may include one or more of a CPU, an AP, or a communication processor (CP). The processor 120 may control at least one of the other components of the electronic device 101 or perform an operation or data processing relating to communication.

The memory 130 may include a volatile and/or non-volatile memory. For example, the memory 130 may store commands or data related to at least one other component of, e.g., the electronic device 101. The memory 130 may store software and/or a program 140. The program 140 includes a kernel 141, middleware 143, an application programming interface (API) 145, and an application program (or "application") 147. At least a portion of the kernel 141, middleware 143, or API 145 may be referred to as an operating system (OS). The kernel 141 may control or manage system resources (e.g., the bus 110, processor 120, or a memory 130) used to perform operations or functions implemented in other programs (e.g., the middleware 143, API 145, or application 147). The kernel 141 may provide an interface for the middleware 143, the API 145, or the application 147 to access individual components of the electronic device 101 to control or manage the system resources.

The middleware 143 may function as a relay for the API 145 or the application 147 to communicate data with the kernel 141. Further, the middleware 143 may process one or more task requests received from the application 147 in order of priority. For example, the middleware 143 may assign a priority of using system resources (e.g., bus 110, processor 120, or memory 130) of the electronic device 101 to at least one of the application programs 147 and process one or more task requests.

The API 145 allows the application 147 to control functions provided from the kernel 141 or the middleware 143. The API 133 may include an interface or function (e.g., a command) for filing control, window control, image processing or text control.

The input/output interface 150 may transfer commands or data input from the user or other external device to other component(s) of the electronic device 101 or may output commands or data received from other component(s) of the electronic device 101 to the user or other external devices.

The display 160 may include a liquid crystal display (LCD), a light emitting diode (LED) display, an organic light emitting diode (OLED) display, a microelectromechanical systems (MEMS) display, or an electronic paper display. The display 160 may display, various content (e.g., text, images, videos, icons, and/or symbols) to the user. The display 160 may include a touchscreen and may receive a touch, gesture, proximity, or hovering input using an electronic pen or a body part of the user.

The communication interface 170 may set up communication between the electronic device 101 and a first electronic device 102, a second electronic device 104, and/or a server 106. The communication interface 170 may be connected with the network 162 through wireless or wired communication to communicate with the second external electronic device 104 or the server 106.

The wireless communication may include cellular communication based on long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). The wireless communication may include wireless fidelity (Wi-Fi), bluetooth, bluetooth low power (BLE), zigbee, near field communication (NFC), magnetic secure transmission (MST), radio frequency, or body area network (BAN). The wireless communication may also include global navigation satellite system (GNSS), such as global positioning system (GPS), global navigation satellite system (Glonass), BeiDou navigation satellite system (BeiDou) or Galileo, or the European global satellite-based navigation system. Hereinafter, the terms "GPS" and "GNSS" may be used interchangeably.

The wired connection may include universal serial bus (USB), high definition multimedia interface (HDMI), recommended standard (RS)-232, power line communication (PLC), or plain old telephone service (POTS).

The network 162 may include a telecommunication network, such as a computer network (e.g., a local area network (LAN) or a wide area network (WAN)), the Internet, or a telephone network.

The first and second external electronic devices 102 and 104 each may be the same or a different type of device as the electronic device 101.

All or some of operations executed on the electronic device 101 may be executed on the first and second electronic devices 102 and 104 and/or server 106. For example, when the electronic device 101 should perform some function or service (automatically or at a request), the electronic device 101, instead of executing the function or service on its own or additionally, may request the first and second electronic devices 102 and 104 and/or server 106 to perform at least some functions associated therewith. The first and second electronic devices 102 and 104 and/or server 106 may execute the requested functions or additional functions and transfer a result of the execution to the electronic device 101. The electronic device 101 may provide a requested function or service by processing the received result as it is or after additional processing, e.g., through cloud computing, distributed computing, or a client-server computing technique.

Figure 2:
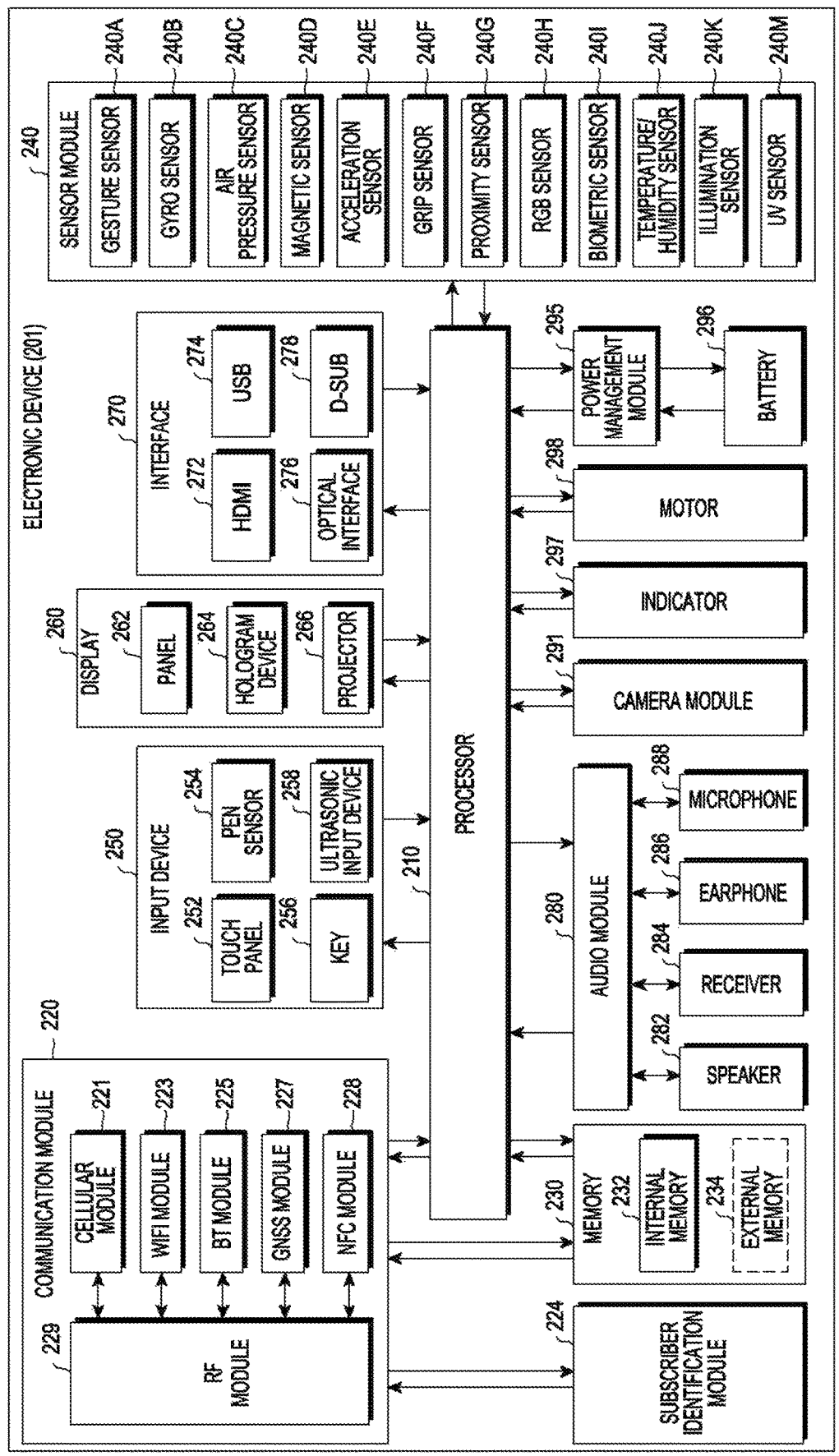
FIG. 2 illustrates an electronic device according to an embodiment of the present disclosure.

FIG. 2 illustrates an electronic device according to an embodiment of the present disclosure.

Referring to FIG. 2, the electronic device 201 includes a processor (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running an OS and/or application programs, and the processor 210 may process and compute various data. The processor 210 may be implemented in a system on chip (SoC). The processor 210 may further include a graphic processing unit (GPU) and/or an image signal processor.

The processor 210 may also include one of the other components illustrated in FIG. 2 (e.g., a cellular module 221). The processor 210 may load a command or data received from at least one of other components (e.g., a non-volatile memory) on a volatile memory, process the command or data, and store resultant data in the non-volatile memory.

The communication module 220 includes a cellular module 221, a Wi-Fi module 223, a bluetooth (BT) module 225, a GNSS module 227, an NFC module 228, and a radio frequency (RF) module 229. The cellular module 221 may provide voice call, video call, text, or Internet services through a communication network. The cellular module 221 may perform identification or authentication on the electronic device 201 in the communication network using the SIM 224 (e.g., a SIM card). The cellular module 221 may perform at least some of the functions that may be provided by the processor 210. For example, the cellular module 221 may include a CP.

At least two of the cellular module 221, the Wi-Fi module 223, the Bluetooth module 225, the GNSS module 227, and the NFC module 228 may be included in a single integrated circuit (IC) or an IC package.

The RF module 229 may transmit and receive communication signals (e.g., RF signals). The RF module 229 may include a transceiver, a power amp module (PAM), a frequency filter, a low noise amplifier (LNA), and/or an antenna.

At least one of the cellular module 221, the Wi-Fi module 223, the bluetooth module 225, the GNSS module 227, and the NFC module 228 may communicate RF signals through a separate RF module.

The SIM 224 may include a card including a subscriber identification module, or an embedded SIM, and may contain unique identification information (e.g., an integrated circuit card identifier (ICCID) or subscriber information (e.g., an international mobile subscriber identity (IMSI)).

The memory 230 includes an internal memory 232 and an external memory 234. The internal memory 232 may include a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid-state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally or physically connected with the electronic device 201 via various interfaces.

The sensor module 240 may measure a physical quantity or detect a motion state of the electronic device 201, and the sensor module 240 may convert the measured or detected information into an electrical signal. The sensor module 240 includes a gesture sensor 240A, a gyro sensor 240B, an atmospheric pressure sensor 240C, a magnetic sensor 240D, an acceleration sensor 240E, a grip sensor 240F, a proximity sensor 240G, a color (e.g., a red-green-blue (RGB)) sensor 240H, a biometric sensor 240I, a temperature/humidity sensor 240J, an illumination sensor 240K, and an Ultra Violet (UV) sensor 240M. Additionally or alternatively, the sensing module 240 may include an e-nose sensor, an electromyography (EMG) sensor, an electroencephalogram (EEG) sensor, an electrocardiogram (ECG) sensor, an infrared (IR) sensor, an iris sensor, and/or a finger print sensor. The sensor module 240 may further include a control circuit for controlling at least one or more of the sensors included in the sensing module.

The electronic device 201 may further include a processor configured to control the sensor module 240 as part of the processor 210 or separately from the processor 210, and the electronic device 2701 may control the sensor module 240 while the processor 1210 is in a sleep mode.

The input unit 250 includes a touch panel 252, a (digital) pen sensor 254, a key 256, and an ultrasonic input device 258. The touch panel 252 may use at least one of capacitive, resistive, infrared, or ultrasonic methods. The touch panel 252 may further include a control circuit. The touch panel 252 may further include a tactile layer to provide an immediate reaction to the user. The pen sensor 254 may include part of the touch panel 252 or a separate sheet for recognition. The key 256 may include a physical button, an optical key, and/or a key pad. The ultrasonic input device 258 may sense an ultrasonic wave generated from an input tool through a microphone 288 to identify data corresponding to the sensed ultrasonic wave.

The display 260 includes a panel 262, a hologram device 264, and a projector 266. The display 260 may also include a control circuit for controlling the panel 262, the hologram device 264, and the projector 266.

The panel 262 may be implemented to be flexible, transparent, or wearable. The panel 262, together with the touch panel 252, may be configured in one or more modules. The panel 262 may include a pressure sensor (or pose sensor) that may measure the force of a touch input. The pressure sensor may be implemented in a single body with the touch panel 252 or may be implemented in one or more sensors separate from the touch panel 252.

The hologram device 264 may make three dimensional (3D) images (i.e., holograms) in the air by using light interference.

The projector 266 may display an image by projecting light onto a screen. The screen may be located inside or outside of the electronic device 201.

The interface 270 includes a high definition multimedia interface (HDMI) 272, a USB 274, an optical interface 276, and a D-subminiature (D-sub) 278. Additionally or alternatively, the interface 270 may include a mobile high-definition link (MHL) interface, a secure digital (SD) card/multimedia card (MMC) interface, or Infrared Data Association (IrDA) standard interface. The audio module 280 may convert a sound signal into an electrical signal and vice versa. The audio module 280 may process sound information input or output through a speaker 282, a receiver 284, an earphone 286, and/or the microphone 288.

The camera module 291 may be a device for capturing still images and videos, and may include one or more image sensors (e.g., front and back sensors), a lens, an image signal processor (ISP), and/or a flash, such as an LED or a xenon lamp.

The power manager module 295 may manage power of the electronic device 201. The power manager module 295 may include a power management Integrated circuit (PMIC), a charger IC, and/or a battery gauge. The PMIC may have a wired and/or wireless recharging scheme. The wireless charging scheme may include a magnetic resonance scheme, a magnetic induction scheme, or an electromagnetic wave based scheme, and an additional circuit, such as a coil loop, a resonance circuit, a rectifier, etc., may be added for wireless charging. The battery gauge may measure an amount of remaining power of the battery 296, a voltage, a current, or a temperature while the battery 296 is being charged. The battery 296 may include a rechargeable battery and/or a solar battery.

The indicator 297 may indicate a particular state of the electronic device 201 or a part (e.g., the processor 210) of the electronic device, including a booting state, a message state, and/or recharging state.

The motor 298 may convert an electric signal to a mechanical vibration and may generate a vibrational or haptic effect.

The electronic device 201 may include a mobile TV supporting device (e.g., a GPU) that may process media data according to digital multimedia broadcasting (DMB), digital video broadcasting (DVB), or MediaFlo™ standards. Each of the aforementioned components of the electronic device may include one or more parts, and a name of the part may vary with a type of the electronic device.

Alternatively, the electronic device 201 may exclude some elements or include more elements, or some of the elements may be combined into a single entity that may perform the same function as by the elements before combined.

The electronic device 201 may include a housing with a front surface, a rear surface, and side surfaces between the front surface and the rear surface. A touchscreen display (e.g., the display 260) may be disposed inside the housing and be exposed through the front surface. The microphone 288 may be disposed inside the housing and be exposed through part of the housing. The speaker 282 may be disposed inside the housing and be exposed through another part of the housing. A hardware button (e.g., the key 256) may be disposed on another part of the housing or may be set to be displayed on the touchscreen display. The hardware button may be referred to as a physical button. The hardware button may be disposed on the surface where the touchscreen is disposed or on a surface where the touchscreen is not disposed. A wireless communication circuit (e.g., the communication module 220) may be positioned inside the housing. The processor 210 may be positioned inside the housing and be electrically connected with the touchscreen display, the microphone 288, the speaker 282, and the wireless communication circuit. The memory 230 may be positioned inside the housing and be electrically connected with the processor 210.

The memory 230 may be configured to store a first application program including a first user interface for receiving a text input. The memory 230 may store instructions enabling the processor 210 to perform a first operation and a second operation. The first operation may include receiving a first-type user input through the button while the first user interface is not displayed on the touchscreen display, after receiving the first-type user input, receiving first user speech through the microphone 288, providing first data for the first user speech to an external server including an ASR and intelligent system, after providing the first data, receiving at least one command to perform tasks generated by the intelligent system in response to the first user speech from the external server, and the second operation may include receiving the first user input through the button while displaying the first user interface on the touchscreen display, after receiving the first-type user input, receiving second user speech through the microphone 288, providing second data for the second user speech to the external server, after providing the second data, receiving data for text generated by the ASR from the second user speech from the server but not receiving commands generated by the intelligence system, and entering the text to the first user interface.

The button may include a physical key positioned on the side surface of the housing.

The first-type user input may be one of pressing the button one time, pressing the button two times, pressing the button three times, pressing the button once and keeping pressing, or pressing the button two times and keeping pressing.

The instructions instruct the processor to display the first user interface along with a virtual keyboard. The button may not be part of the virtual keyboard.

The instructions may instruct the processor 210 to receive data for text generated by the ASR from the first user speech in the first operation from the external server. The first application program may include at least one of a note application program, an email application program, a web browser application program, or a calendar application program.

The first application program may include a message application. The instructions may instruct the processor 210 to, when a selected time elapses after the text has been entered, automatically send the entered text through the wireless communication circuit.

The instructions may instruct the processor 210 to perform a third operation. The third operation may include, while displaying the first user interface on the touchscreen display, receiving a second-type user input through the button, after receiving the second-type user input, receiving third user speech through the microphone, providing third data for the third user speech to the external server, and after providing the third data, receiving at least one command to perform tasks generated by the intelligence system in response to the third user speech.

The instructions may instruct the processor 210 to perform a fourth operation. The fourth operation may include, while displaying the first user interface on the touchscreen display, receiving the second-type user input through the button, after receiving the second-type user input, receiving fourth user speech through the microphone 288, providing fourth data for the fourth user speech to the external server, after providing the fourth data, receiving at least one command to perform tasks generated by the intelligence system from the external server in response to the fourth user speech, receiving fifth user speech through the microphone, providing fifth data for the fifth user speech to the external server, and after providing the fifth data, receiving, from the external server, at least one command to perform tasks generated by the intelligence system in response to the fifth user speech.

The first-type user input and the second-type user input may differ from each other, and the user inputs may be selected from one of pressing the button one time, pressing the button two times, pressing the button three times, pressing the button once and keeping pressing, or pressing the button two times and keeping pressing.

The memory 230 may be configured to further store a second application program including a second user interface to receive text inputs. The instructions may, when executed, instruct the processor 210 to perform a fifth operation. The fifth operation may include, while displaying the second user interface, receiving the first-type user input through the button, after receiving the first-type user input, receiving sixth user speech through the microphone, providing sixth data for the third user speech to the external server, after providing the sixth data, receiving, from the external server, data for text generated by the ASR from the sixth user speech, but not receiving commands generated by the intelligence system, entering the text to the second user interface, and a selected time period after the text has been entered, automatically sending the entered text through the wireless communication circuit.

The memory 230 may be configured to store a first application program including a first user interface for receiving a text input. The memory 230 may store instructions that, when executed, instruct the processor 210 to perform a first operation and a second operation. The first operation may include receiving a first-type user input through the button, after receiving the first-type user input, receiving first user speech through the microphone 288, providing first data for the first user speech to an external server including an ASR and intelligent system, after providing the first data, receiving at least one command to perform tasks generated by the intelligent system in response to the first user speech from the external server, and the second operation may include receiving a second-type user input through the button, after receiving the second-type user input, receiving a second user utterance through the microphone 288, providing second data for the second user speech to the external server, after providing the second data, receiving data for text generated by the ASR from the second user speech from the server but not receiving commands generated by the intelligence system, and entering the text to the first user interface.

The instructions instruct the processor 210 to display the first user interface along with a virtual keyboard. The button may not be part of the virtual keyboard.

The instructions may instruct the processor 210 to receive data for text generated by the ASR from the first user speech in the first operation from the external server.

The first application program may include at least one of a note application program, an email application program, a web browser application program, or a calendar application program.

The first application program may include a message application. The instructions may instruct the processor 210 to, when a selected time elapses after the text has been entered, automatically send the entered text through the wireless communication circuit.

The instructions may instruct the processor 210 to perform the first operation independently from displaying the first user interface on the display.

The instructions may instruct the processor 210 to perform the second operation when the electronic device is in a locked state and/or when the touchscreen display turns off.

The instructions may instruct the processor 210 to perform the second operation while displaying the first user interface on the touchscreen display.

The memory 230 may store instructions that, when executed, instruct the processor 210 to receive user speech through the microphone 288, send information associated with whether to perform NLU on text obtained by performing ASR for data for the user speech, along with data for the user speech, to an external server performing at least one of ASR or NLU, when the information indicates not to perform NLU, receive the text for the data for the user speech from the external server, and when the information indicates to perform NLU, receive a command obtained as a result of performing the NLU on the text from the external server.

The electronic device 201 may include a housing. At least some of the components of the electronic device 201 of FIG. 2 may physically be disposed in the housing. The touchscreen display (e.g., the display 260 or input device 250) may be disposed inside the housing and be exposed through a first portion of the housing. The microphone 288 may be disposed inside the housing and be exposed through a second portion of the housing.

The speaker 282 may be disposed inside the housing and be exposed through a third portion of the housing. The wireless communication circuit (e.g., the communication module 220) may be disposed inside the housing. The processor 210 may be disposed inside the housing and be electrically connected with the touchscreen display, the microphone 288, the speaker 282, and the wireless communication circuit. The memory 230 may be disposed inside the housing and be electrically connected with the processor 210.

The memory 230 may store instructions that, when executed, instruct the processor 210 to receive a first user input through the touchscreen display or the microphone 288, send data associated with the first user input to an external server through the wireless communication circuit, receive a response from the external server through the wireless communication circuit, after receiving the response, allow the electronic device to have the plurality of states having the order to perform the tasks, receive a second user input through the touchscreen display or the microphone 288, and allow the electronic device 101 to return one of the plurality of states having the order based on, at least, the second user input.

The electronic device 101 may further include a physical button (e.g., the key 256) exposed on the housing. The instructions may be executed to instruct the processor 210 to receive the second user input through the physical button.

The physical button may be disposed on a surface, of the housing, where the touchscreen display is disposed. The physical button may be disposed on a surface, of the housing, where the touchscreen display is not disposed.

The instructions may be executed to instruct the processor 210 to receive the second user input through the microphone 288, send data for the second user input to the external server through the wireless communication circuit, and allow another response to be received from the external server through the wireless communication circuit. The other response may allow the electronic device 101 to return to the one state of the plurality of states having the order.

The instructions may be executed to instruct the processor 210 to display, on the touchscreen display, at least one of screens or images associated with the plurality of states having the order.

The second user input may include a request for canceling all of the performed tasks. The instructions may be executed to enable the processor 210 to allow the electronic device 210 to return to a state before the electronic device has the plurality of states having the order based on the second user input.

The memory (e.g., the memory 230) may store instructions executed to instruct the processor 210 to receive a first user input through the touchscreen display or the microphone 288, the first user input including a request for allowing a first task to be performed using the electronic device 201, send first data associated with the first user input through the wireless communication circuit to an external server, receive a first response from the external server through the wireless communication circuit, the first response including first information about a plurality of first states having an order of the electronic device 201 to perform the first task, perform the first task by allowing the electronic device 201 to have the plurality of first states having the order after receiving the first response, receive a second user input through the touchscreen display or the microphone 288, the second user input including a second request for allowing a second task to be performed using the electronic device 201, and send second data associated with the second user input, along with at least part of the first information, to the external server through the wireless communication circuit.

The second user input may include a request for canceling at least part of the first task performed.

The instructions may be executed to instruct the processor 210 to allow the electronic device 201 to return to one of the plurality of first states based on at least part of the second user input.

The memory 230 may store instructions executed to enable the processor 210 to control the touchscreen display to display a first screen, obtain first user speech through the microphone 288 while displaying the first screen, control the touchscreen display to display a second screen associated with a first task among the plurality of tasks corresponding to the first user speech, instead of the first screen, control the touchscreen display to display a third screen associated with a second task among the plurality of tasks corresponding to the first user speech, instead of the second screen, obtain a command to cancel at least some of the plurality of tasks while displaying the third screen, select one of the first screen or the second screen using a result of analyzing the cancellation command, and control the touchscreen display to display the selected screen.

The electronic device 201 may further comprise a hardware button disposed on a surface of the housing. The instructions may be executed to instruct the processor 210 to obtain the cancellation command through at least one of the hardware button, the microphone 288, or the touchscreen display.

The cancellation command may include a request for canceling all of the plurality of tasks. The instructions may be executed to instruct the processor 210 to cancel all of the plurality of tasks and display the first screen.

The cancellation command may further include a request for performing at least one third task, at least partially, different from the plurality of tasks. The instructions may be executed to instruct the processor 210 to cancel all of the plurality of tasks and display the first screen, and then, display a fourth screen associated with the at least one third task, instead of the first screen, on the touchscreen display.

The cancellation command may include a request for canceling some of the plurality of tasks. The instructions may be executed to enable the processor 210 to cancel some of the plurality of tasks and display the second screen.

The cancellation command may further include a request for performing at least one fourth task, at least partially, different from the plurality of tasks. The instructions may be executed to instruct the processor 210 to cancel some of the plurality of tasks and display the second screen, and then, display a fifth screen associated with the at least one fourth task, instead of the second screen, on the touchscreen display.

The cancellation command may further include a request for performing at least one fourth task, at least partially, different from the plurality of tasks. The instructions may be executed to instruct the processor 210 to cancel some of the plurality of tasks, and while canceling, display a sixth screen for performing the at least one fourth task, instead of the second screen, on the touchscreen display.

The second screen may be any one of a screen displayed immediately before the third screen is displayed, a screen corresponding to a state requiring an additional user input to perform another task, and a screen immediately after an application used is varied.

The instructions may be executed to instruct the processor 210 to send data for the first user speech to an external server through the wireless communication circuit, receive the plurality of tasks corresponding to the first user speech through the wireless communication circuit, send data for the cancellation command to the external server through the wireless communication circuit, and receive a result of analyzing the cancellation command through the wireless communication circuit.

The instructions may be executed to instruct the processor 210 to perform an ASR process on data for the first user speech to obtain first text and perform an NLU process on the first text to obtain the plurality of tasks.

The instructions may be executed to instruct the processor 210 to control the touchscreen display to display a first screen, obtain first user speech through the microphone 288 while displaying the first screen, control the touchscreen display to display a third screen associated with a last task of a plurality of tasks corresponding to the first user speech instead of the first screen, obtain a command to cancel at least some of the plurality of tasks while displaying the third screen, select one of the first screen or a second screen associated with a task prior in order to the last task among the plurality of tasks using a result of analyzing the cancellation command, and control the touchscreen display to display the selected screen.

Figure 3:
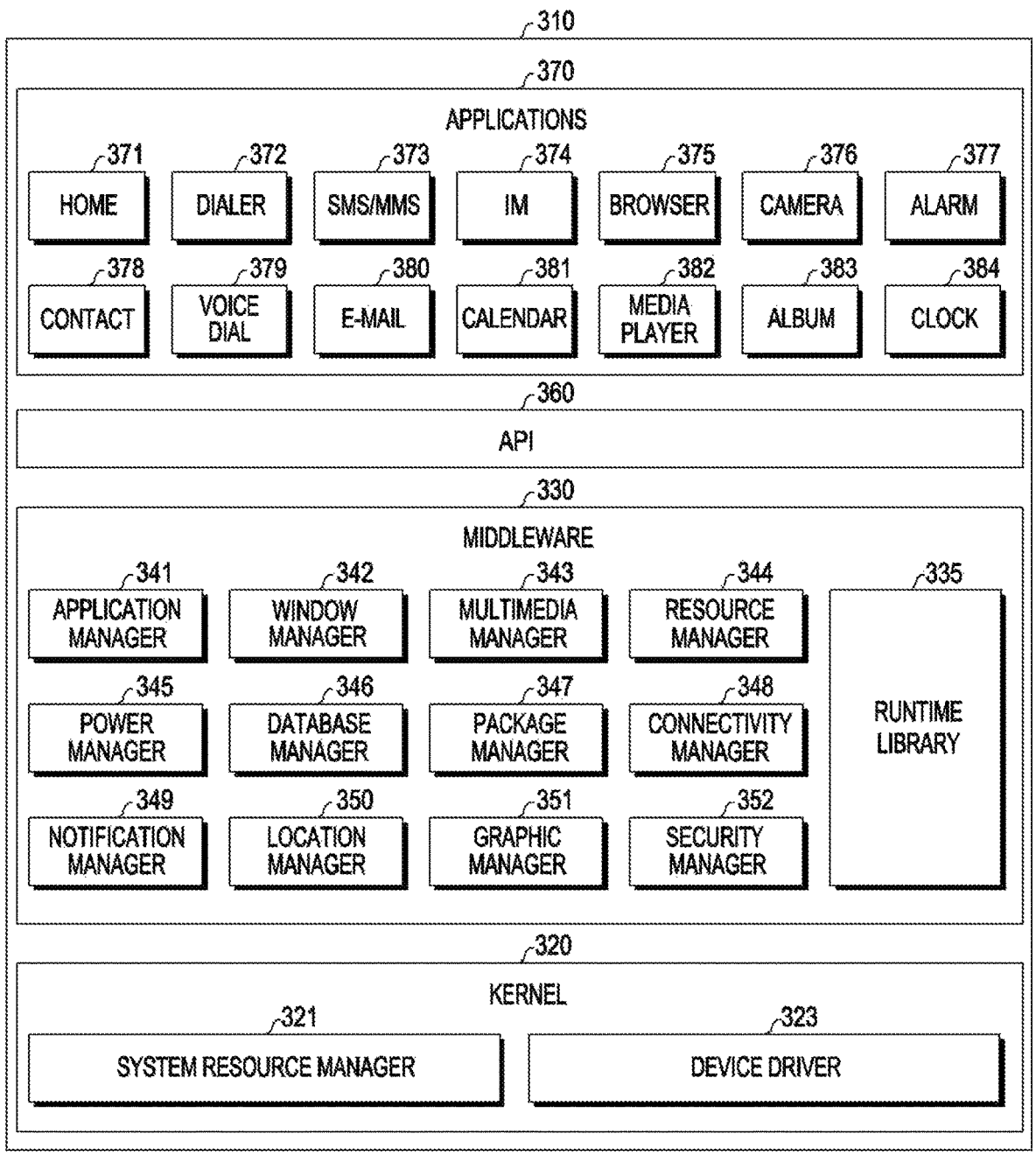
FIG. 3 illustrates a program module according to an embodiment of the present disclosure.

FIG. 3 illustrates a program module according to an embodiment of the present disclosure.

Referring to FIG. 3, the program module 310 includes an OS controlling resources related to an electronic device and/or various applications driven on the OS. The OS may include Android™, iOS™, Windows™, Symbian™, Tizen™, or Bada™.

The program module 310 includes a kernel 320, middleware 330, an API 360, and applications 370. At least a part of the program module 310 may be preloaded on the electronic device or may be downloaded from an external electronic device.

The kernel 320 includes a system resource manager 321 and a device driver 323. The system resource manager 321 may perform control, allocation, or recovery of system resources. The system resource manager 321 may include a process managing unit, a memory managing unit, and/or a file system managing unit.

The device driver 323 may include a display driver, a camera driver, a bluetooth driver, a shared memory driver, a USB driver, a keypad driver, a Wi-Fi driver, an audio driver, or an inter-process communication (IPC) driver.

The middleware 330 may provide various functions to the applications 370 through the API 360 so that the applications 370 may use limited system resources in the electronic device or provide functions jointly required by applications 370. The middleware 330 includes a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module used by a compiler in order to add a new function through a programming language while the applications 370 are being executed. The runtime library 335 may perform input/output management, memory management, or arithmetic function processing.

The application manager 341 may manage the life cycle of the applications 370.

The window manager 342 may manage graphic user interface (GUI) resources used on the screen.

The multimedia manager 343 may identify formats for playing media files and use a codec appropriate for a format to perform encoding or decoding on media files.

The resource manager 344 may manage the source code or memory space of the applications 370.

The power manager 345 may manage battery capability or power and provide power information for the operation of the electronic device. The power manager 345 may interwork with a basic input/output system (BIOS).

The database manager 346 may generate, search, or vary a database to be used in the applications 370.

The package manager 347 may manage installation or update of the applications 370 that are distributed in the form of a package file.

The connectivity manager 348 may manage wireless connectivity.

The notification manager 349 may provide an event, e.g., a message arrival, an appointment, or a proximity alert, to the user.

The location manager 350 may manage location information on the electronic device, the graphic manager 351 may manage graphic effects to be offered to the user and their related user interface, and the security manager 352 may provide system security or user authentication.

The middleware 330 may include a telephony manager for managing the voice or video call function of the electronic device or a middleware module able to form a combination of the functions of the above-described elements. The middleware 330 may provide a module specified according to the type of the operating system. The middleware 330 may dynamically omit some existing components or add new components.

The API 360 may include a set of API programming functions and may have different configurations depending on operating systems. For example, when using Android™ or iOS™, one API set may be provided per platform, and when using Tizen™, two or more API sets may be offered per platform.

The applications 370 include a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an email application 380, a calendar application 381, a media player application 382, an album application 383, and a clock application 384. Additionally or alternatively, the applications 370 may include a health-care application (e.g., an application for measuring the degree of workout or a blood sugar level), or environmental information application (e.g., an application providing air pressure, moisture, and/or temperature information). The applications 370 may also include an information exchanging application supporting information exchange between the electronic device and an external electronic device, e.g., a notification relay application for transferring specific information to the external electronic device or a device management application for managing the external electronic device. The notification relay application may transfer notification information generated by other application of the electronic device to the external electronic device or receive notification information from the external electronic device and provide the received notification information to the user. The device management application may install, delete, or update a function (e.g., turn-on/turn-off the external electronic device (or some elements) or adjust the brightness (or resolution) of the display) of the external electronic device communicating with the electronic device or an application operating on the external electronic device.

The applications 370 may also include an application (e.g., a health-care application of a mobile medical device) designated according to an attribute of the external electronic device.

The applications 370 may include an application received from the external electronic device.

At least a portion of the program module 310 may be implemented (e.g., executed) in software, firmware, hardware (e.g., the processor 210), or a combination of at least two or more thereof and may include a module, program, routine, command set, or process for performing one or more functions.

Herein, the term "module" includes a unit configured in hardware, software, or firmware and may interchangeably be used with terms, such as "logic," "logic block," "part," and "circuit." A module may be a single integral part or a minimum unit or part for performing one or more functions. A module may be implemented mechanically or electronically and may include an application-specific integrated circuit (ASIC) chip, field-programmable gate arrays (FPGAs), and/or a programmable logic device, that has been known or to be developed in the future as performing some operations.

At least a part of the device (e.g., modules or their functions) or method (e.g., operations) may be implemented as instructions stored in a computer-readable storage medium (e.g., the memory 130) in the form of a program module. The instructions, when executed, may instruct the processor (e.g., the processor 120) to carry out a corresponding function. The computer-readable medium may include a hard disk, a floppy disc, a magnetic medium (e.g., magnetic tape), an optical recording medium (e.g., a compact disc-read only memory (CD-ROM), a DVD, a magnetic-optical medium (e.g., a floptical disk), or an embedded memory. The instruction may include a code created by a compiler or a code executable by an interpreter.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

Figure 4A:
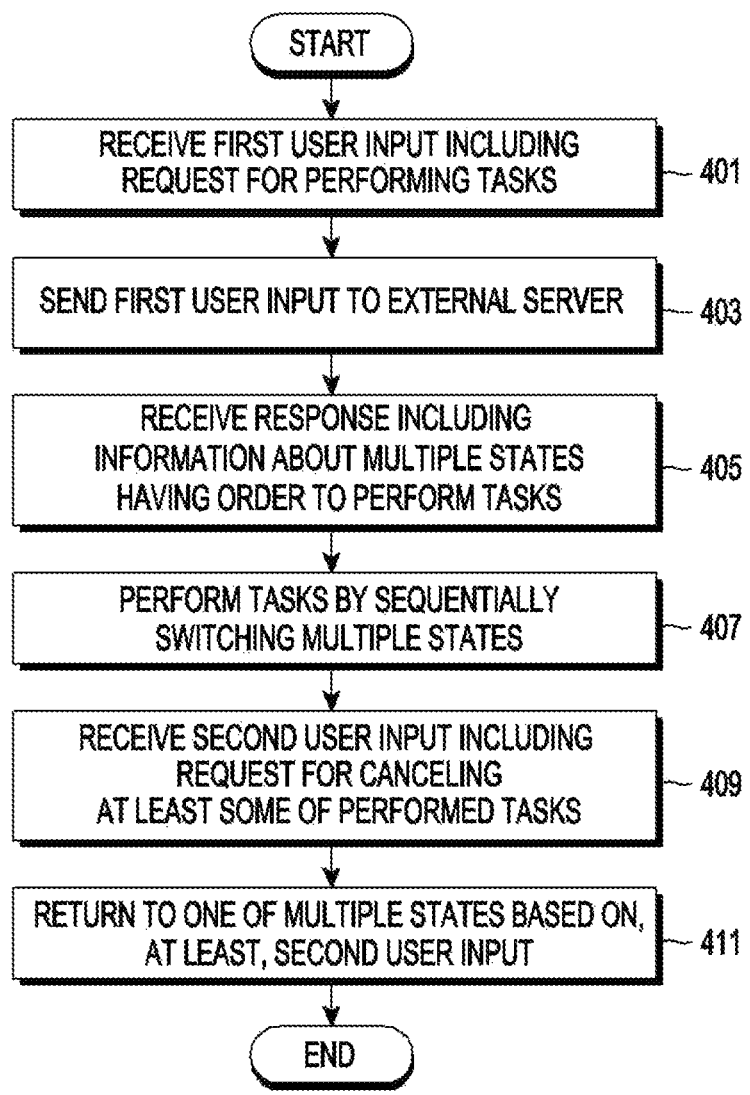
FIGS. 4A and 4B are flowcharts illustrating methods for operating an electronic device according to embodiments of the present disclosure.
Figure 4B:
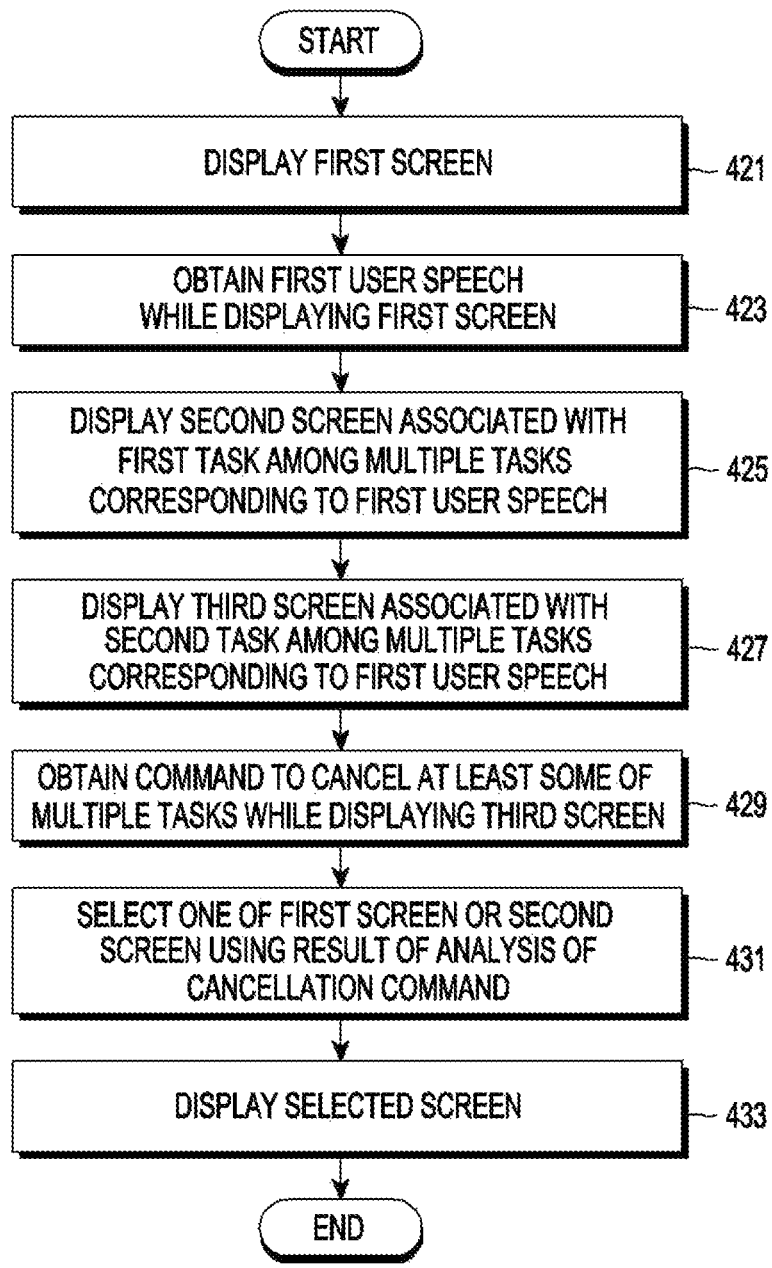

FIGS. 4A and 4B are flowcharts illustrating methods for operating an electronic device according to embodiments of the present disclosure.

Referring to FIG. 4A, in step 401, the electronic device receives a first user input through a touchscreen display or a microphone. The first user input may include a request to perform tasks using the electronic device.

In step 403, the electronic device sends the first user input to an external server. The electronic device may send data associated with the first user input through the wireless communication circuit to the external server.

In step 405, the electronic device receives a response including information about a plurality of states having an order, for the electronic device to perform the tasks.

In step 407, the electronic device performs the tasks by switching through the plurality of states in the order. For example, after receiving the response, the electronic device may perform the tasks by sequentially transitioning through the plurality of states in the order. Switching through the plurality of states may include switching between screens (or images) displayed by the electronic device or changing information managed by the electronic device as a plurality of sub-tasks for performing a particular task.

In step 409, the electronic device receives a second user input including a request for canceling at least one of the tasks being performed. The electronic device may receive the second user input through the touchscreen display or the microphone.

In step 411, the electronic device returns to one of the plurality of states, based on at least the second user input. For example, the electronic device may return to the start screen or an intermediate screen that has been displayed while switching between the displayed screens.

FIGS. 5A to 5D illustrate example screen images displayed when canceling at least one of a plurality of tasks previously performed according to previously received user speech, according to an embodiment of the present disclosure. For example, FIG. 4B will be described below with reference to FIGS. 5A to 5D.

Figure 5A:
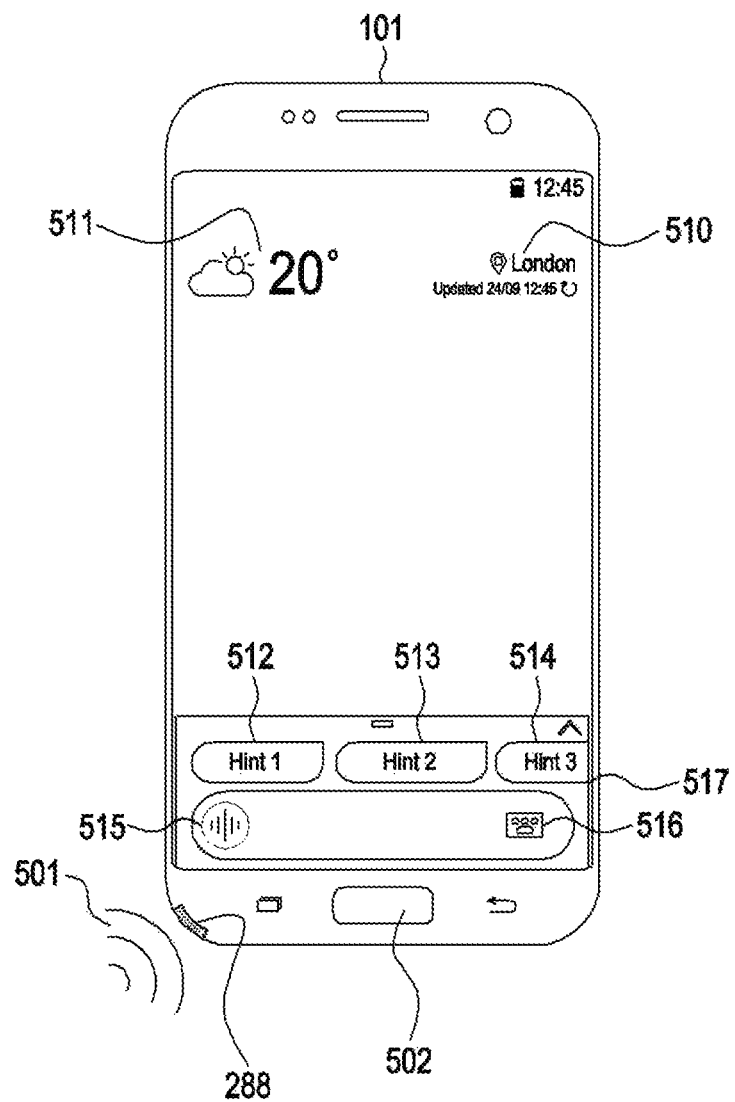
FIGS. 5A to 5D illustrate example screen images displayed when canceling at least one of a plurality of tasks previously performed according to previously received user speech, according to an embodiment of the present disclosure.

Referring to FIG. 4B, in step 421, the electronic device 101 displays a first screen. For example, as illustrated in FIG. 5A, an electronic device 101 displays a first screen 510 of an execution screen of a launcher application. The launcher application may be an application for execution of at least one application. The execution screen of the launcher application may be referred to as a home screen or a menu screen. The first screen 510 may also be referred to as a start screen because it is the first screen displayed before screen switching as user speech is processed. The first screen 510 includes a weather information widget 511. The electronic device 101 may display any screen as the start screen. The electronic device 101 may execute a speech recognition application, and may display a speech recognition application execution screen 517 on at least part of the first screen 510. The speech recognition application execution screen 517 includes hints 512, 513, and 514, an indicator 515 indicating that listening is in progress, and a confirm icon 726.

The electronic device 101 may execute the virtual reality application even while another application is in execution. That is, the electronic device 101 may process user speech by executing the speech recognition application, without displaying the execution screen of the speech recognition application 517, or the electronic device 101 may translucently display the speech recognition application execution screen 517 on the first screen 510.

Referring again to FIG. 4B, in step 423, the electronic device 101 obtain first user speech 501 through a microphone 288 while displaying the first screen 510. The electronic device 101, after executing the speech recognition application, may activate the microphone 288 and obtain the first user speech 501 through the activated microphone 288. The electronic device 101 may execute the speech recognition application corresponding to a user input through the hardware button 502, and may additionally activate the microphone 288. The position of the hardware button 502 is not limited.

Alternatively, the electronic device 101 may always keep the microphone 288 active. In this case, the electronic device 101 may obtain the first user speech 501 through the active microphone 288, execute the speech recognition application corresponding thereto, and process the first user speech 501 through the speech recognition application. The electronic device 101 may also activate the microphone 288 with the speech recognition application executed in the background. In this case, the electronic device 101 may obtain the first user speech 501 and immediately process the first user speech 501.

In step 425, the electronic device 101 displays a second screen associated with a first task among a plurality of tasks corresponding to the first user speech 501.

In step 427, the electronic device 101 displays a third screen associated with a second task among the plurality of tasks corresponding to the first user speech 501. A plurality of tasks including the first task and the second task may be determined corresponding to user speech (e.g., the first user speech 501). For example, the electronic device 101 may obtain the first user speech 501 saying, "Send the photo recently taken in Hooamdong to Uma." The electronic device 101 or an external server may perform ASR and NLU on the first user speech 501 and obtain a command including a plurality of tasks corresponding to the first user speech 501.

Where the electronic device 101 supports ASR and NLU processing functionality, the electronic device 101 may directly perform ASR and NLU processing on the obtained user speech. However, if the electronic device 101 does not support ASR and NLU processing functionality, the electronic device 101 may send data for the obtained user speech to the external server, which may perform ASR and NLU on the received data for first user speech and send data associated with a processing result to the electronic device 101. For example, the electronic device 101 or the external server may obtain text by applying ASR to the user speech saying, "Send the photo recently taken in Hooamdong to Uma." Thereafter, the electronic device 101 or the external server may generate an intent "SEND_PHOTO," the slots (or parameters) "Hawaii/# location," "Recently/# date," "Uma/# contact_person," and determine an action sequence corresponding thereto, by applying NLU to the obtained text. The action sequence sequentially represents operations that the electronic device 101 is to perform. The action sequence may include at least one task. An example of a determined action sequence is shown in Table 1 below.

TABLE 1

GALLERY_launch - GALLERY_search("Hawaii/#location","Recently/#date") - GALLERY_search_result - GALLERY_search_selected_view - SHARE - MESSAGE_conversation_view("Uma/#contact_person") - MESSAGE_send The action sequence shown in Table 1 includes a task of executing a gallery application (GALLERY_launch), a task of searching the gallery application for photos taken in Hawaii, as location, recently, as date, (GALLERY_search ("Hawaii/# location", "Recently/# date")), a task of identifying results of searching the gallery application (GALLERY_search_result), a task of displaying the results of searching the gallery application (GALLERY_search_selected_view), a task of sharing photos (SHARE), a task of displaying contacts on a message chat window and a chat window with Uma (MESSAGE_conversation_view ("Uma/# contact_person")), and a task of sending a message (MESSAGE_send), and their respective turns.

Alternatively, the electronic device 101 may send data for the user speech obtained through the microphone 288 to the external server, which performs ASR and NLU processing on the received data for the user speech in order to generate the action sequence, e.g., as shown in Table 1. The external server may then send the action sequence to the electronic device 101.

The electronic device 101 may perform the action sequence, i.e., a plurality of tasks, which the electronic device 101 itself or the external server has generated. The electronic device 101 may change screens displayed as per the results of performing the tasks while performing the plurality of tasks.

Figure 5B:
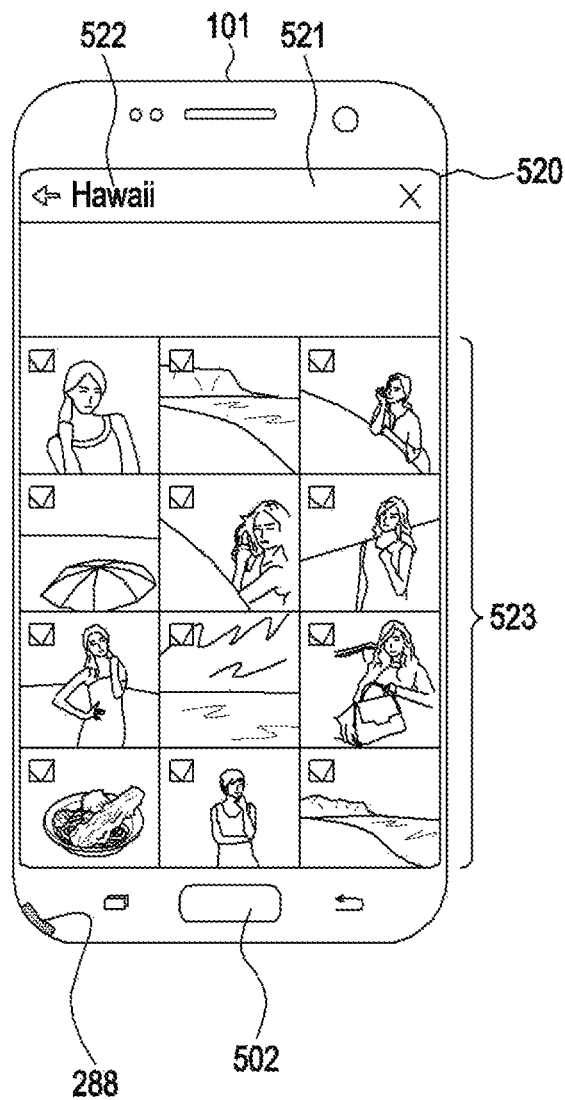

For example, referring to FIG. 5B, the electronic device 101 displays a second screen 520, which is the execution screen of the gallery application, while performing the first task among the plurality of tasks, e.g., the task of executing the gallery application (GALLERY_launch), the task of searching the gallery application for photos taken in Hawaii, as location, recently, as date, (GALLERY_search ("Hawaii/# location", "Recently/# date")), or the task of identifying results of searching the gallery application (GALLERY_search_result).

The second screen 520 includes a search window 521 that displays "Hawaii" as a target for search. Further, photos 523 associated with Hawaii are displayed as a result of the search.

A plurality of screens may sequentially be displayed, e.g., as a first screen displaying the gallery application including an empty search window 521, a next screen filling the empty window 521 with "Hawaii," and a last screen displaying at least one of the photos 523 as a result of the search.

Figure 5C:
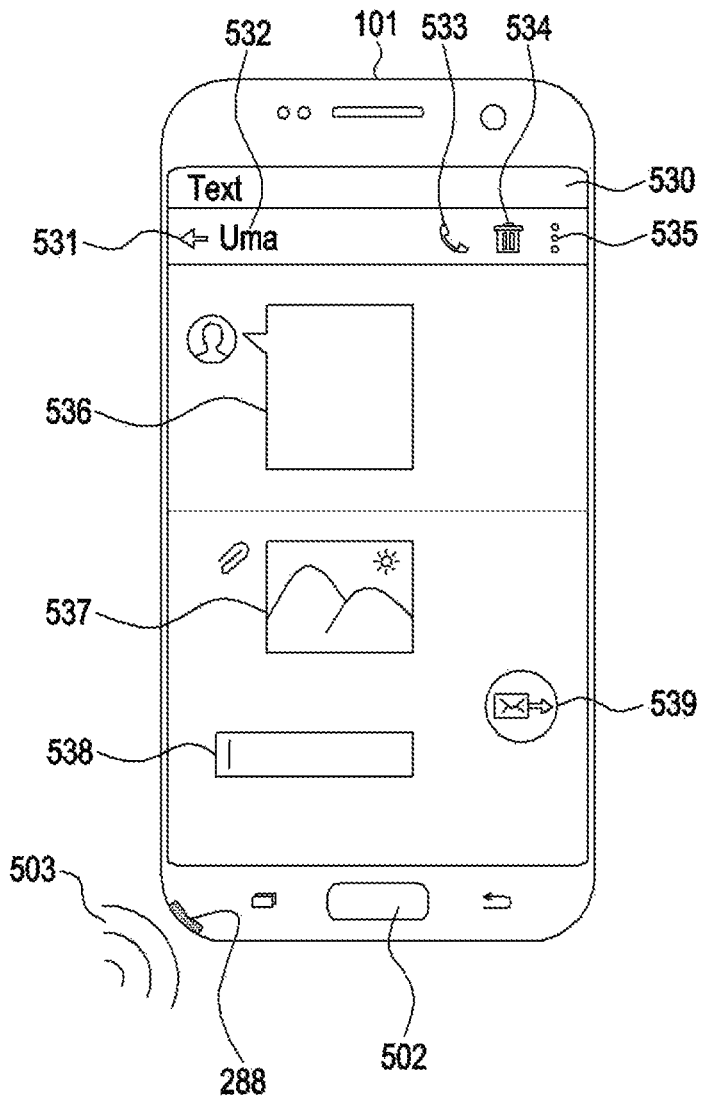

Thereafter, referring to FIG. 5C, the electronic device 101 displays a third screen 530, which is the execution screen of a message application, while performing a second task among the plurality of tasks, e.g., the task of sharing photos (SHARE), the task of displaying the contacts on the message chat window and the chat window with Uma (MESSAGE_conversation_view ("Uma/# contact_person")), or the task of sending a message (MESSAGE_send).

The third screen 530 includes various icons, such as a back-to-previous screen icon 531, a chat partner 532, a phone icon 533, a delete icon 534, and an open-menu icon 535, and text. The third screen 530 includes an existing message 536 that has been communicated with the chat partner 532, an attached photo 537, a message input window 538, and a send message icon 539. The electronic device 101 may send the attached photo 537 immediately or after the send message icon 539 is selected.

A switch from the second screen 520 of FIG. 5B to the third screen 530 may automatically be performed without additional user input. The third screen 530 may also be referred to as an end screen because it is finally displayed as a result of performing the task corresponding to the first user speech 501. Similarly, the second screen 520 may be referred to as an intermediate screen because it is displayed in the middle of switching from the start screen (e.g., the first screen 510) to the end screen (e.g., the third screen 530). The process of the electronic device 101 displaying the start screen, then the intermediate screen, and lastly the end screen may also be referred to as the electronic device 101 sequentially having a plurality of states.

In step 429, the electronic device 101 obtains a command to cancel at least one of the plurality of tasks, while displaying the third screen 530, i.e., the end screen. In FIG. 5C, the cancellation command may be obtained through speech processing. The electronic device 101 may obtain second user speech 503 through the microphone 288 and may obtain a command to cancel at least one task among the plurality of tasks as a result of processing the second user speech 503. For example, when the second user speech 503 says, "Not Hawaii, but Hooamdong," the electronic device 101 may determine that the second user speech 503 is a command to cancel at least one of the plurality of tasks corresponding to the first user speech 501. The electronic device 101 may determine that the intent for the second user speech 503 is a cancellation command and the task to be canceled is the task of searching the gallery application for photos taken in Hawaii, as location, recently, as date, (GALLERY_search ("Hawaii/# location", "Recently/# date")).

Alternatively, the electronic device 101 may send data for the second user speech 503 to the external server, which may determine that the second user speech 503 is a command to cancel at least some of the plurality of tasks corresponding to the first user speech 501. In response, the external server may send the cancellation command including another task to the electronic device 101.

Alternatively, the electronic device 101 may obtain the cancellation command through the hardware button 502 or a UI displayed on the touchscreen.

In step 431, the electronic device 101 selects the first screen 510 or the second screen 520 as a "where-to-go-back" screen using the results of analyzing the cancellation command.

In step 433, the electronic device 101 displays the selected screen.

For example, as described above, when the electronic device 101 determines that the task to be canceled is the task of searching the gallery application for photos taken in Hawaii, as location, recently, as date, (GALLERY_search ("Hawaii/# location", "Recently/# date")), the electronic device 101 may determine the second screen 520 as the where-to-go-back screen, and may display the second screen 520 instead of the third screen 530.

Figure 5D:
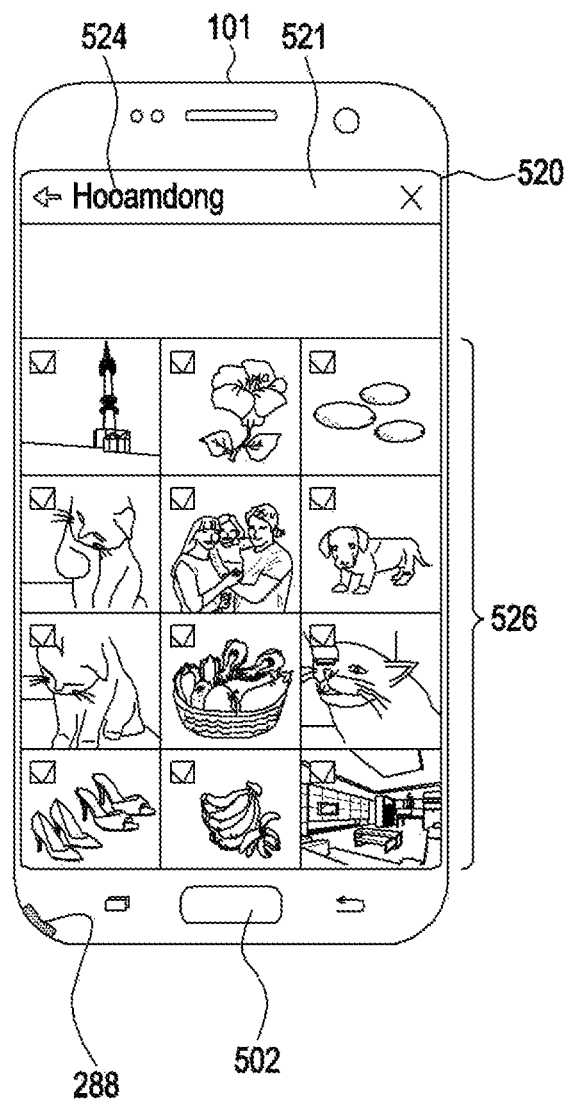

The electronic device 101 may additionally receive a user input on the second screen 520, as illustrated in FIG. 5D, in order to fill the search window 521 with "Hooamdong" 524. Alternatively, the electronic device 101 may fill the search window 521 with "Hooamdong" 524 as a result of processing the second user speech 503. Thereafter, the electronic device 101 may display photos 526 that have been taken in "Hooamdong." The electronic device 101 may automatically display a message application execution screen for sending at least one of photos taken in Hooamdong, which have automatically been modified, to Uma.

As set forth above, the electronic device 101 may sequentially display at least one intermediate screen and end screen while performing a plurality of tasks for user speech. When a cancellation command is entered, the electronic device 101 may return to at least one of the start screen or the intermediate screens while canceling at least one task previously initiated.

Although FIGS. 5A to 5D illustrate the electronic device 101 switching to an intermediate screen by canceling some tasks, the electronic device 101 may instead cancel all of the tasks and return to the start screen.

The electronic device 101 may cancel at least one of the tasks even before the end screen is displayed. For example, the electronic device 101 may obtain user speech for cancellation while displaying an intermediate screen (e.g., the second screen 520), and in response, may cancel at least one of the tasks already performed and return to the state prior to the canceled task. The electronic device 101 may display a screen corresponding to the returned state.

The electronic device 101 may be configured to provide the cancellation function under a particular context, i.e., not all of the time. For example, when multiple applications performing the same function are installed on an OS, the electronic device 101 may, upon first executing function, select an application to perform the function as per a user choice. When the corresponding function is to be used later, the electronic device 101 may designate a particular application and execute later the function through the designated application with no additional user input. However, the electronic device 101 may encounter a context in which it should execute the corresponding function through another application, not the previously designated application. When user speech results in such a situation, the electronic device 101 may be configured to provide the function of cancellation in such context.

The electronic device 101 may obtain user speech saying, "Send a message to Tom." The electronic device 101 may receive a selection of any one of a plurality of applications capable of sending messages and send a message to Tom using the selected application. Thereafter, upon receiving second user speech instructing to send a message, the electronic device 101 may send the message through the application determined to be appropriate in the corresponding context, without the user's selection. Even when an application is selected without user selection, the electronic device 101 may be configured to provide the cancellation function.

Figure 6:
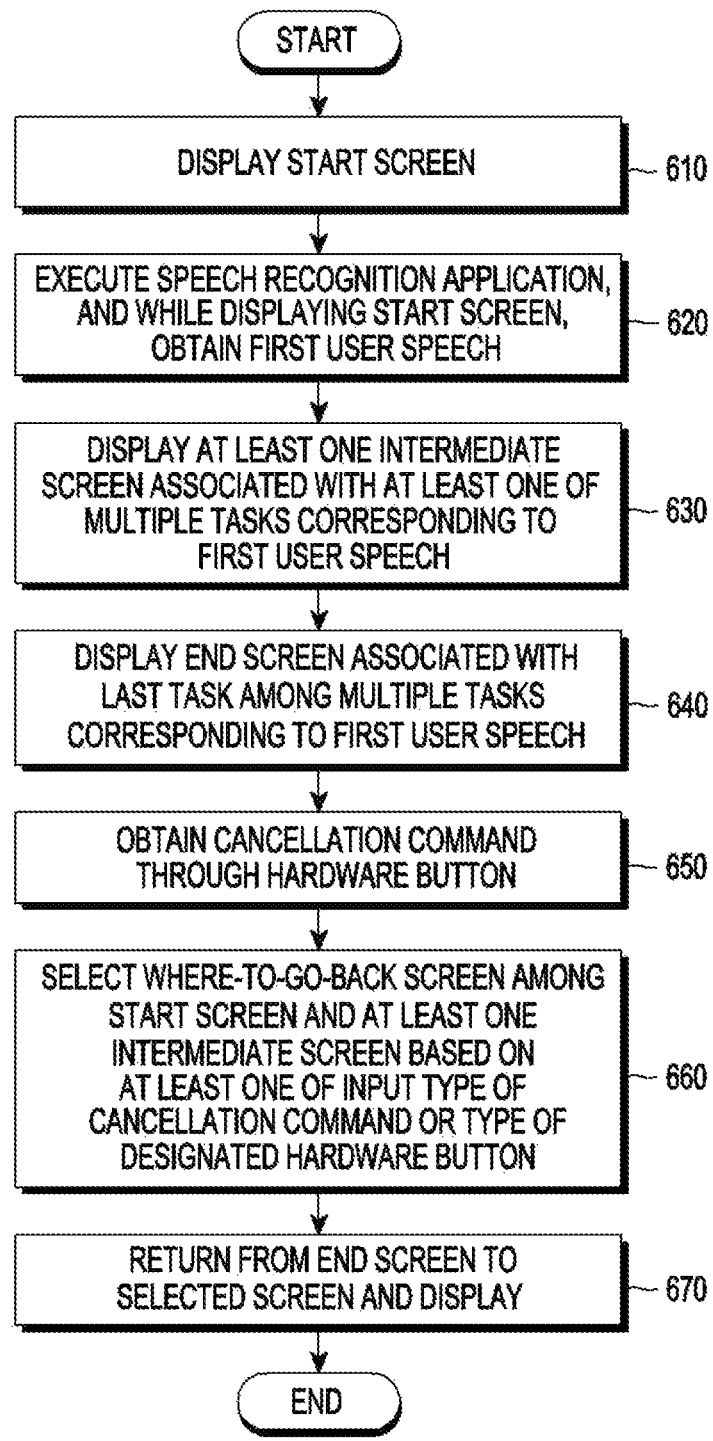
FIG. 6 is a flowchart illustrating a method for operating an electronic device according to an embodiment of the present disclosure.
Figure 7:
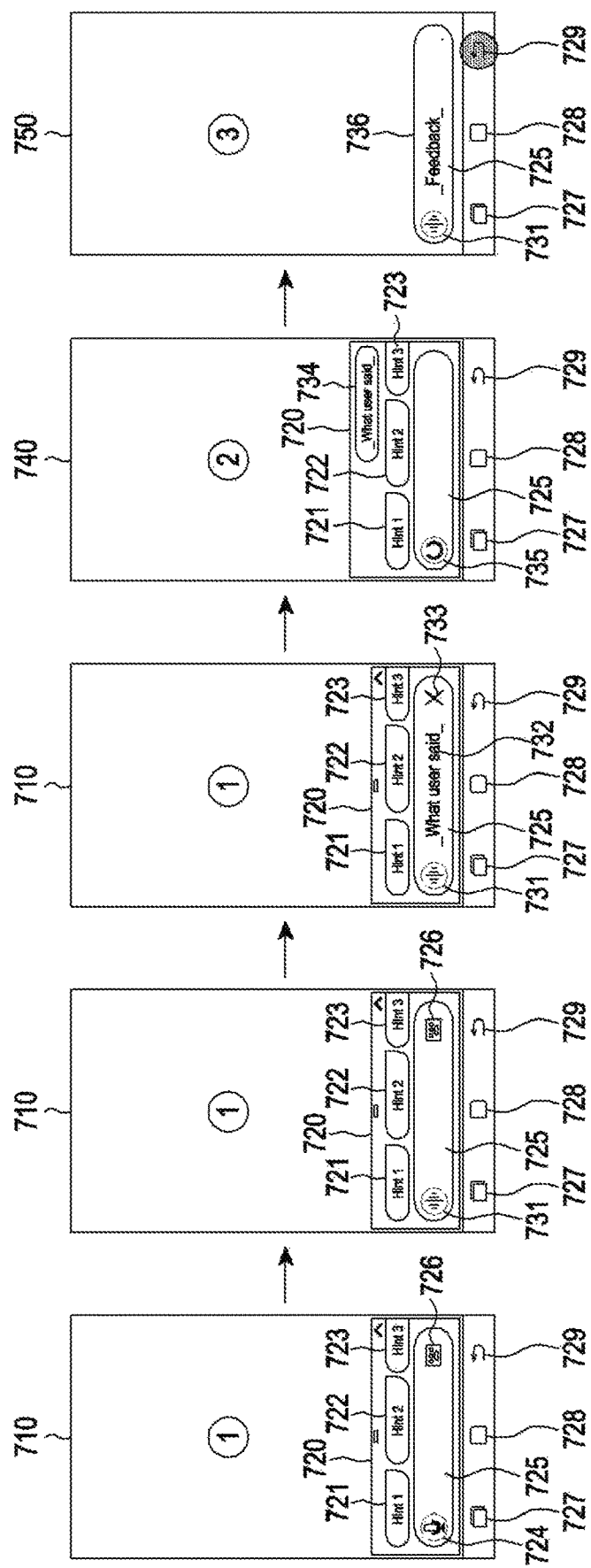
FIG. 7 illustrates example screen images displayed by an electronic device according to an embodiment of the present disclosure.

FIG. 6 is a flowchart illustrating a method for operating an electronic device according to an embodiment of the present disclosure. The method illustrated in FIG. 6 is described in greater detail with reference to FIG. 7. FIG. 7 illustrates example screen images displayed by an electronic device according to an embodiment of the present disclosure.

Referring to FIGS. 6 and 7, in step 610, an electronic device displays a start screen 710.

In step 620, the electronic device executes a speech recognition application and obtains first user speech while displaying the start screen 710. The electronic device may execute the speech recognition application and display an execution screen 720 of the speech recognition application on the start screen 710. The speech recognition application execution screen 720 includes hints 721, 722, and 723 that may invoke a function that the speech recognition application provides. The speech recognition application execution screen 720 also includes an activate microphone icon 724, a display text window 725, and a confirm icon 726. When the activate microphone icon 724 is designated, the electronic device may activate the microphone and wait to receive user speech. When the electronic device waits to receive the user speech, the electronic device changes the activate microphone icon 724 to an indicator 731 to indicate that it is waiting to receive the user speech. The electronic device may fill the display text window 725 with text or a command obtained as a result of processing user speech.

When the confirm icon 726 is designated, the electronic device may perform a task corresponding to the text or command in the display text window 725. Alternatively, the electronic device may be configured to immediately perform a task, without designation of the confirm icon 726. The electronic device may display text or a command 732 corresponding to the user speech, change the confirm icon 726 to a cancel icon 733, and display the same.

In step 630, the electronic device displays at least one intermediate screen 740 associated with at least one of a plurality of tasks corresponding to the first user speech. The intermediate screen 740 may be a screen associated with tasks other than the last task among the plurality of tasks, e.g., a screen displayed as a result of performing the task. The electronic device may also display the indicator 735 indicating that the task is being processed. Further, the electronic device may display a task process history 734 in the form of, e.g., a balloon popup.

In step 640, the electronic device displays an end screen 750 associated with the last task among the plurality of tasks corresponding to the first user utterance. The electronic device may display feedback 736, e.g., text summarizing the results of performing the task, on the end screen 750. The electronic device may activate the microphone. For example, the electronic device may display the indicator 731 indicating that it is waiting.

In step 650, the electronic device obtains a cancellation command through a hardware button 727, 728, or 729 while displaying the end screen 750.

In step 660, the electronic device selects a where-to-go-back screen among the start screen and at least one intermediate screen based on at least one of an input type of the cancellation command or a designated type of hardware button. The electronic device may return to any one of the start screen and at least one intermediate screen by canceling at least some of the plurality of tasks previously performed.

In step 670, the electronic device returns from the end screen to the selected screen and display the selected screen. For example, if the first hardware button 727 is designated, the electronic device may determine to return to the start screen 710 and cancel at least one task performed between the start screen 710 and the end screen 730. If the second hardware button 728 is designated, the electronic device may determine to return to the intermediate screen 740 and cancel at least one task performed between the intermediate screen 740 and the end screen 750. The electronic device may end the speech recognition application if a third hardware button 729 is designated.

As another example, the electronic device may determine to return to the start screen 710 when the first hardware button 727 is designated one time and return to the intermediate screen 740 when the first hardware button 727 is designated two times.

When the third hardware button 729 is long-pressed, the electronic device may be configured to cancel the task processed immediately before.

The electronic device may determine a task to be canceled among the tasks previously performed or determine the where-to-go-back screen based on various combinations of the type of hardware button and/or the input type.

Figure 8:
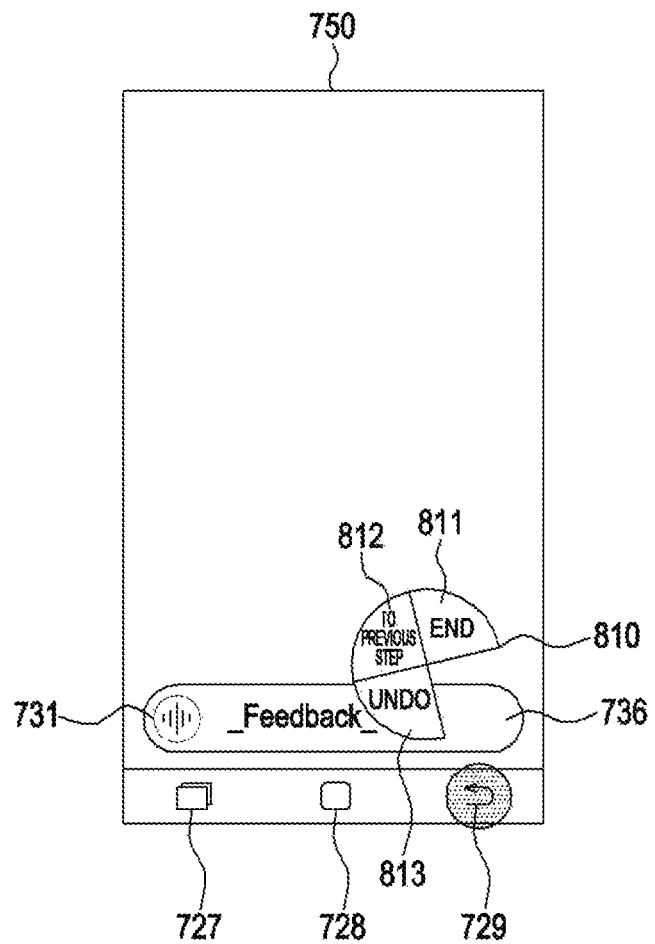
FIG. 8 illustrates a screen of an electronic device according to an embodiment of the present disclosure.

FIG. 8 illustrates a screen of an electronic device according to an embodiment of the present disclosure.

Referring to FIG. 8, the electronic device displays a cancellation-related user interface 810 corresponding to designation of at least one of hardware buttons 727, 728, and 729. The cancellation-related user interface 810 includes an end speech recognition application (END) 811, a go back to previous screen 812, and a cancel all (UNDO) 813. The end speech recognition application 811 may include an identification information to be ended according to an implementation. When the end speech recognition application 811 is designated, the electronic device may end the speech recognition application. When the go back to previous screen 812 is designated, the electronic device may cancel the last task performed among the plurality of tasks for the first user speech and return to the screen right previous to the end screen. When the cancel all 813 is designated, the electronic device may cancel all of the plurality of tasks for the first user speech and return to the start screen before the plurality of tasks are performed. The electronic device may simply return to the intermediate screen or start screen without canceling transmission tasks for the first user utterance.

Figure 9:
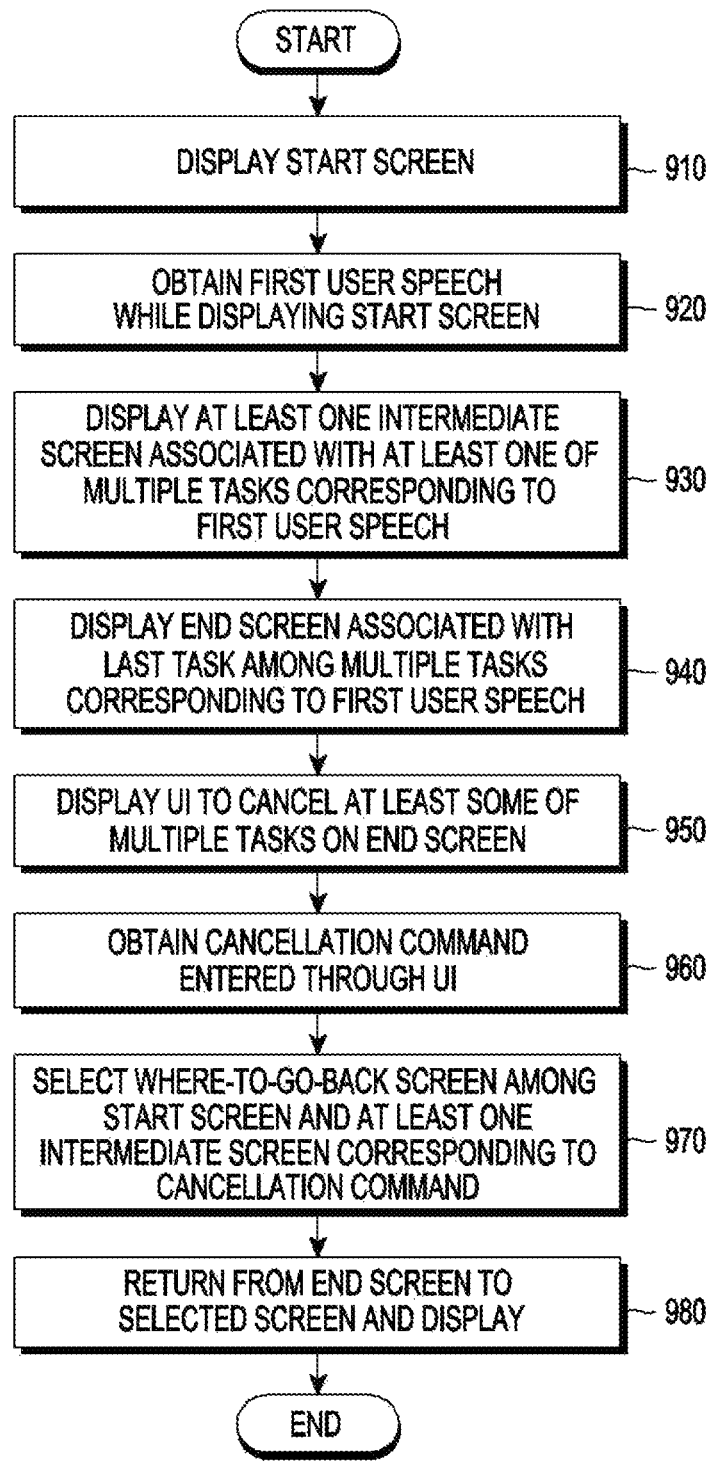
FIG. 9 is a flowchart illustrating a method for operating an electronic device according to an embodiment of the present disclosure.
Figure 10A:
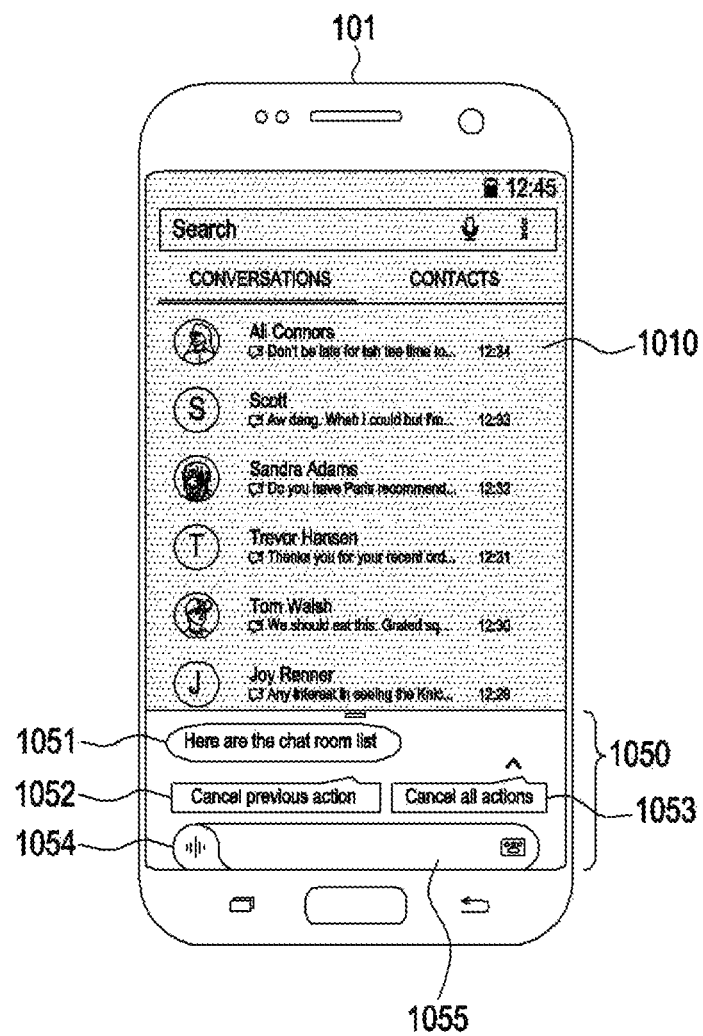
FIG. 10A illustrates an example user interface (UI) for canceling at least one of a plurality of tasks according to an embodiment of the present disclosure.

FIG. 9 is a flowchart illustrating a method for operating an electronic device according to an embodiment of the present disclosure. The embodiment of FIG. 9 is described in further detail with reference to FIG. 10A. FIG. 10A illustrates an example UI for canceling at least one task according to an embodiment of the present disclosure.

Referring to FIGS. 9 and 10A, in step 910, the electronic device 101 displays a start screen.

In step 920, the electronic device 101 obtains first user speech while displaying the start screen.

In step 930, the electronic device 101 displays at least one intermediate screen associated with at least one of a plurality of tasks corresponding to the first user speech. The electronic device 101 may send data for the first user speech to an external server and may receive a command including a plurality of tasks corresponding to the data for the first user speech from the external server. Alternatively, the electronic device 101 may obtain a command including the plurality of tasks corresponding to the data for the first user speech by performing ASR and NLU on the data for the first user speech on its own.

In step 940, the electronic device 101 displays an end screen associated with the last task among the plurality of tasks corresponding to the first user speech.

In step 950, the electronic device 101 displays a UI for canceling at least one of the plurality of tasks on the end screen.

In step 960, the electronic device 101 obtains a cancellation command entered through the UI.

For example, referring to FIG. 10A, the electronic device 101 displays a speech recognition application execution screen 1050 on the end screen 1010. The speech recognition application execution screen 1050 includes information 1051 about existing tasks processed, a cancel some tasks 1052, e.g., a previous action, a cancel all tasks 1053, an indicator 1054 indicating that listening is in progress, and a text input window 1055. When the cancel some tasks 1052 is designated, the electronic device 101 cancels the task (or action) performed immediately before and returns to the prior state. The electronic device 101 may display the screen of the right prior state. When the cancel all tasks 1053 is designated, the electronic device 101 cancels all of the plurality of tasks performed corresponding to a particular user speech, and displays the start screen.

In step 970, the electronic device 101 selects a where-to-go-back screen among the start screen and at least one intermediate screen corresponding to a cancellation command.

In step 980, the electronic device 101 returns from the end screen to the selected screen and displays the selected screen.

The electronic device 101 may send data for user speech to an external server, and corresponding thereto, receive a command including at least one task from the external server. The external server may add a cancellation corresponding task to the command and send the command to the electronic device 101. The cancellation corresponding task refers to a task that the electronic device 101 performs to cancel a task previously performed, when the cancellation command is entered. When the command received from the external server includes the cancellation corresponding task, the electronic device 101 may display the cancel some tasks 1052 or the cancel all tasks 1053.

Figure 10B:
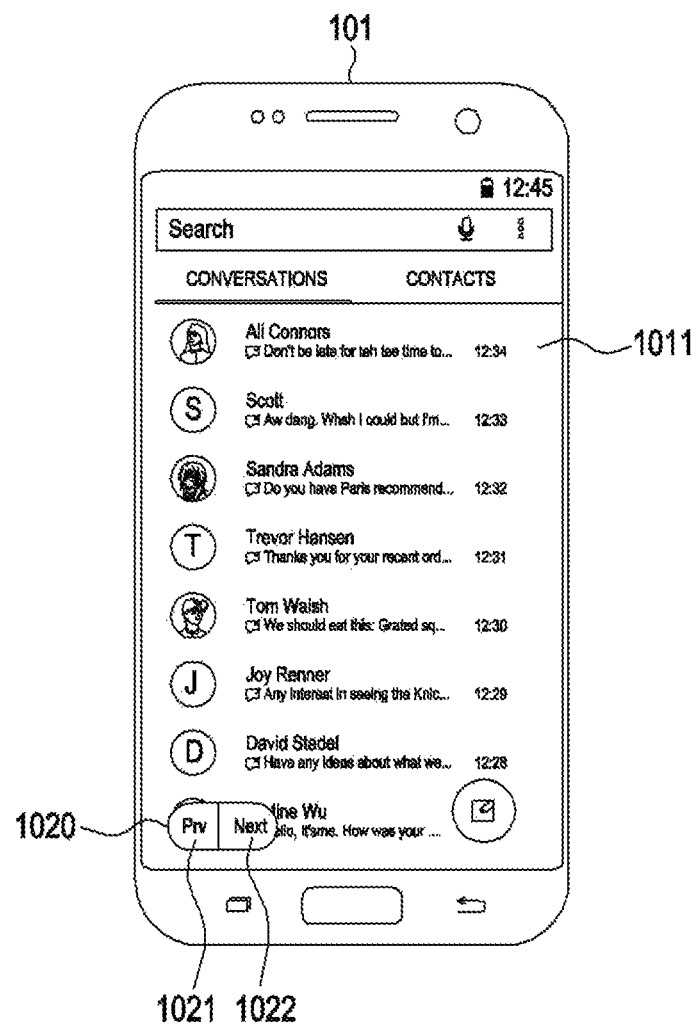
FIGS. 10B to 10D illustrate example UIs for canceling a task according to an embodiment of the present disclosure.
Figure 10C:
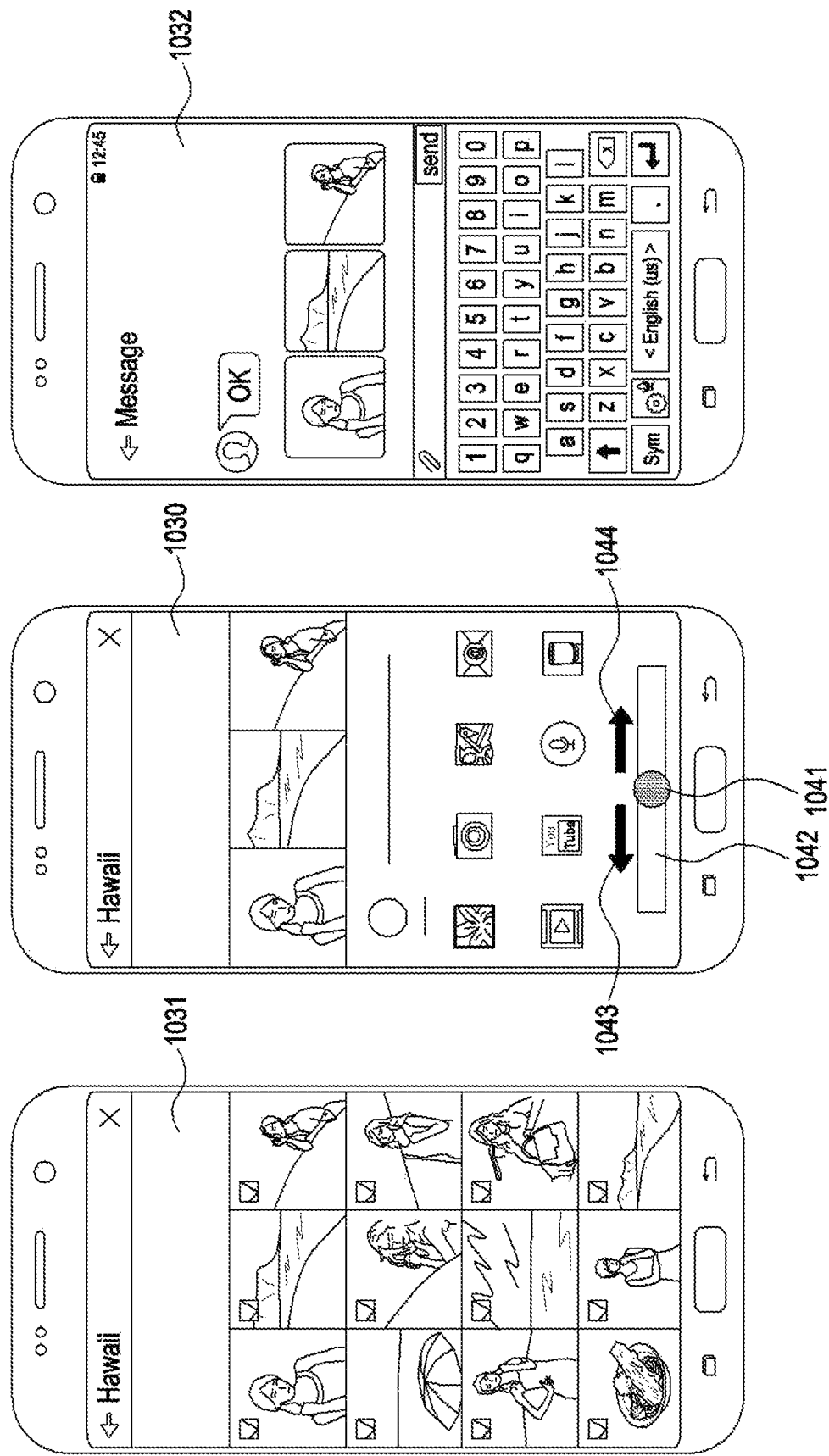
Figure 10D:
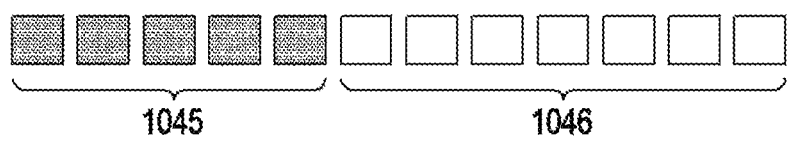

FIGS. 10B to 10D illustrate example UIs for canceling a task according to an embodiment of the present disclosure.

Referring to FIG. 10B, the electronic device 101 displays a UI 1020 for canceling task while displaying an intermediate screen 1011. For example, the electronic device 101 may first display the UI for canceling task on the end screen, and may display an intermediate screen corresponding to a cancel prior operation command. The UI 1020 for canceling task includes a go back to previous operation 1021 and an advance to next operation 1022. Where the UI 1020 for canceling task is displayed on the end screen, the electronic device 101 may deactivate the UI for the advance to next operation 1022.

When the UI 1020 for canceling task is displayed on the start screen, the electronic device 101 may deactivate the UI for the go back to previous operation 1021. When the go back to previous operation 1021 is designated, the electronic device 101 may return to the state immediately before the current state corresponding to the intermediate screen 1011 now being displayed and cancel the task corresponding to the switch from the immediately prior state to the current state.

When the go back to previous operation 1021 is designated, the electronic device 101 may return to the state for obtaining a parameter among at least one state before the current state, but not the state immediately prior to the current state corresponding to the intermediate screen 1011 being currently displayed. For example, when the current state is displaying a text application screen, and the prior state is executing a photo application, a state of designating a search window of the photo application, or a state of filling the search window of the photo application with content to be searched and displaying the same, the state of designating the search window of the photo application may be the state for obtaining the parameter. The state for obtaining parameter may indicate that the electronic device 101 can switch to a next state when there is an additional user speech or user input. For example, a switch from the state of the photo application being executed to the state of designating the search window of the photo application may be made even with no additional user speech or user input, and thus, the state of the photo application being executed might not be the state required to obtain parameter.

For example, the state of designating the search window of the photo application may proceed to the next state, i.e., the state of filling the search window of the photo application with search content and displaying the same, after there is text, i.e., a parameter, to be entered to the search window. Thus, the state of designating the search window of the photo application may be the state for obtaining the parameter. The state for obtaining parameter may be a state in which a screen switch pauses according to an implementation, and thus, this state may be named a temporary arrival state.

When the advance to next operation 1022 is designated, the electronic device 101 advances to the next state, which is the next turn of the current state, and displays a screen corresponding to the next state. According to the control of the go back to previous operation 1021 and the advance to next operation 1022, the electronic device 101 may proceed as the user intended and cancel or perform a task corresponding to a switch between the states.

The electronic device 101 may be configured to provide a cancellation function when the temporary arrival state occurs. For example, when user speech saying, "Send a message to Tom," is entered, the electronic device 101, which may store multiple applications capable of sending messages, may not be permitted or able to determine which application it is to use to send a message. Accordingly, the electronic device 101 should obtain a parameter to process the task corresponding to the user speech. In this case, the electronic device 101 may cancel all or some tasks and send a request for selecting an application (i.e., a request for entering a parameter). That is, the electronic device 101 may display a screen corresponding to the state for obtaining parameter. FIG. 10C illustrates example UIs for canceling a task according to an embodiment of the present disclosure.

Referring to FIG. 10C, the electronic device displays a UI including a progress bar 1042 and an indicator 1041 to cancel or perform a task on a first screen 1030. The electronic device displays the UI to cancel or perform task on any screen (e.g., the start screen, an intermediate screen, or end screen). For example, as the user makes a drag input on the indicator 1041, the electronic device may display as if the indicator 1041 travels on the progress bar 1042. Upon detecting a first command to move the indicator 1041 in a first direction 1043, the electronic device returns to a state prior to the current state corresponding to the first screen 1030 and displays a second screen 1031 corresponding to the prior state. Further, the electronic device may cancel the task corresponding to the state switch from the prior state to the current state.

Upon detecting a second command to move the indicator 1042 in a second direction 1044, the electronic device proceeds to a state next to the current state corresponding to the first screen 1030 and displays a third screen 1032 corresponding to the next state. Further, the electronic device may cancel the task corresponding to the state switch from the current state to the next state. Although FIG. 10C simply illustrates the first screen 1030, the second screen 1031 which is the prior screen, and the third screen 1032 which is the next screen, the electronic device may provide a UI to enable navigation for more than three screens.

The electronic device may also be configured to provide only screens that may be canceled for tasks, and thus, correspond to reversible states, but not to provide screens that may not be canceled for tasks, and thus, correspond to irreversible states. For example, the electronic device may be configured to display screens corresponding to the state for obtaining a parameter (e.g., the temporary arrival state). The electronic device may be configured to abstain from displaying screens corresponding to states not for obtaining parameters, e.g., an automatic proceeding state. The electronic device may also be configured to display screens set to be partially canceled, even when they are not for obtaining parameters. The electronic device may also be configured to display screens where a switch occurs between applications.

FIG. 10D illustrates an example UI for canceling a task according to an embodiment of the present disclosure.

Referring to FIG. 10D, the electronic device displays a plurality of elements 1045 and 1046 on any screen. Each of the plurality of elements 1045 and 1046 may correspond to a respective one of a plurality of states. When any one element is selected, the electronic device may proceed or return in the state corresponding to the selected element, and the electronic device may cancel or proceed with at least one task corresponding to the switch from the current state to the state corresponding to the switch to the selected element. The electronic device may display the element 1046 for reversible states and the element 1045 for irreversible states separately from each other. The irreversible states are states to which the current state cannot return. For example, when sending particular data to another electronic device cannot be canceled, the corresponding state or task may be denoted as irreversible. Although the element 1045 for irreversible states is selected, the electronic device does not return to the corresponding state and may output a message indicating that cancellation of the task is impossible.

The electronic device 101 may also switch from a current state to a prior state or a next state corresponding to detection of a user input, e.g., a left flick or right flick, while displaying no UI.

Figure 11:
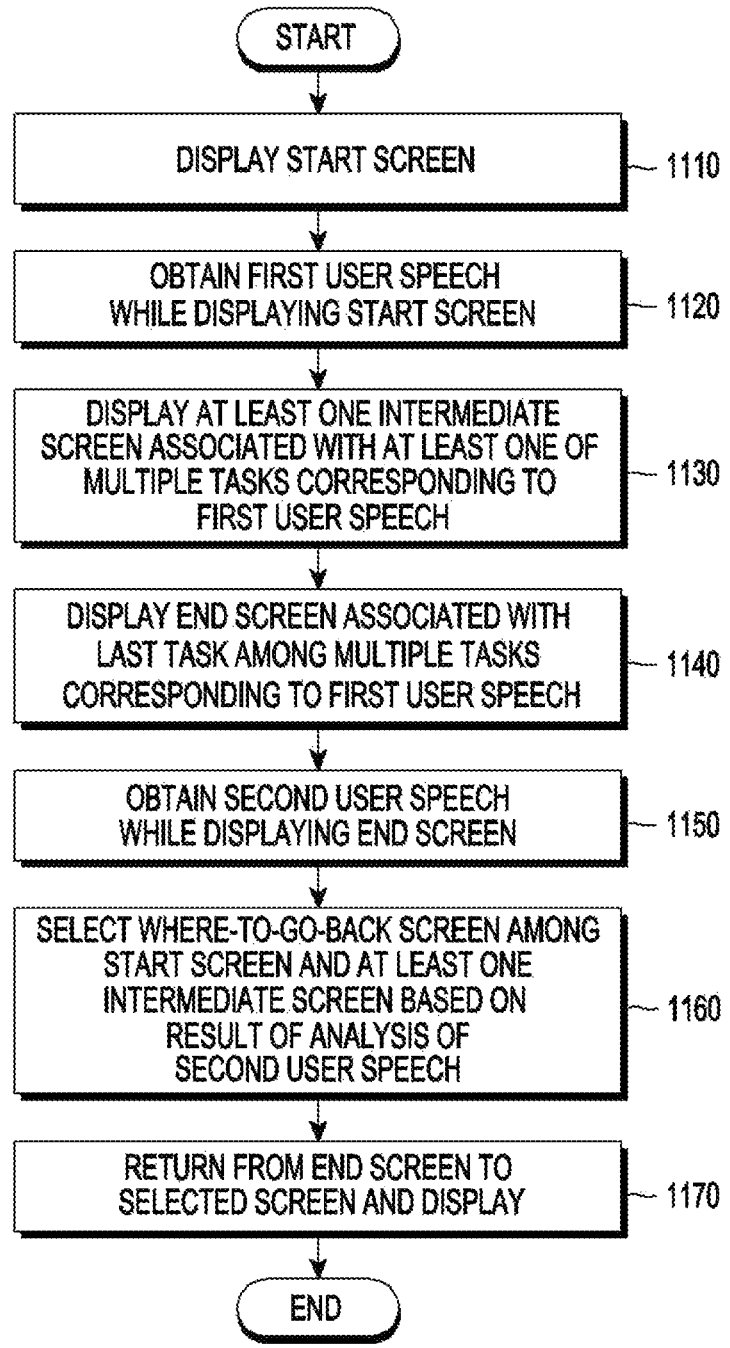
FIG. 11 is a flowchart illustrating a method for operating an electronic device to cancel a task in response to user speech according to an embodiment of the present disclosure.
Figure 12:
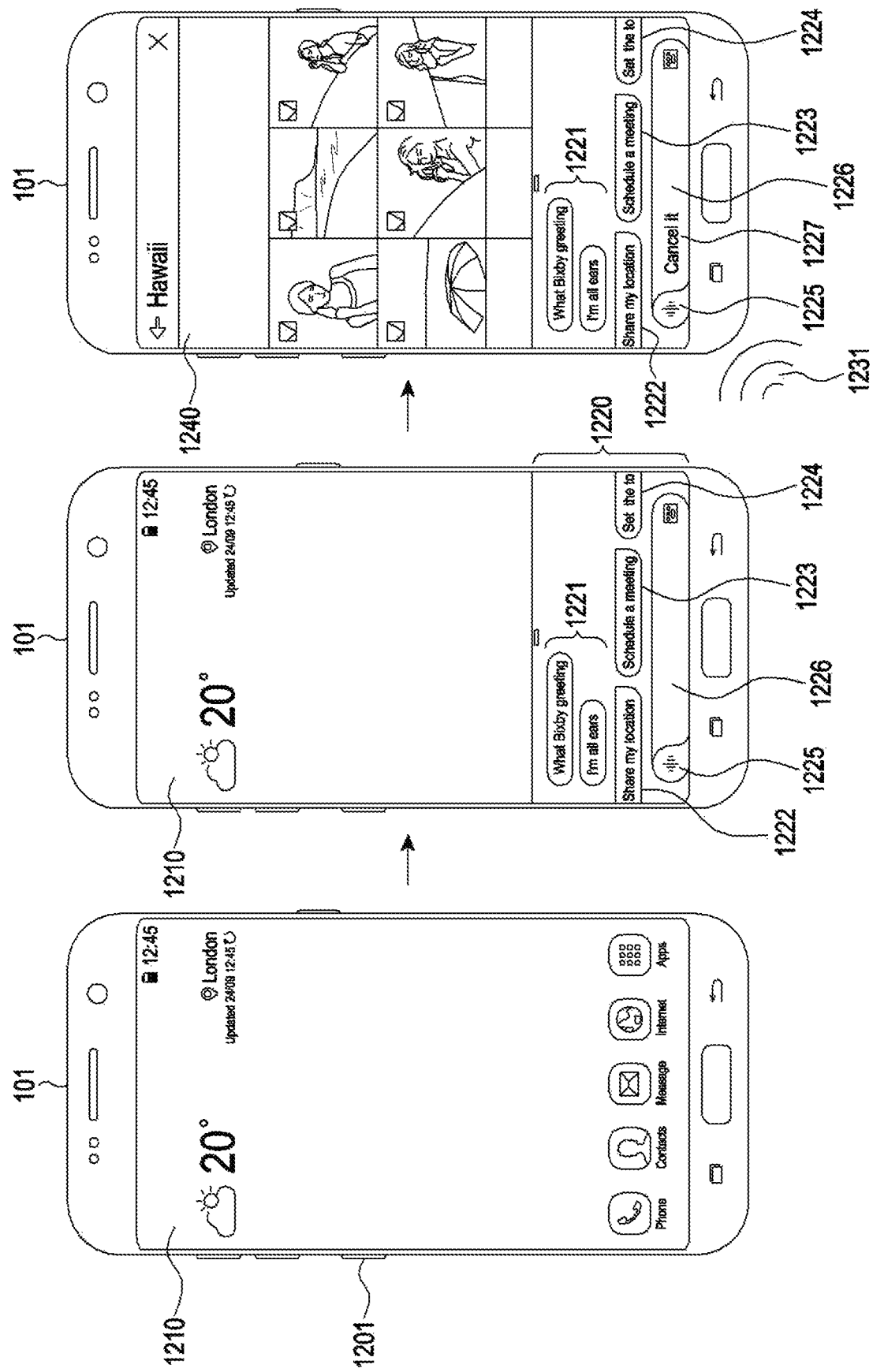
FIG. 12 illustrates example screen images displayed when canceling a task as per user speech according to an embodiment of the present disclosure.

FIG. 11 is a flowchart illustrating a method for operating an electronic device to cancel a task in response to user speech according to an embodiment of the present disclosure. The method of FIG. 11 is described in further detail with reference to FIG. 12. FIG. 12 illustrates example screen images displayed when canceling a task in response to user speech according to an embodiment of the present disclosure.

Referring to FIGS. 11 and 12, in step 1110, the electronic device 101 displays a start screen.

In step 1120, the electronic device 101 obtains first user speech while displaying the start screen. For example, the electronic device 101 may activate the microphone corresponding to a hardware button 1201 being pressed. The electronic device 101 may obtain the first user speech through the microphone while the hardware button 1201 remains pressed. The hardware button 1201 may be disposed on a side surface of the housing of the electronic device 101.

In step 1130, the electronic device 101 displays at least one intermediate screen associated with at least one of a plurality of tasks corresponding to the first user speech.

In step 1140, the electronic device 101 displays an end screen associated with the last task among the plurality of tasks corresponding to the first user speech. That is, the electronic device 101 sequentially performs all of the tasks in their respective turns. For example, as illustrated in FIG. 12, the electronic device 101 displays a home screen or launcher application execution screen as the end screen 1210.

In step 1150, the electronic device 101 obtains second user speech while displaying the end screen 1210. For example, the electronic device 101 may display a speech recognition application execution screen 1220 on the end screen 1210 corresponding to the hardware button 1201 being pressed. The speech recognition application execution screen 1220 includes an application introduction message 1221, hints 1222, 1223, and 1224, an indicator 1225 indicating that listening is in progress, and a display window 1226 for displaying text or a task corresponding to an obtained user utterance. The electronic device 101 may obtain the second user speech 1231 through the microphone while the hardware button 1201 remains pressed. Here, the second user speech 1231 may be, "Cancel it."

In step 1160, the electronic device selects a where-to-go-back screen among the start screen and at least one intermediate screen based on a result of analyzing the second user speech 1231. That is, the electronic device 101 selects a state to which it is to return or a task to be canceled. Alternatively, the electronic device 101 may send data for the second user speech 1231 to an external server, which performs ASR and NLU on the received data for the second user speech 1231 to determine the state to which it is to return, the task to be canceled, or the where-to-go-back screen. The external server may also determine the corresponding cancellation task, i.e., the cancellation task corresponding to the "Cancel it" of the second user speech 1231 based on the tasks previously performed. For example, when the task previously performed is "display the results of searching for photos taken in Hawaii," the external server may determine that "designating the search window in the photo application without displaying the results of searching for photos taken in Hawaii" is the corresponding cancellation task.

The external server may store a history of tasks sent to the electronic device 101. When a cancellation command is entered, the external server may refer to the previously stored history of tasks to determine at least one of the corresponding cancellation task, the task to be canceled, the where-to-go-back screen, and the state to which to return. The external server may send a result of the determination to the electronic device 101.

In step 1170, the electronic device 101 returns from the end screen 1210 to the selected screen 1240 and displays the selected screen 1240. The electronic device 101 may perform ASR and NLU on the second user utterance 1231 inside the electronic device 101 to cancel at least some of the tasks already performed.

The electronic device 101 may cancel all or only some of the tasks already performed as per a result of analyzing the second user utterance 1231. For example, the electronic device 101 may cancel all of the tasks already performed for the user speech saying, "Cancel it" or cancel the last one of the tasks already performed for the user speech "previous screen" and returning to the right prior state to display the screen corresponding to the right prior state.

Figure 13:
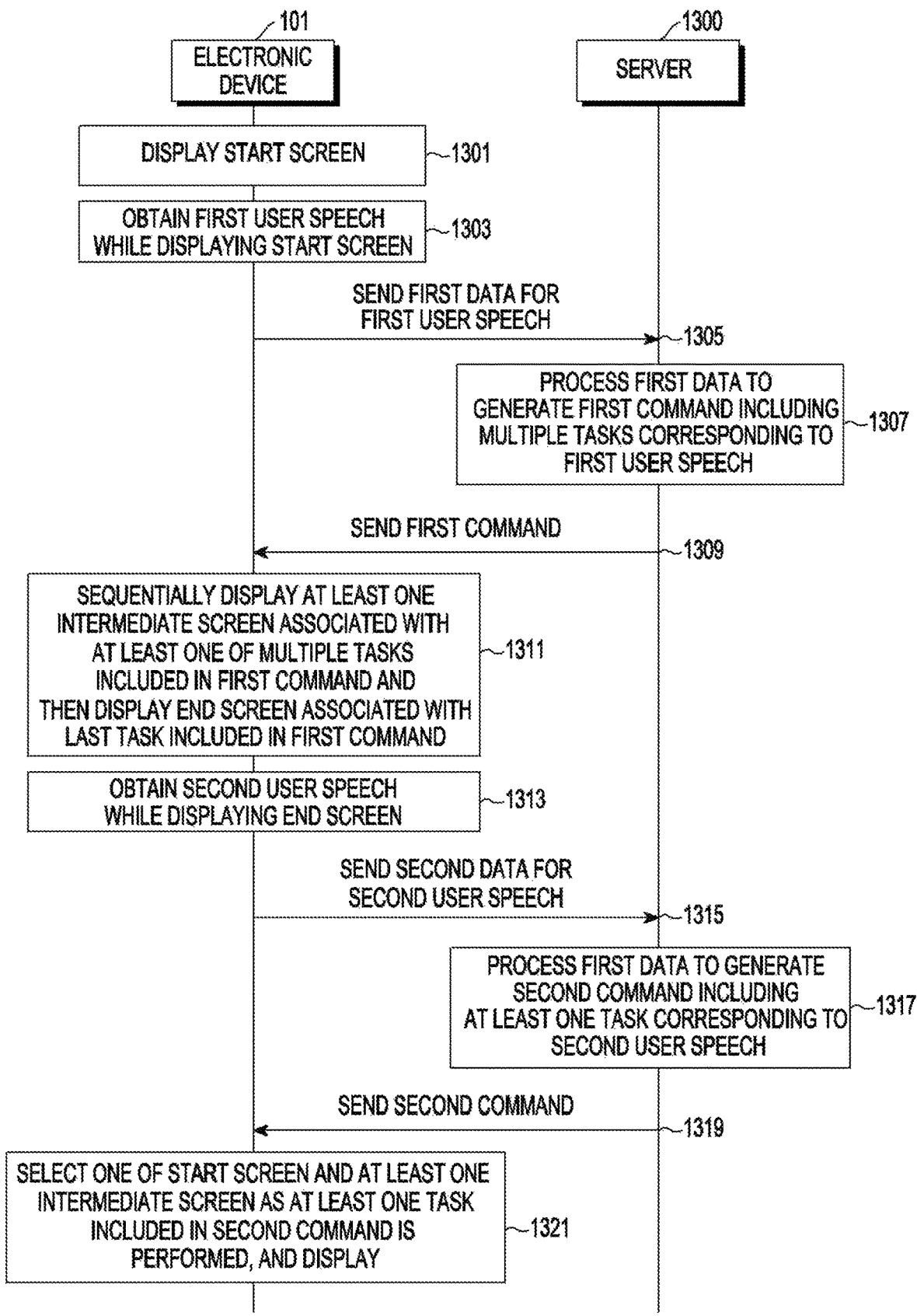
FIG. 13 is a signal flow diagram illustrating operations of an electronic device and an external server according to an embodiment of the present disclosure.
Figure 14:
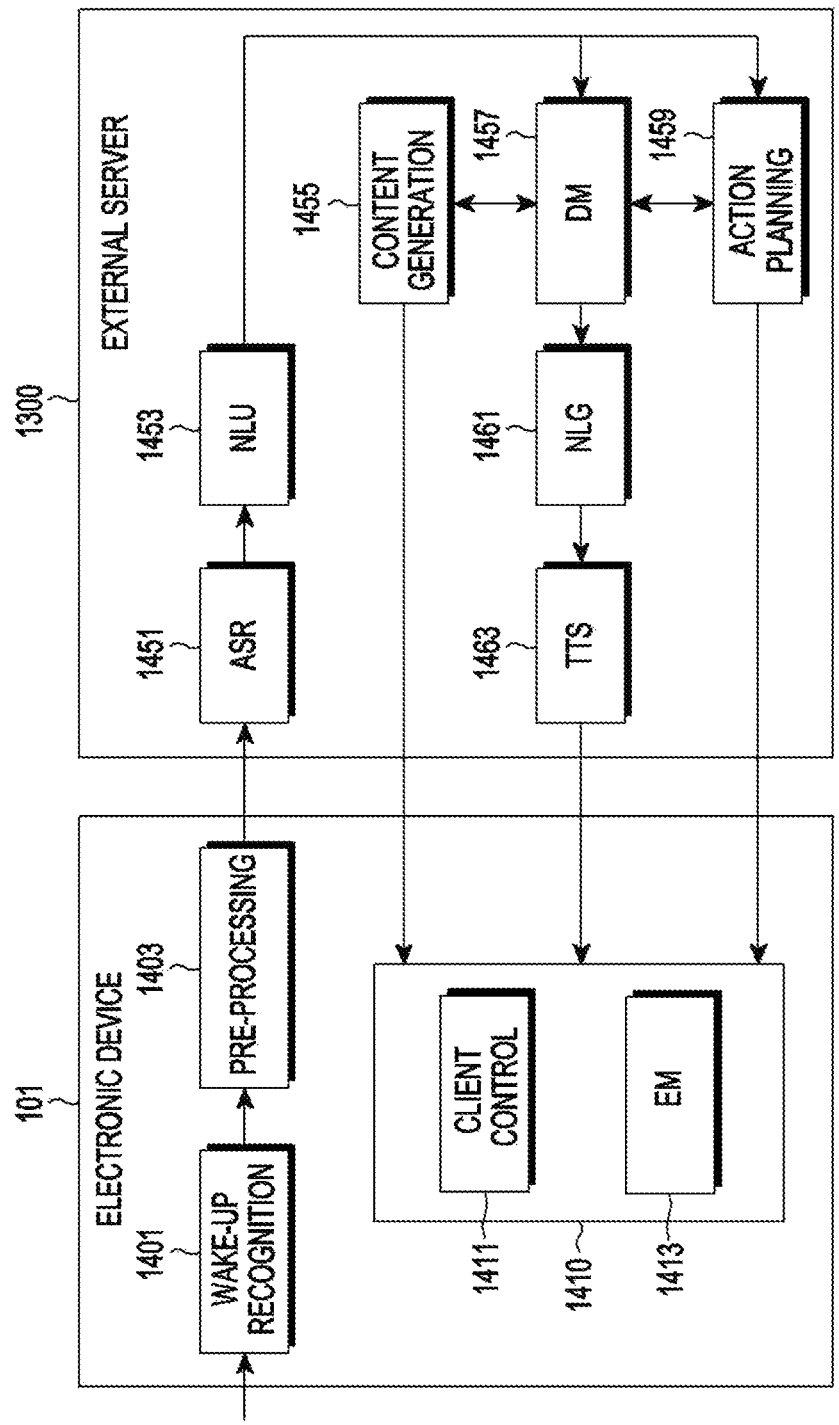
FIG. 14 illustrates a process for operating an electronic device and a server according to an embodiment of the present disclosure.

FIG. 13 is a flowchart illustrating operations of an electronic device and an external server according to an embodiment of the present disclosure. The method of FIG. 13 will be described in greater detail with reference to FIG. 14. FIG. 14 is a signal flow diagram illustrating a process for operating an electronic device and a server according to an embodiment of the present disclosure.

Referring to FIGS. 13 and 14, in step 1302, the electronic device 101 displays a start screen.

In step 1303, the electronic device 101 obtains first user speech while displaying the start screen. For example, as illustrated in FIG. 14, a wake-up recognition manager 1401 may obtain the first user speech and execute a speech recognition application corresponding thereto. The electronic device 101 includes the wake-up recognition manager 1401, a pre-processing manager 1403, and a control manager 1410. The control manager 1410 includes a client control manager 1411 or an executor manager (EM) 1413.

An external server 1300 includes an ASR manager 1451, an NLU manager 1453, a dialogue manager (DM) 1457, a natural language generation (NLG) manager 1461, a text-to-speech (TTS) manager 1463, a content generating manager 1455, and an action planning manager 1459. A system including at least one of the NLU manager 1453, the DM 1457, the NLG manager 1461, the TTS manager 1463, the content generating manager 1455, and the action planning manager 1459 may be referred to as an intelligence system.

The wake-up recognition manager 1401 may use a low-power processor to receive a user input to execute the speech recognition application. Wake-up command recognition may be implemented in a micro-processor such as an audio codec connected with a microphone. When a voice input matching a wake-up keyword is received, the electronic device 101 may recognize the user's intent to use the speech recognition service and deliver data for the user speech to the external server 1300.

The pre-processing manager 1403 may process the user speech into an electrical signal to generate data for the user speech and deliver the data to the ASR manager 1451. For example, the pre-processing manager 1403 may include an adaptive echo canceler (AEC) module, a noise suppression (NS) module, an end-point detection (EPD) module, and an automatic gain control (AGC) module. The wake-up recognition manager 1401 may provide the data for the first user speech to the pre-processing manager 1403.

In step 1305, the electronic device 101 sends first data for the first user speech.

In step 1307, the external server 1300 processes the first data to generate a first command including a plurality of tasks corresponding to the first user speech. For example, the ASR manager 1451 may process ASR on the data for the first user utterance to obtain first text. The NLU manager 1453 may generate an intent and a keyword (slot) corresponding to the first text based on predetermined rules or statistical features. The NLU manager 1453 may determine a response corresponding to the first user speech based on the intent or keyword. The response may be a dialog-type answer (in the form of a sentence), various types of content (multimedia material that may contain image, sound or text), information indicating the function that the electronic device 101 is to perform, or a combination thereof. For example, the content generating manager 1455 may gather, from the outside, or generate various types of content to be played on the electronic device 101 and provide the same to the electronic device 101. When the function that the electronic device 101 is to perform is determined based on the intent or keyword, the action planning manager 1459 may determine an action sequence that the electronic device 101 is to perform, corresponding to the intent or keyword. The action planning manager 1459 may also be named a path rule planner according to an implementation. The action sequence may include one or more functions that applications are to perform in order and one or more parameters that are to be used for the functions.

In step 1309, the external server 1300 sends a first command including at least one of various responses to the electronic device 101. The first command may include a plurality of actions (e.g., a plurality of tasks).

In step 1311, the electronic device 101 sequentially displays at least one intermediate screen associated with at least one of the plurality of tasks included in the first command and then displays an end screen associated with the last task included in the first command. While performing the plurality of tasks contained in the first command, the electronic device 101 may switch and display screens according to the results of performing the tasks. Specifically, upon receiving the first command containing at least one of the dialog-type answer, content, or screen, the electronic device 101 may output each response in an appropriate form.

When the electronic device 101 receives the action sequence, the EM 1413 performs a task per operation based on one or more functions and parameters included in the action sequence and output a per-operation context of performing task. Accordingly, the electronic device 101 may switch from the start screen to at least one intermediate screen and may lastly display the end screen.

In each operation, the EM 1413 may request the application corresponding to each function to perform the function and receive a report for the result of executing the function from the application. For example, the EM 1413 sequentially sends request for executing action to applications (e.g., the client control manager 1411) corresponding to their respective operations based on the action sequence. Upon receiving the request, the application executes the function corresponding to the action and delivers the result or context of execution to the EM 1413.

Table 2 represents an example of a request for executing an action according to an embodiment of the present disclosure.

TABLE 2

Execute Gallery app, return NULL
Execute photo search screen, return NULL
Display results of search for Hawaii, return ArrayList<>
Select photos displayed on search result window, return ArrayList<>
Execute send via screen, return ArrayList<>
Execute chat window with mom of message app, return NULL
Send message to mom, return NULL The action execution request shown in Table 2 includes an action execution request for executing the gallery application, executing a photo search screen, displaying results of searching for Hawaii, selecting photos displayed on a search result window, executing a screen for sending selected photos, executing a message application, and executing a chat window with mom who is the chat partner, and sending a message to the chat partner.

For example, the DM 1457 may manage the user's chat history and manage the slot (task parameter). The DM 1457 may determine an action based on the intent/slot grasped through the NLU manager 1453. For example, the DM 1457 may determine whether the slot identified by the NLU manager 1453 is capable of performing a subsequent task while managing the slot (task parameter) included in the identified intent.

When the slot to perform task is insufficient, the DM 1457 may send a request for information for the slot. The DM 1457 may manage the dialog history (dialog flow) and manage the dialog status of the current chat window. The DM 1457 may determine whether to utilize information about the previous dialog or to make a new inquiry depending on the dialog status. Further, the DM 1457 may send a request for information, to the user, or exchange feedback for user inputs. The DM 1457 may manage the task flow. The DM 1457 may also determine what operations the system can perform by invoking an application or service.

Further, upon receiving a cancellation command, the DM 1457 may identify or generate a corresponding cancellation task based on a task previously stored. For example, the external server 1300 may manage information about generated tasks and user speech per at least one of the client device (e.g., the electronic device 101) or user account.

The NLG manager 1461 may represent a user input, a result of natural language processing, a result of executing service, and/or an output in a natural language form that the user may appreciate. For example, the NLG manager 1461, when the user performs some natural language input, may perform paraphrasing on the user input. Further, the NLG manager 1461 may perform natural language processing on the user input and inform what the user intended and that it is identifying the same according to the identified intent.

As another example, the NLG manager 1461, after obtaining a service result from an actual service (app/CP), after the natural language processing, may display the result while generating and explaining brief information about the result. Information from the NLG manager 1461 may be provided to the TTS manager 1463 and may be synthesized into a voice signal that may then be provided.

As set forth above, the electronic device 101 may process user speech and generate an action (or task) itself. In this case, the electronic device 101 may include at least one of the components of the server 1300.

In step 1313, the electronic device 101 obtains second user speech while displaying the end screen.

In step 1315, the electronic device 101 sends second data for the first user speech to the external server 1300. The electronic device 101 may manage a task execution history.

In this case, the electronic device 101 may store information about the task contained in the first command. When the electronic device 101 sends second data for second user speech to the external server 1300, the electronic device 101 may send information about the task to the external server 1300. When processing the second data, the external server 1300 may refer to the task included in the first command to determine whether the second data is a cancellation command or determine the task corresponding to the cancellation command based on the task contained in the first command.

In step 1317, the external server 1300 processes the second data to generate a second command including at least one task corresponding to the second user speech. For example, when the second user speech is a cancellation command, the DM 1457 may generate the second command including the cancellation task corresponding to the second user speech based on the task generated corresponding to the first user speech.

As set forth above, when the electronic device 101 manages the task execution history, the external server 1300 may receive information about the previously performed task, along with the cancellation command, from the electronic device 101. The external server 1300 may determine whether the second data newly received is a cancellation command based on the information about the previously performed task. When the second data is a cancellation command, the external server 1300 may determine the cancellation corresponding task based on the information about the previously performed task.

In step 1319, the external server 1300 sends the second command.

In step 1321, the electronic device 101 selects and displays one of the start screen and at least one intermediate screen as it performs at least one task included in the second command. As the electronic device 101 performs at least one task contained in the second command, the electronic device 101 may cancel at least some of the tasks performed corresponding to the first user speech.

When the electronic device 101 itself processes the user speech without communication with the external server 1300, the electronic device 101 may determine that the second user speech includes a cancellation command, and accordingly, the electronic device 101 may refer to the tasks (e.g., the tasks corresponding to the first user speech) previously performed and cancel at least some of the tasks previously performed.

As set forth above, the electronic device 101 may cancel at least some of tasks previously performed according to a cancellation command implementable in various forms, such as a hardware button, UI control, or user speech input, and thus, may return to any one of the start screen or intermediate screen. That is, the electronic device 101 may return to at least one of the state corresponding to the front surface or the state corresponding to the intermediate screen.

Figure 15:
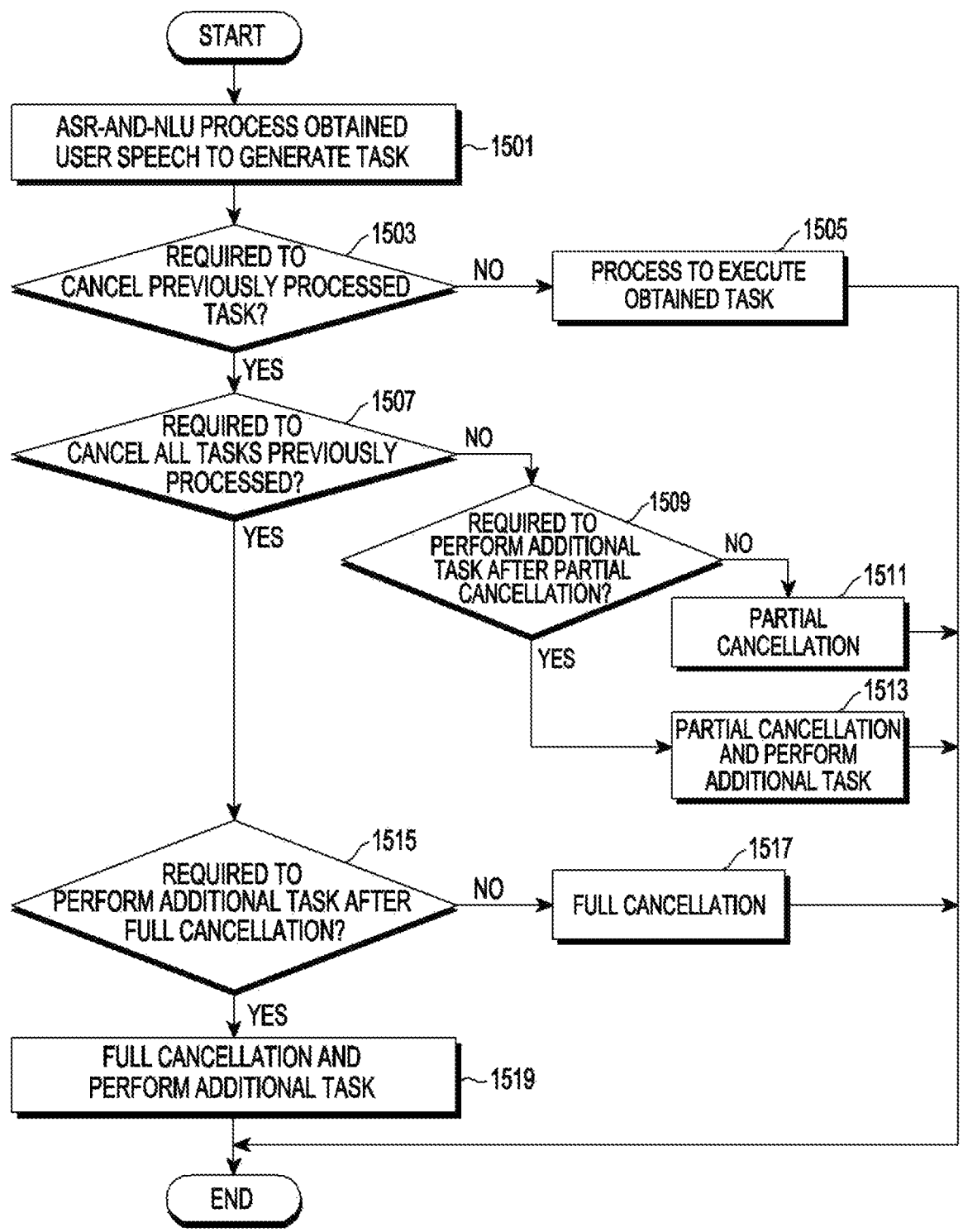
FIG. 15 is a flowchart illustrating a method for operating an electronic device according to an embodiment of the present disclosure.

FIG. 15 is a flowchart illustrating a method for operating an electronic device according to an embodiment of the present disclosure.

Referring to FIG. 15, in step 1501, the electronic device obtains a task by performing ASR and NLU on obtained user speech. As described above, the electronic device may send data for the user speech to an external server and receive a task generated by the external server, or the electronic device may perform ASR and NLU on the user speech to generate a task.

In step 1503, the electronic device determines whether cancellation is required for tasks previously processed.

According to a result of the NLU processing, the electronic device may determine whether there is an intent to cancel at least some of the tasks processed before the user speech. When cancellation is not required for the tasks previously processed, the electronic device processes the obtained task to be executed in step 1505. However, when cancellation is required for the tasks previously processed in step 1503, the electronic device determines whether all of the tasks previously processed are required to be canceled in step 1507. According to a result of the NLU processing, the electronic device determines whether all or some of the tasks previously processed are requested to cancel.

Upon determining that only some of the tasks previously processed are requested to cancel in step 1507, the electronic device determines whether performing an additional task is required after the partial cancellation in step 1509.

Upon determining that performing an additional task is not required in step 1509, the electronic device performs partial cancellation in step 1511.

However, upon determining that performing an additional task is required in step 1509, the electronic device performs partial cancellation and an additional task in step 1513. When tasks obtained as a result of the NLU processing include the task of canceling some of the tasks previously processed and the additional task performed after the cancellation, the electronic device may perform the additional task after the partial cancellation. For example, when the tasks previously performed are "executing the photo application," "search for photos taken in Hawaii," and "send searched photos to Uma," and the obtained user speech is "Not Hawaii but Hooamdong," the electronic device may cancel some "search for photos taken in Hawaii" and/or "send searched photos to Uma," of the tasks previously processed and then perform additional tasks, e.g., "search for photos taken in Hooamdong" and "send searched photos to Uma."

When all of the tasks previously processed are required to be canceled in step 1507, the electronic device determines whether additional tasks are required to perform after canceling all the tasks in step 1515.

Upon determining that performing additional tasks is not required in step 1515, the electronic device performs full cancellation in step 1517.

However, upon determining that performing additional tasks is required, the electronic device performs full cancellation and additional tasks in step 1519. When tasks obtained as a result of the NLU processing include the task of canceling all of the tasks previously processed and the additional task performed after the cancellation, the electronic device may perform the additional task after the full cancellation. For example, when the tasks previously processed are "execute the photo application," "search for photos taken in Hawaii," and "send searched photos to Uma," and the obtained user speech is "No, don't send photos, send text only," the electronic device, after canceling all of the tasks previously processed, may perform additional tasks, "execute the message application" and "send a message to Uma."

Figure 16:
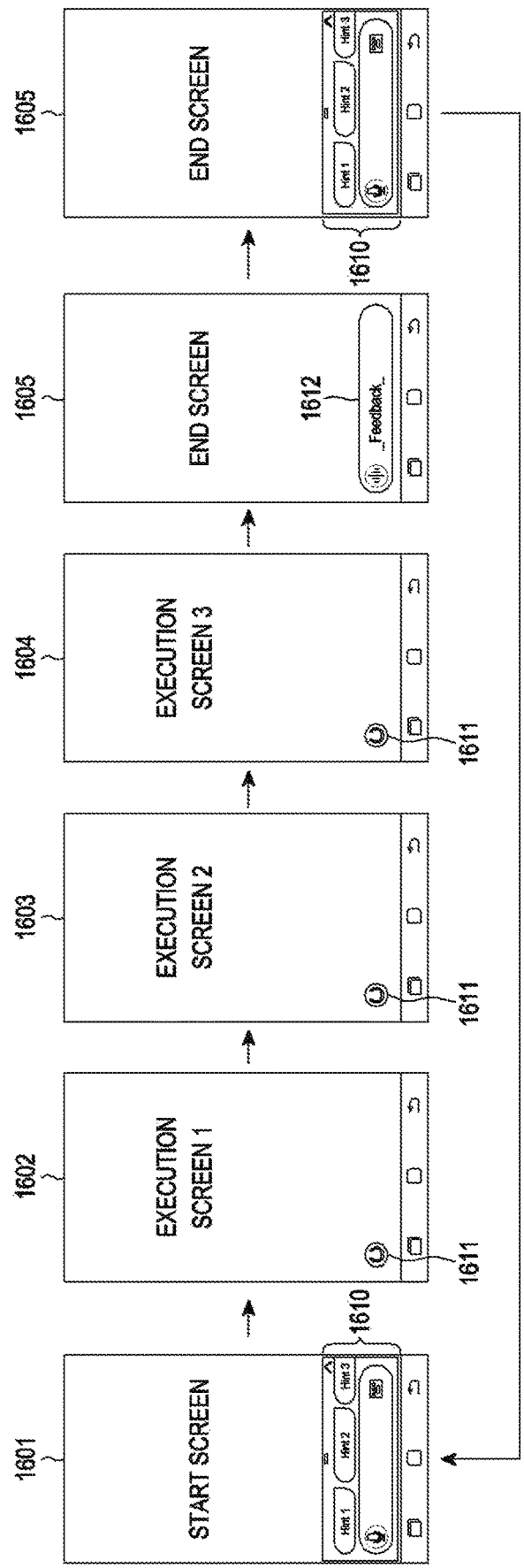
FIG. 16 illustrates a process of canceling all tasks according to an embodiment of the present disclosure.

FIG. 16 illustrates a process of canceling all tasks according to an embodiment of the present disclosure.

Referring to FIG. 16, the electronic device obtains a command to execute a speech recognition application while displaying a start screen 1601. In response, the electronic device displays a speech recognition application execution screen 1610 on the start screen 1601. The electronic device then obtains user speech. For example, the electronic device may obtain user speech saying, "show me photos taken in Hawaii." Thereafter, the electronic device obtains a plurality of tasks corresponding to the user speech. The electronic device performs the plurality of tasks while changing states. That is, the electronic device sequentially transition through a plurality of states while performing the tasks in their respective turns. For example, the electronic device switches the start screen 1601 to a first execution screen 1602 and displays the first execution screen 1602 by performing a first task among the plurality of tasks. The electronic device sequentially displays a second execution screen 1603, a third execution screen 1604, and an end screen 1605 by sequentially performing a second task and a third task among the plurality of tasks.

While the screens switch as the plurality of states change for the received user speech, the electronic device displays an indicator 1611 indicating that the task is being performed. After performing the last task, the electronic device displays feedback 1612 on the end screen 1610. The feedback 1612 may include information about the task or text corresponding to the user speech or a result of performing the task. The electronic device displays a speech recognition application execution screen 1610 while displaying the end screen 1605.

The electronic device obtains user speech including a cancellation command, e.g., "Cancel it." In response, the electronic device cancels the plurality of tasks already performed, and returns to the initial state. Accordingly, the electronic device displays the start screen 1601.

As the plurality of tasks already performed are canceled, variations generated during the screen switch and pieces of information managed in the memory may return to the initial state.

Although FIG. 16 illustrates an embodiment in which the electronic device displays the end screen 1605 and immediately displays the start screen 1601, this is merely an example. The electronic device may sequentially display the end screen 1605, the third execution screen 1604, the second execution screen 1603, the first execution screen 1602, and then the start screen 1601. That is, the electronic device may return the screens in the reverse order of the order in which the screens changed when the tasks were performed.

The electronic device may display only screens where information (e.g., parameters) are entered in the reverse order if entry of pieces of information may be undone.

Alternatively, the electronic device may cancel the execution of the speech recognition application while maintaining the end screen 1605.

Figure 17:
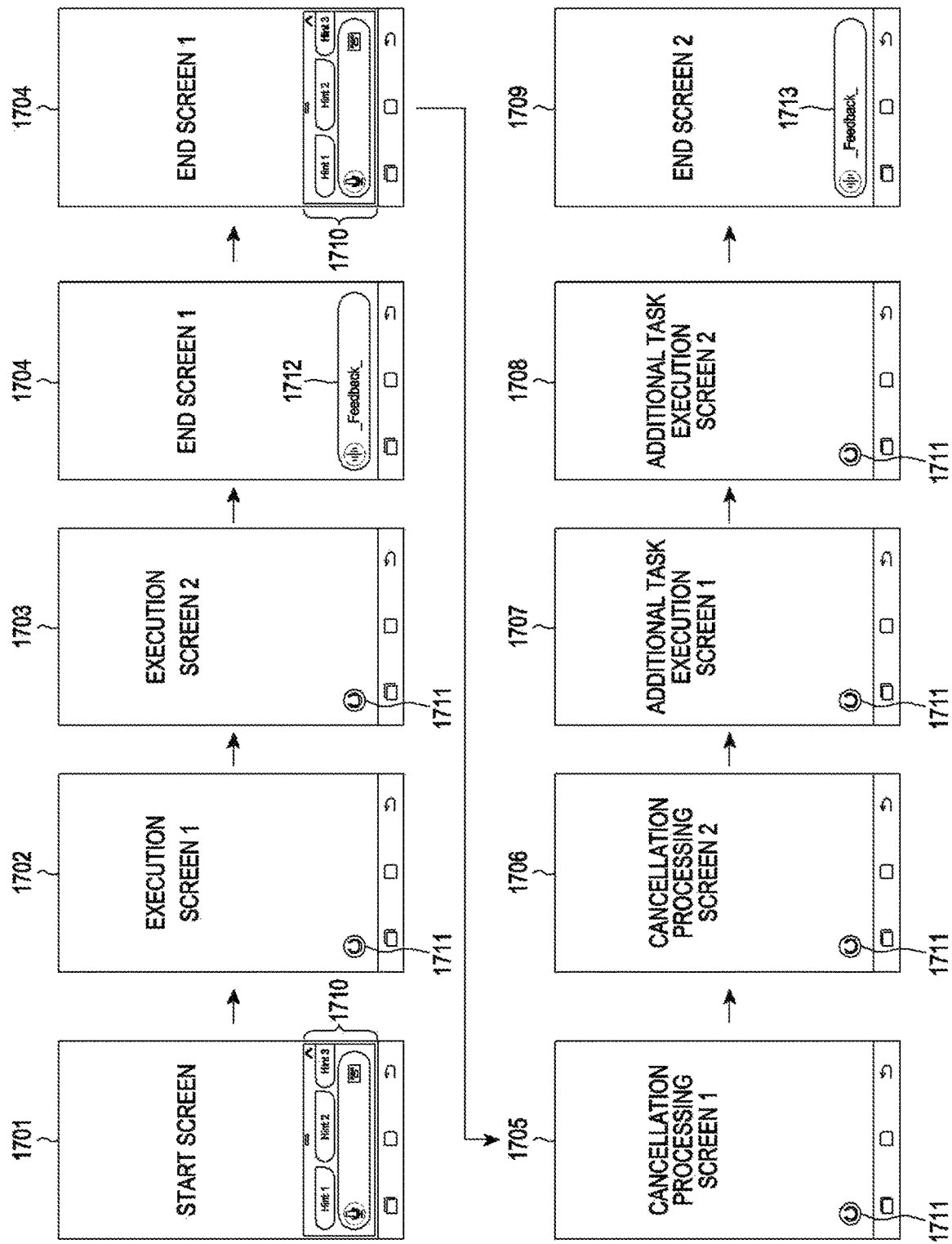
FIG. 17 illustrates a process of canceling all tasks and executing an additional task according to an embodiment of the present disclosure.

FIG. 17 illustrates a process of canceling all tasks and executing an additional task according to an embodiment of the present disclosure.

Referring to FIG. 17, the electronic device obtains a command to execute a speech recognition application while displaying a start screen 1701. In response, the electronic device displays a speech recognition application execution screen 1710 on the start screen 1701. The electronic device obtain user speech. For example, the electronic device may obtain user speech saying, "Find Honggildong chat room." However, the electronic device or an external server may ASR-process the user speech to obtain text reading "block Honggildong chat room." The electronic device or external server may NLU-process the text "block Honggildong chat room" to obtain a plurality of tasks, "execute a message application" and "block Honggildong chat room." For example, when the external server obtains the plurality of tasks, the external server may send the plurality of tasks to the electronic device, which may perform the plurality of tasks while changing states.

The electronic device 101 sequentially switches and display the start screen 1701, the first execution screen 1702, the second execution screen 1703, and the first end screen 1704 by sequentially performing the plurality of tasks. While the screens switch as the plurality of states change for the user speech, the electronic device displays an indicator 1711 indicating that the task is being performed. After performing the last task, the electronic device displays feedback 1712 on the end screen 1704. The electronic device displays a speech recognition application execution screen 1710 while displaying the end screen 1704.

The electronic device may obtain user speech including a cancellation command saying, "No. Find Honggildong chat room," while displaying the end screen 1704. The electronic device or external server may ASR-and-NLU process the user speech to cancel all of the plurality of tasks previously performed and obtain additional tasks, e.g., "execute a message application" and "enter Honggildong chat room."

While canceling the plurality of tasks already performed, the electronic device displays a plurality of cancel processing screens 1705 and 1706 corresponding to canceling the tasks. While sequentially performing the additional tasks, the electronic device sequentially displays additional task execution screens 1707 and 1708 and displays the second end screen 1709. The electronic device displays an indicator 1711 indicating that the tasks are being performed while switching the cancel processing screens 1705 and 1706 and the additional task execution screens 1707 and 1708. The electronic device displays feedback 1713 associated with a result of performing the additional tasks.

Figure 18:
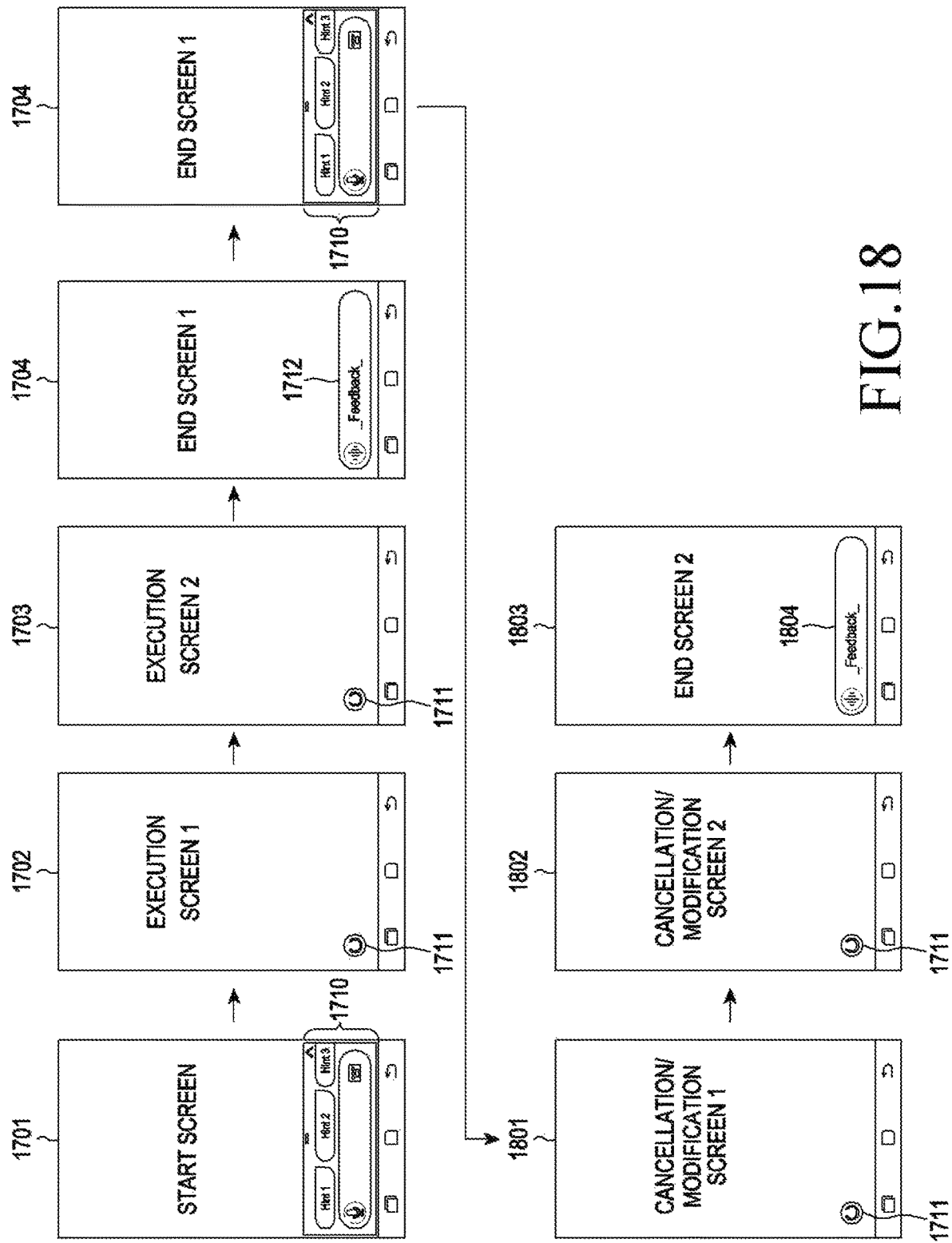
FIG. 18 illustrates a process of canceling all tasks and executing an additional task according to an embodiment of the present disclosure.

FIG. 18 illustrates a process of canceling all tasks and executing an additional task according to an embodiment of the present disclosure.

Referring to FIG. 18, the electronic device obtains user speech including a cancellation command while displaying the first end screen 1704. The process of the electronic device switching from the start screen 1701 to the first end screen 1704 has already been described above in connection with FIG. 17, and therefore, a repetitive description thereof is omitted below.

The electronic device displays screens 1801 and 1802 for simultaneously making modifications by performing additional tasks and canceling the tasks already performed, corresponding to the user speech including the cancellation command. For example, when the electronic device first obtains the user speech "create a playlist in the name of Flow" and performs tasks corresponding thereto, and thereafter, obtains user speech including a cancellation command saying, "Not Flow but Flower," the electronic device cancels all of the tasks and performs additional tasks in order to delete the playlist Flow, and change the name of the playlist from Flow to Flower, rather than creating a playlist with the name of Flower.

Figure 19:
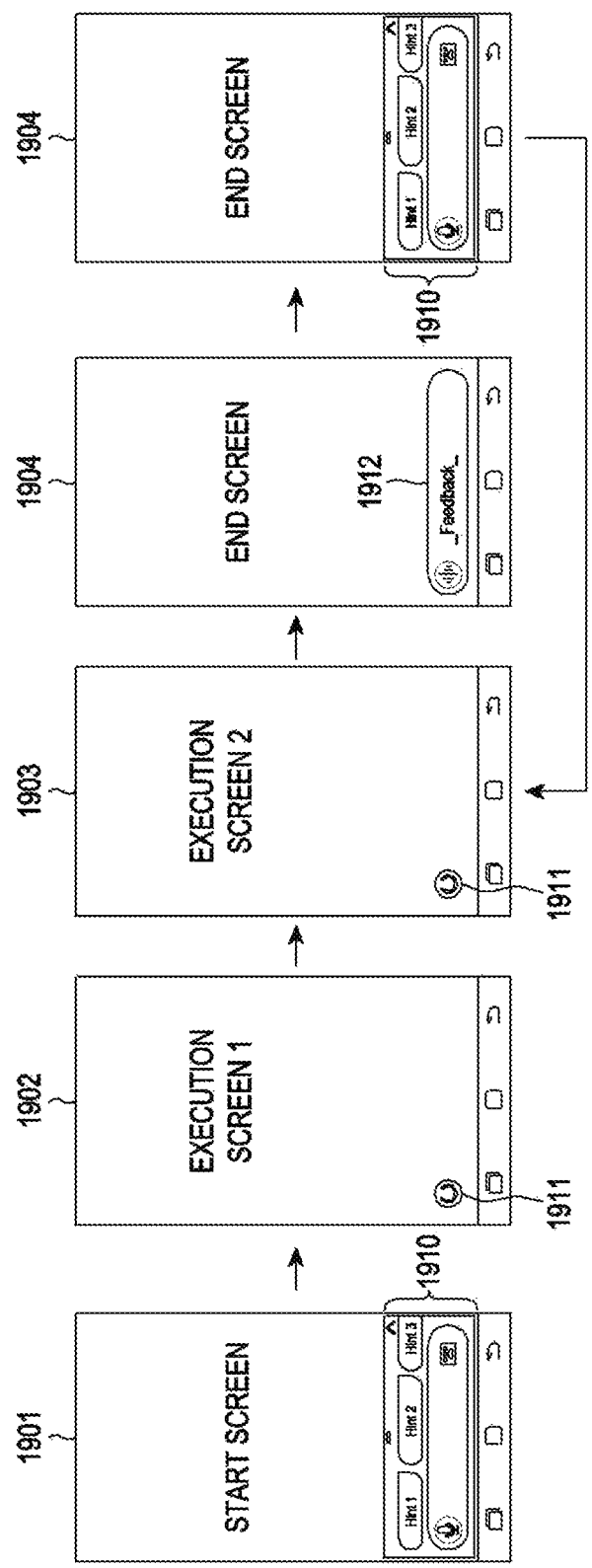
FIG. 19 illustrates a process of partial task cancellation according to an embodiment of the present disclosure.

FIG. 19 illustrates a process of canceling some tasks according to an embodiment of the present disclosure.

Referring to FIG. 19, the electronic device obtains a command to execute a speech recognition application while displaying a start screen 1901. The electronic device displays a speech recognition application execution screen 1910 on the start screen 1901. The electronic device obtains user speech. For example, the electronic device obtains user speech saying, "show me photos taken in Hawaii." The electronic device obtains a plurality of tasks corresponding to the user speech.

The electronic device sequentially switches and displays the start screen 1901, the first execution screen 1902, the second execution screen 1903, and the end screen 1904 by sequentially performing the plurality of tasks. The end screen 1904 may be a detailed view of a photo taken in Hawaii.

While the screens switch as the plurality of states change for the user speech, the electronic device displays an indicator 1911 indicating that the task is being performed.

After performing the last task, the electronic device displays feedback 1912 on the end screen 1904.

The electronic device displays a speech recognition application execution screen 1910 while displaying the end screen 1904, and obtains user speech including a partial cancellation command, such as "to previous screen" or "show a list of photos taken in Hawaii," while displaying the end screen 1904. The electronic device or external server may ASR-and-NLU process the user speech to cancel some of the plurality of tasks already performed, e.g., "select one from the list of photos taken in Hawaii and display its detailed view." The electronic device returns to the state immediately before the state of the end screen 1904 and displays the second execution screen 1903.

Figure 20:
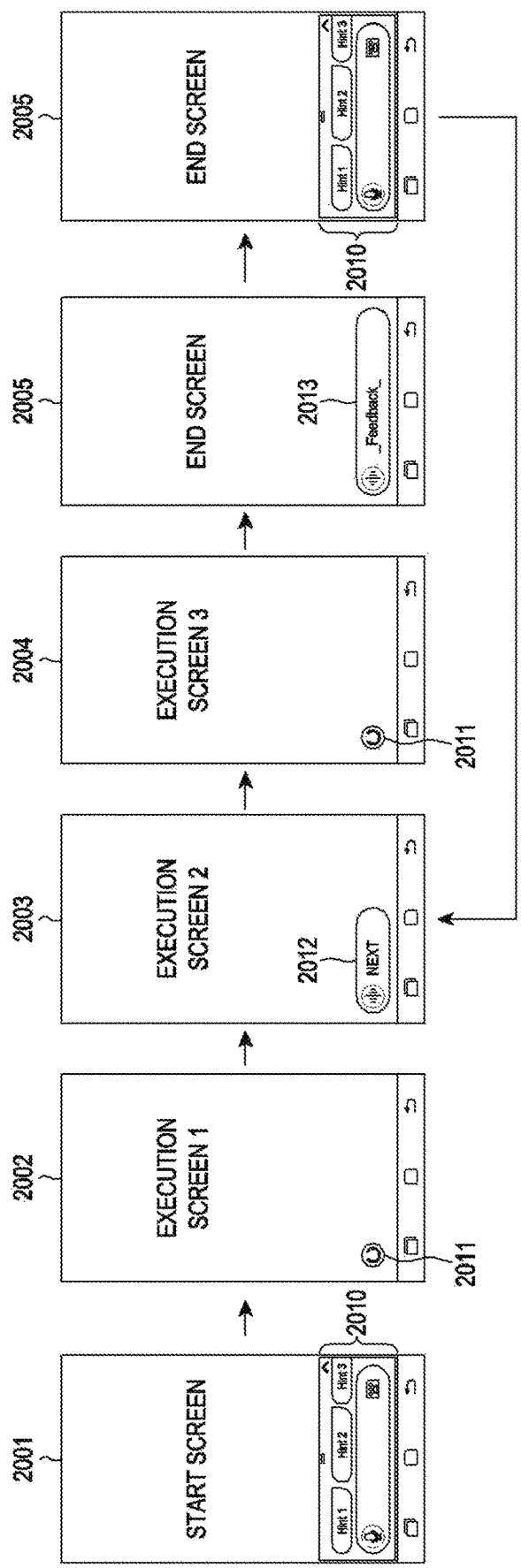
FIG. 20 illustrates a process of partial task cancellation according to an embodiment of the present disclosure.

FIG. 20 illustrates a process of canceling some tasks according to an embodiment of the present disclosure.

Referring to FIG. 20, the electronic device obtains a command to execute a speech recognition application while displaying a start screen 2001. The electronic device displays a speech recognition application execution screen 2010 on the start screen 2001. The electronic device obtains user speech. The electronic device obtains a plurality of tasks corresponding to the user speech. The electronic device sequentially switches and displays the start screen 2001, the first execution screen 2002, the second execution screen 2003, the third execution screen 2004, and the end screen 2005 by sequentially performing the plurality of tasks. The second execution screen 2003 may be a screen related to a state for obtaining a parameter (e.g., the temporary arrival state).

The electronic device may temporarily stop changing screens in the second execution screen 2003 while sequentially changing and displaying the start screen 2001, the first execution screen 2002, and the second execution screen 2003. The electronic device 101 displays an indicator 2012 indicating that it is waiting for next user speech, obtains the next user speech, obtains a parameter as a result of analyzing the user speech, and switches to execution screens corresponding to the obtained parameter using the obtained parameter.

The electronic device also displays an indicator 2011 indicating that the tasks are being performed.

After performing the last task, the electronic device displays feedback 2013 on the end screen 2005.

The electronic device displays a speech recognition application execution screen 2010 while displaying the end screen 2005. The electronic device obtains user speech including a partial cancellation command saying, "to previous screen," while displaying the end screen 2005. The electronic device or external server may ASR-and-NLU process the user speech to return to the state for obtaining a parameter that is immediately before the state corresponding to the end screen 2005. The electronic device displays the second execution screen 2003.

When the electronic device obtains a cancellation command to request to return to the immediately prior state, the electronic device may be configured to return to the state for obtaining a parameter that is immediately before the end state, but not the state immediately prior to the end state.

Figure 21:
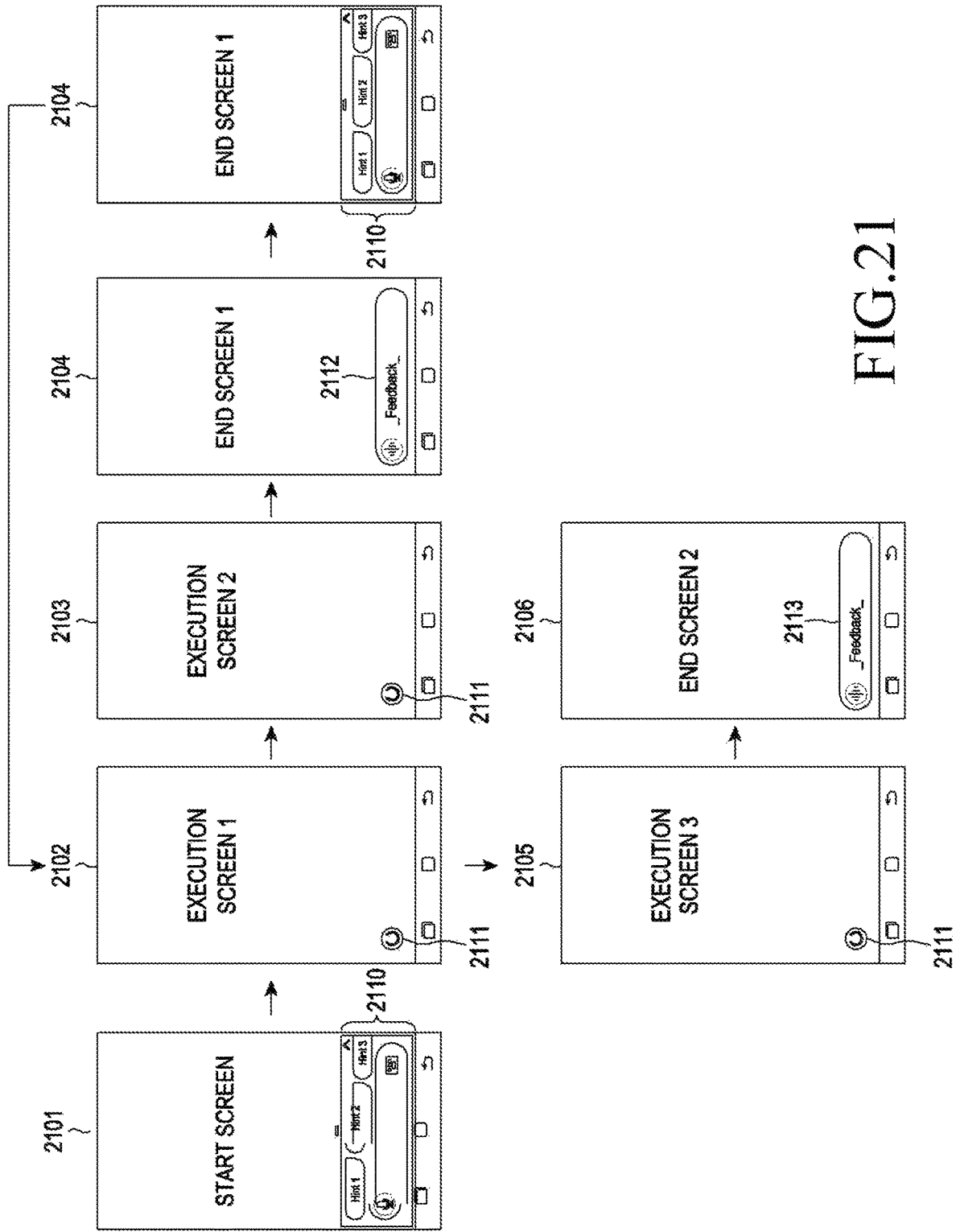
FIG. 21 illustrates a process of partial task cancellation and executing an additional task according to an embodiment of the present disclosure.

FIG. 21 illustrates a process of canceling some tasks and executing an additional task according to an embodiment of the present disclosure.

Referring to FIG. 21, the electronic device obtains a command to execute a speech recognition application while displaying a start screen 2101. The electronic device displays a speech recognition application execution screen 2110 on the start screen 2101. The electronic device obtains user speech. For example, the electronic device obtain user speech saying, "text me the photo taken in Austria." The electronic device or an external server may ASR-process the user speech to obtain text reading "text me the photo taken in Australia." The electronic device or external server may NLU-process the text to obtain a plurality of tasks.

The electronic device sequentially switches and displays the start screen 2101, the first execution screen 2102, the second execution screen 2103, and the first end screen 2104 by sequentially performing the plurality of tasks. The first end screen 2104 may be a screen of sending a message attached with the photo taken in Australia.

While the screens switch as the plurality of states change for the user speech, the electronic device displays an indicator 2111 indicating that the task is being performed.

After performing the last task, the electronic device displays a feedback 2112 on the first end screen 2104. The electronic device displays a speech recognition application execution screen 2110 while displaying the first end screen 2104. For example, the electronic device obtains user speech including a partial cancellation command saying, "No. Not Australia but Austria," and additional tasks while displaying the first end screen 2104. The electronic device cancels the tasks of "attaching the Australia photo," "executing a message application," and "searching for the Australia photo" and perform the additional tasks of "searching for the Austria photo," "executing the message application," and "attaching the Austria photo." Thus, the electronic device returns to one of the plurality of states by canceling some of the tasks already performed and displays a screen (e.g., the first execution screen 2102) for the returning state. The electronic device sequentially changes and displays the first execution screen 2102, the third execution screen, and the second end screen 2106 by performing the additional tasks and displays an indicator 2111 indicating the tasks are being performed while changing the screens. The electronic device displays a feedback 2113 on the second end screen 2106.

Figure 22:
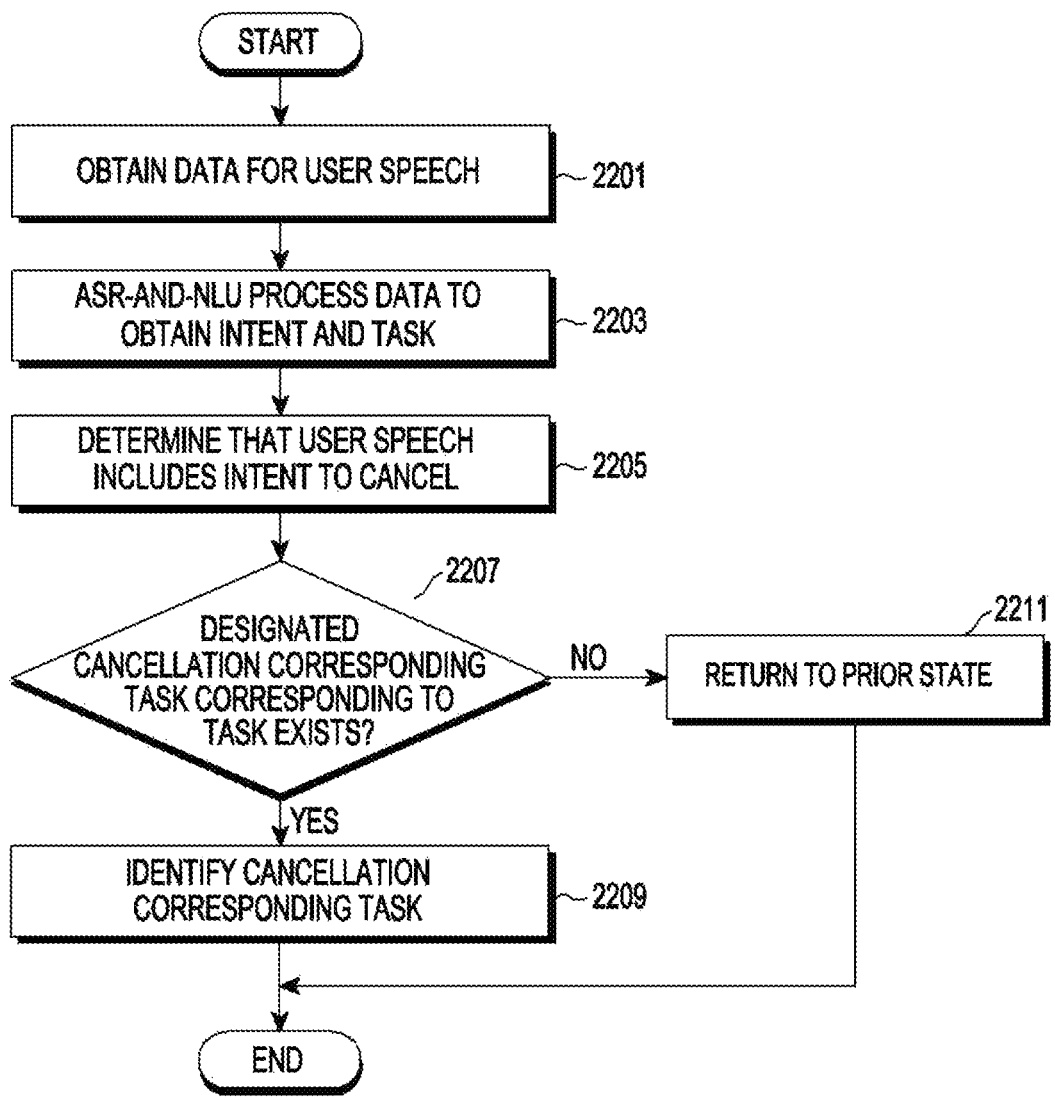
FIG. 22 is a flowchart illustrating a method for canceling a task according to an embodiment of the present disclosure.

FIG. 22 is a flowchart illustrating a method for canceling a task according to an embodiment of the present disclosure.

Referring to FIG. 22, in step 2201, the electronic device or an external server obtains data for user speech.

In step 2203, the electronic device or the external server performs ASR and NLU processing on the data to obtain the intent and task. The electronic device may directly perform ASR and NLU processing or the electronic device may send the data for the user speech to the external server and receive the intent and task obtained by the external server.

In step 2205, the electronic device determines that the user utterance includes the intent to cancel.

In step 2207, the electronic device or external server determines whether there is a designated cancellation task corresponding to the task.

When there is the designated corresponding cancellation task, the electronic device or the external server identifies the designated corresponding cancellation task in step 2209. Thereafter, the electronic device may operate as per the identified corresponding cancellation task, or the external server may send the identified corresponding cancellation task to the electronic device. For example, the electronic device or the external server may store and manage data associated with the user speech processing, e.g., as shown in FIGS. 38A to 38C.

FIGS. 38A to 38C illustrate tables for storing and managing data associated with user speech processing according to an embodiment of the present disclosure.

Referring to FIGS. 38A to 38C, the electronic device or external server may manage the user speech with the task corresponding to the user speech. For example, the electronic device or external server may manage the user speech "Turn ON notification of baseball club room" by allowing the user speech to correspond to the task "Message-Search-Result-Conversation view-Notification control-On." The application name information indicating that the application performed is the application "Messages," the task description information describing the details indicating that the task is "turn on the notification of the baseball club room," the intent information for identifying the task (e.g., Messages_103), and cancellation corresponding task information (e.g., Messages_104) for identifying the cancellation corresponding task corresponding to the task may be stored in association with the corresponding to task.

Information about at least one state that the electronic device would have as the task is performed may also be stored in association with the task. Each state may include information related to order of execution, information about the name of the application used in execution, identity (ID) information for identifying state, information indicating whether the state is the temporary arrival state, and description information about state.

In FIG. 38A, for the state "Conversation Tab," being executed in a turn of (order) "1" using the application "Message," being not the temporary arrival state, and having the description information of "Start Message" may be stored. For the state "Search," being executed in a turn of "2" of the order using the application "Message," being the temporary arrival state, and having the description information of "Search Message" may be stored. For the state "Search Result," being executed in a turn of "3" in the order using the application "Message," being the temporary arrival state, and having the description information of "Show search Result" may be stored. For state "Conversation view," being executed in a turn of "4" in the order using the application "Message," being the temporary arrival state, and having the description information of "Conversation View" may be stored. For the state "Drawer," being executed in a turn of "5" in the order using the application "Message," being the temporary arrival state, and having the description information of "Drawer" may be stored. For the state "Drawer Notification Control on," being executed in a turn of "6" of the order using the application "Message," being not the temporary arrival state, and having the description information of "Set Notification on" may be stored.

The electronic device or external server may determine that the identification information of the corresponding cancellation task of the task, e.g., "Message-Search-Result-Conversation view-Notification control-On" is "Message_104." That is, the electronic device or external server may identify the presence of the cancellation task corresponding to the task. The electronic device or external server, upon identifying the command to cancel the task corresponding to "Message_103," may determine that the task of "Message_104" is the cancellation corresponding task.

When the external server determines the corresponding cancellation task, the external server may send the corresponding cancellation task to the electronic device. The electronic device may cancel the task already performed according to "Message_103" by performing the task corresponding to the intent of "Message_104."

When a designated corresponding cancellation task is absent, the electronic device or the external server may generate the task for returning to the previous state in order to generate the cancellation task in step 2211.

of states. For example, the electronic device or the external server may further store, as information about the plurality of states corresponding to the task, information about whether partial cancellation is possible or a cancellation action.

Table 3 below shows examples of information about the states corresponding to the task according to an embodiment of the present disclosure.

TABLE 3

| | | | | State-related information | | |
|---|---|---|---|---|---|---|
| Intent of task | Order | Application name | State ID | Whether temporary arrival state or not | Whether partial cancellation is possible | Cancellation corresponding task |
| Message_101 | 1 | Messages | Conversation Tab | | ○ | |
| | 2 | Messages | Search | True | ○ | |
| | 3 | Messages | Search Result | True | X | |
| | 4 | Messages | Search Result Select | True | ○ | |
| | 5 | Messages | Search Result Select Delete | | X | Restore deleted file |

For example, referring to FIG. 38C, the cancellation corresponding task corresponding to "Message-Search-Result-Conversation view-Notification control," i.e., "Message_105," has not been designated. The electronic device or external server may perform the cancellation corresponding task to return to the previous task. For example, the electronic device or external server may return to the state prior to displaying the notification setting screen.

Although FIGS. 38A to 38C illustrate one corresponding cancellation task, this is merely an example, and there may be a plurality of corresponding cancellation tasks.

The electronic device or external server may store a task that may be processed in the arrival state by performing task (e.g., the temporary arrival state or end state) as the corresponding cancellation task. For example, when the user speech is "create a playlist in the name of summer," the electronic device or external server may store, as the corresponding cancellation task, one option for deleting the playlist and creating a new playlist and another option for changing the name of the playlist.

Although FIGS. 38A to 38C illustrate one application (e.g., the message application) is used corresponding to one intent, this is merely an example, a plurality of applications may also be used corresponding to one intent. In such a case, the electronic device or external server may also determine that the application switch state is the state to which to go back."

Figure 23:
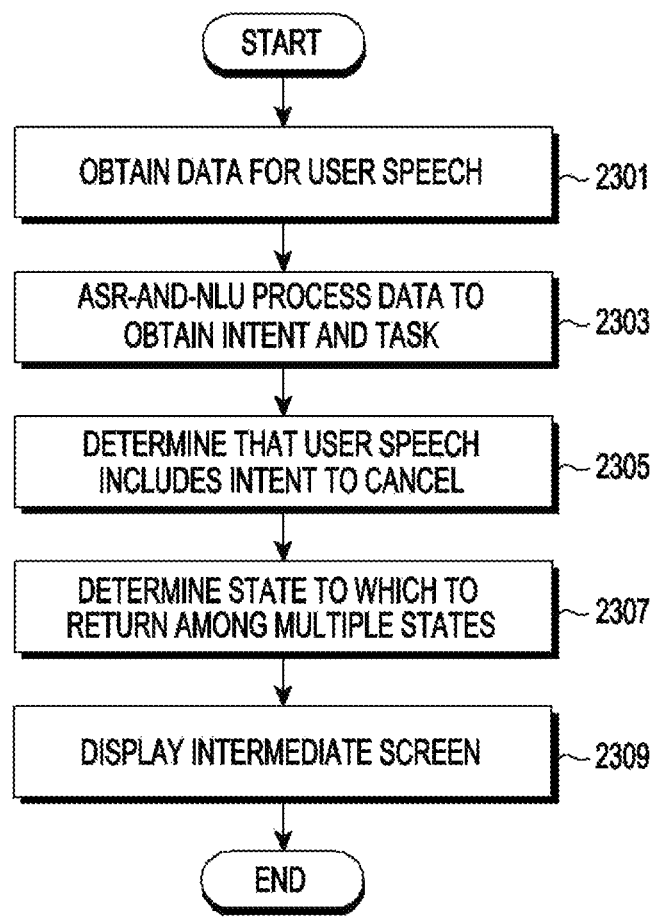
FIG. 23 is a flowchart illustrating a method for canceling a task according to an embodiment of the present disclosure.

FIG. 23 is a flowchart illustrating a method for canceling a task according to an embodiment of the present disclosure.

Referring to FIG. 23, in step 2301, the electronic device or an external server obtains data for user speech.

In step 2303, the electronic device or the external server performs ASR and NLU processing on the data to obtain the intent and task.

In step 2305, the electronic device or an external server determines that the user speech includes an intent to cancel. For example, the electronic device or the external server may determine to cancel some of a plurality of tasks already performed as a result of analysis of the user speech.

In step 2307, the electronic device or the external server determines an intermediate arrival state among the plurality The state-related information of Table 3 may be an example of information related to a plurality of states included in the task corresponding to the user speech, e.g., "Delete text messages with card A." As compared with the state-related information of the tables illustrated in FIGS. 38A to 38C, the state-related information of Table 3 further includes information about whether partial cancellation is possible and information about the cancellation corresponding task. For example, information indicating that partial cancellation is possible for the state of "Conversation Tab," the state of "Search," and the state of "Search Result Select" among the plurality of states corresponding to the intent of "Message_101," and information indicating the partial cancellation is impossible for the state of "Search Result" and the state of "Search Result Select Delete" may be stored. Further, information indicating that the cancellation task for the state of "Search Result Select Delete" is to restore the deleted file may be stored.

When partial cancellation is requested, the electronic device or the external server may determine the state to which to return by referring to whether partial cancellation is possible. The electronic device or the external server may determine the state to which to return using whether it is the temporary arrival state along with whether partial cancellation is possible.

In step 2309, the electronic device or the external server displays an intermediate screen corresponding to the determined state to which to return. The electronic device or the external server may determine that the cancellation corresponding task corresponding to the fifth state is "restore the deleted file" by referring to pre-stored information about the cancellation corresponding task. The electronic device or the external server may separately store and manage, as shown in Table 3, the cancellation corresponding task corresponding to the task, such as a variation in settings or information non-transitorily stored in the memory, such as file being deleted.

Although the electronic device performs the task of deleting a particular file or varying settings corresponding to the user speech, the electronic device may temporarily store the file to be deleted or the settings before change, and unless there is an additional cancellation command, the electronic device may permanently delete the file. For example, when a pre-designated time elapses or user speech is entered a pre-designated number of times, the electronic device may permanently delete the information that it has temporarily stored.

Upon detecting a cancellation command while the information is stored temporarily, the electronic device may restore the file to be deleted or adjust the settings back to the settings before the change. The information temporarily stored may be managed by the service of executing the application being used or an EM.

Upon obtaining information about returning to state by canceling task, the EM may delete view stack information corresponding to the states that have been performed from the returned state to the current state. Further, when there is a modification to the previous task while performing tasks, the electronic device may resume the modification while canceling the states.

Canceling a task and returning to a previous state as illustrated in FIGS. 22 and 23 are merely examples, and it will be readily appreciated by one of ordinary skill in the art that no limitations are imposed on the scheme in which the electronic device cancels at least some of the tasks already performed.

Figure 24:
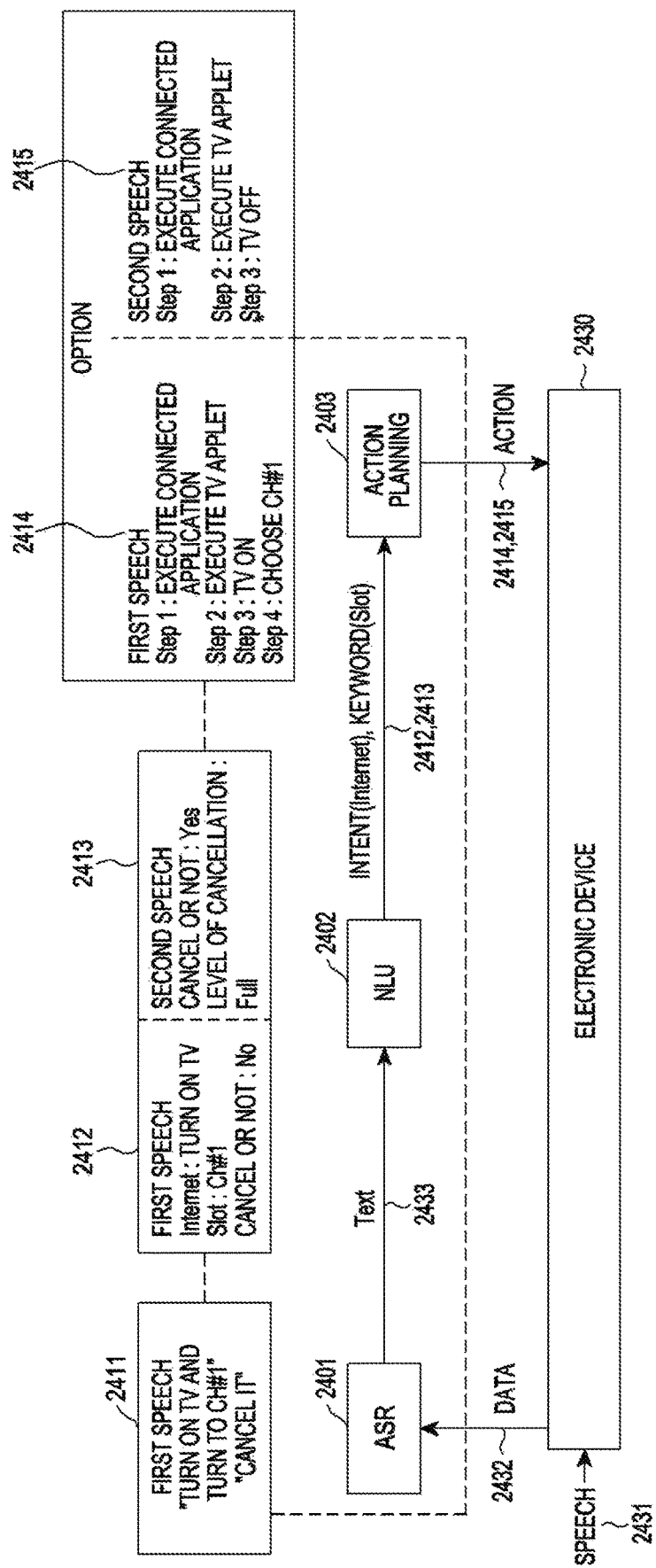
FIG. 24 illustrates processing user speech according to an embodiment of the present disclosure.

FIG. 24 illustrates processing user speech according to an embodiment of the present disclosure.

Referring to FIG. 24, an electronic device 2430 obtains user speech 2431 and provides data 2432 for the user speech to an ASR manager 240I. The ASR manager 240I, an NLU manager 2402, and an action planning manager 2403 may be included in an external server or the electronic device 2430. The ASR manager 240I ASR-processes the received data 2432 for the user speech to obtain text 2433. The ASR manager 240I may obtain text for first speech, e.g., "turn on TV and turn to channel 1" and text for second speech, e.g., "cancel it," and provide text to the NLU manager 2402.

The NLU manager 2402 NLU-processes the received texts to obtain the intent, slot (e.g., parameter) and whether to cancel or not (2412) corresponding to the first speech and whether to cancel and the degree of cancellation (2413) corresponding to the second speech. For example, the intent corresponding to the first speech may be turning on TV, the slot corresponding to the first speech may be channel 1, and whether to cancel corresponding to the first speech may be information indicating not to cancel. Whether to cancel corresponding to the second speech may be proceed with cancellation, and the degree of cancellation may be full cancellation. The NLU manager 2402 may provide at least one 2412 or 2413 of the intent, keyword, whether to cancel, and degree of cancellation to the action planning manager 2403.

The action planning manager 2403 generates an action sequence 2414 corresponding to the first speech based on the intent, slot (e.g., parameter), and whether to cancel (2412) corresponding to the first speech and generates an action sequence 2415 corresponding to the second speech based on whether to cancel and degree of cancellation (2413) corresponding to the second speech. The action planning manager 2403 provides the action sequences 2414 and 2415 to the electronic device 2430, and the electronic device 2430 may perform the action sequences 2414 and 2415.

Figure 25:
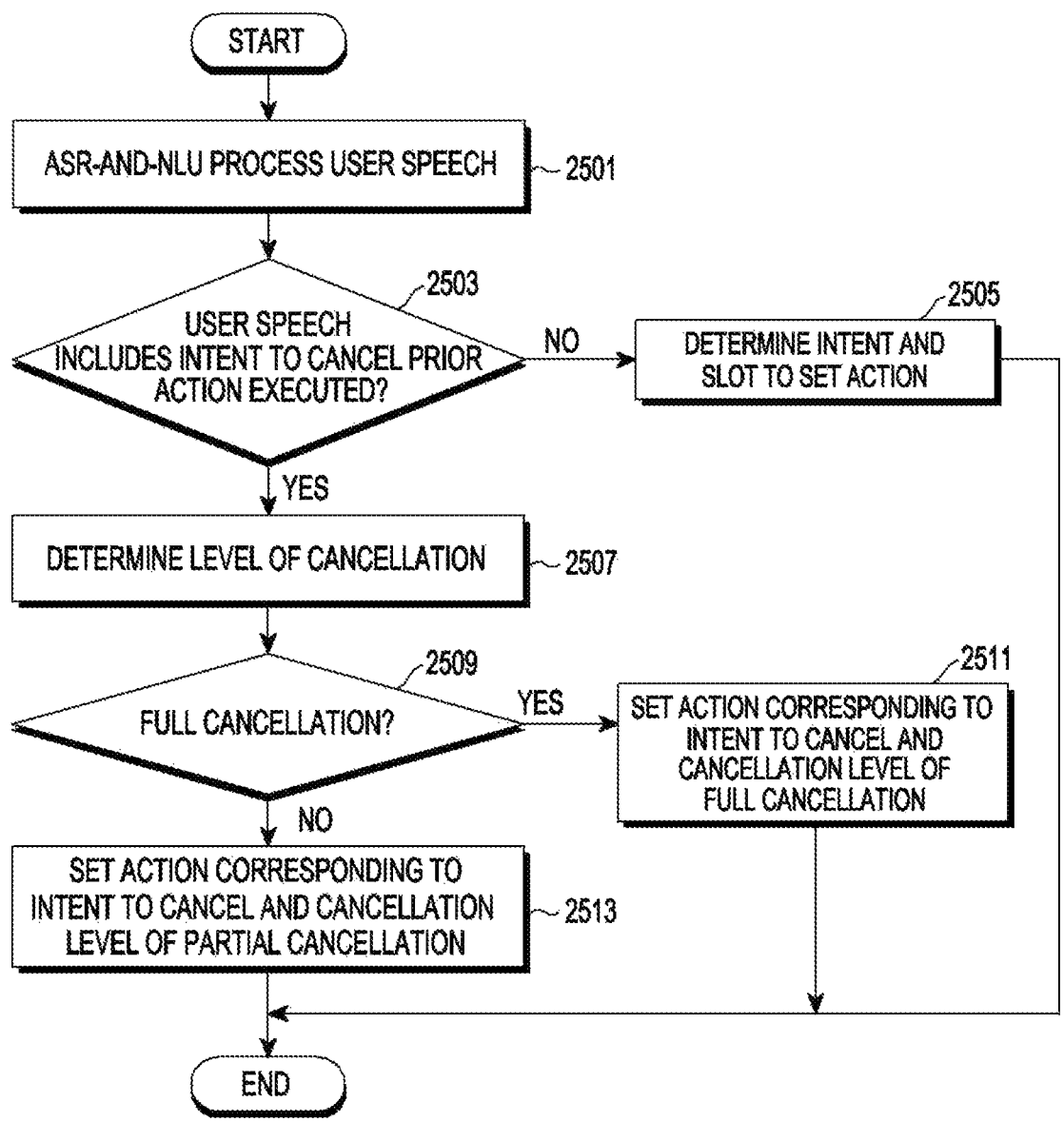
FIG. 25 is a flowchart illustrating a method for operating an electronic device or an external server according to an embodiment of the present disclosure.

FIG. 25 is a flowchart illustrating a method for operating an electronic device or an external server according to an embodiment of the present disclosure.

Referring to FIG. 25, in step 2501, the electronic device or the external server may ASR-and-NLU process user speech.

In step 2503, the electronic device or the external server determines whether the user speech includes an intent to cancel the action previously executed. The electronic device or the external server may determine the intent to cancel based simply one a word (e.g., Cancel) included in the user speech, which indicates the cancellation of the previous task or a negative word (e.g., No) for the previous task. Alternatively, the electronic device or the external server may also determine the intent to cancel by identifying the meaning that is contrary the previous task as a result of the NLU processing.

When the user speech does not include the intent to cancel in step 2503, the electronic device or the external server determines the intent and slot obtained as a result of the NLU processing, thereby setting an action in step 2505.

When the user speech includes the intent to cancel in step 2503, the electronic device or the external server determines the level of cancellation in step 2507.

Where the level of cancellation is full cancellation (yes, in step 2509), the electronic device or the external server sets an action corresponding to the cancellation level of full cancellation and the intent to cancel in step 2511. However, when the level of cancellation is partial cancellation (no, in step 2509), the electronic device or the external server sets an action corresponding to the cancellation level of partial cancellation and the intent to cancel in step 2513.

Figure 26A:
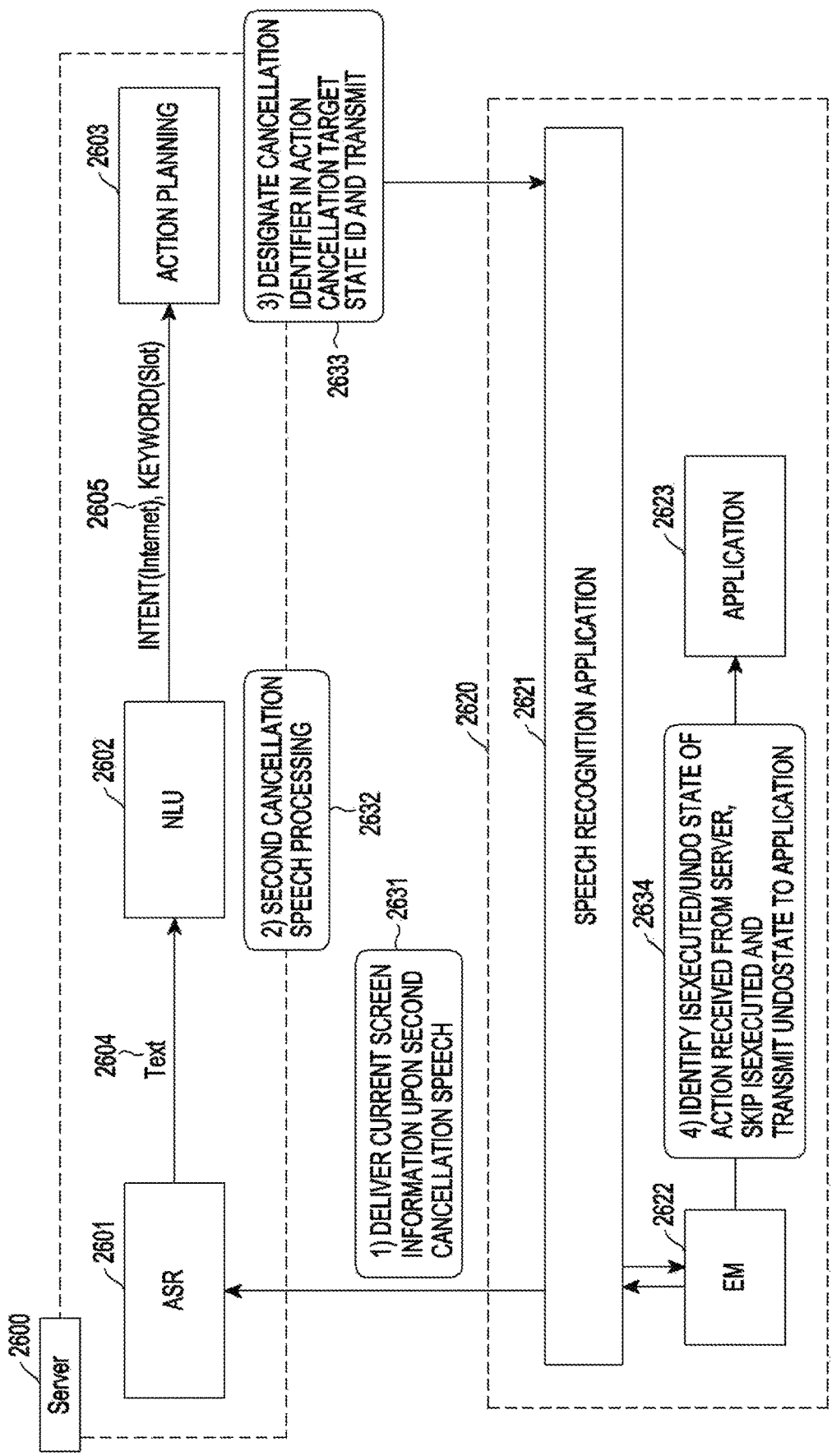
FIG. 26A illustrates processing user speech according to an embodiment of the present disclosure.

FIG. 26A illustrates processing user speech according to an embodiment of the present disclosure.

Referring to FIG. 26A, an electronic device 2620 has sent first user speech "find the photo taken in Hawaii and send it to Uma," through a speech recognition application 2621 to a server 2600, the server 2600 has ASR-and-NLU processed and sent a corresponding task to the electronic device 2620, and the electronic device 2620 has already performed the task corresponding to the first user speech.

In step 2631, the electronic device 2620 sends data for a second cancellation user speech along with information about the current screen to an ASR manager 2601. The electronic device 2620 may send an action for the first user speech along with the data for the second cancellation user speech to the ASR manager 2601. For example, the electronic device 2620 may send an action sequence for the first user speech along with the data for the second cancellation user speech to the server 2600.

When the electronic device 2620 manages actions, the data for the user speech and information about an action previously performed may be sent to the server 2600. For example, the second cancellation user speech may be "Not Uma but Emma." The ASR manager 2601 may send a text 2604 obtained by ASR-processing the second cancellation user utterance to an NLU manager 2602.

In step 2632, the NLU manager 2602 may perform a second-cancellation-speech process on the text 2604 based on the received information about the current screen to generate an intent and keyword 2605, and the NLU manager 2602 may send the intent and keyword to an action planning manager 2603.

Figure 26B:
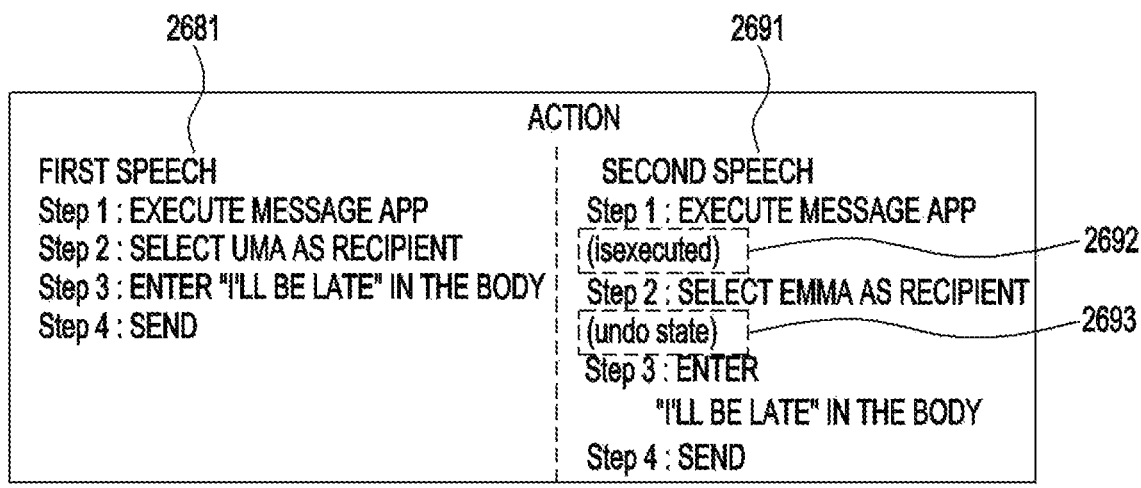
FIG. 26B illustrates an action corresponding to user speech according to an embodiment of the present disclosure.

FIG. 26B illustrates an action corresponding to user speech according to an embodiment of the present disclosure.

Referring to FIG. 26B, the NLU manager may display the identifier "isexecuted" 2692 for the state already performed in the action 2681 corresponding to the first user speech among the actions 2691 corresponding to the second user speech. The action of "execute the message application" among the actions 2691 corresponding to the second user speech has already been performed in the action 2681 corresponding to the first user speech, and accordingly, the NLU manager 2602 displays the identifier "isexecuted" 2692 for the action of "execute the message application." Further, the NLU manager 2602 displays the identifier "undo state" 2693 for an additional action to be performed.

Referring again to FIG. 26A, in step 2633, the action planning manager 2603 generates an action, designates a cancellation identifier for the action cancellation target state ID, and sends the same to the electronic device 2620.

In step 2634, an EM 2622 delivers the action (e.g., the action 2681 corresponding to the second user utterance) received from the server to a corresponding application 2623. Specifically, the EM 2622 may skip actions marked with the identifier "isexecuted" 2692 among the received actions while delivering actions marked with the identifier "undo state" 2693 to the application 2623.

Figure 27A:
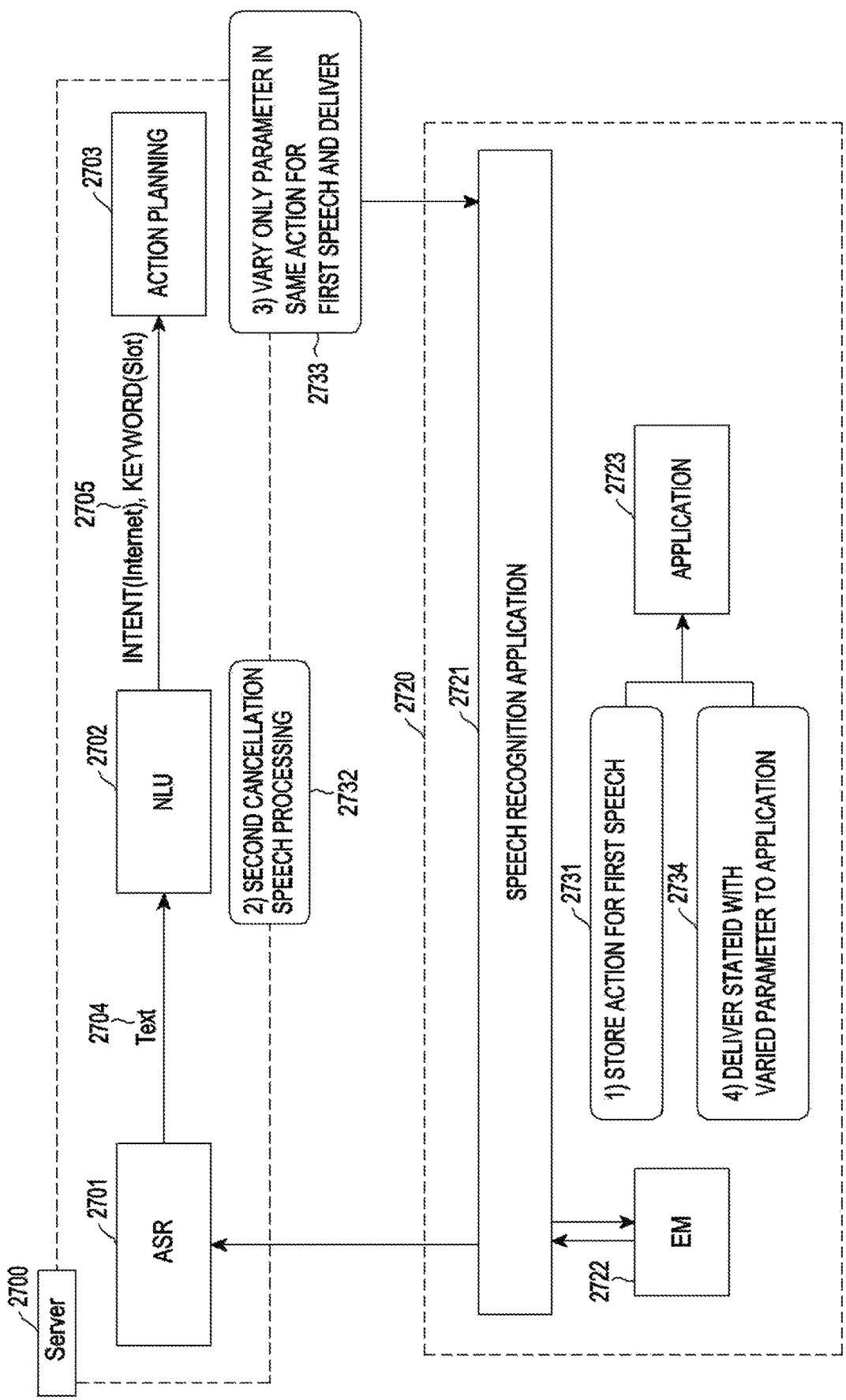
FIG. 27A illustrates processing user speech according to an embodiment of the present disclosure.

FIG. 27A illustrates processing user speech according to an embodiment of the present disclosure.

Referring to FIG. 27A, an electronic device 2720 has sent first user speech, "text Uma I will be late," through a speech recognition application 2721 to a server 2700, the server 2700 has ASR-and-NLU processed and sent a corresponding task to the electronic device 2720, and the electronic device 2720 has already performed the task corresponding to the first user speech.

Figure 27B:
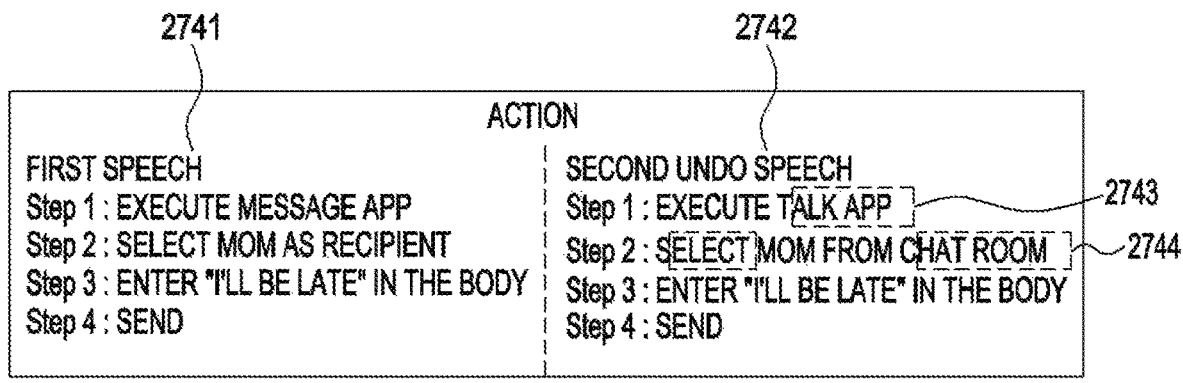
FIG. 27B illustrates an action corresponding to user speech according to an embodiment of the present disclosure.

The electronic device 2720 receives an action 2741 corresponding to, the first speech as illustrated in FIG. 27B from a server 2700.

FIG. 27B illustrates an action corresponding to user speech according to an embodiment of the present disclosure.

An EM 2722 transfers the received action 2741 corresponding to the first speech to an application 2733.

In step 2731, the electronic device 2720 stores the action for the first speech. The electronic device 2720 receives second cancellation user speech. The electronic device 2720 sends data for the second cancellation user speech to an ASR manager 2701. The ASR manager 2701 performs ASR processing and provides text 2704 to an NLU manager 2702. The NLU manager 2702 NLU-processes the text to process the second cancellation user speech in step 2732. The NLU manager 2702 provides an intent and keyword 2705 obtained as a result of the cancellation speech processing to an action planning manager 2703.

The action planning manager 2703 makes changes to parameters in the same actions for the first speech and delivers the changes to the electronic device 2720 in step 2733. For example, the action planning manager 2703 may obtain the action 2742 corresponding to the second speech, as illustrated in FIG. 27B, and send only slots 2743 and 2744, which reveal differences to the electronic device 2720.

In steps 2734, the EM 2722 delivers the state ID with a varied parameter to the application 2723 using the slots 2743 and 2744, which reveal differences. The action planning manager 2703 may also deliver the action 2742 corresponding to the second utterance to the EM 2722. The EM 2722 may compare the action 2741 corresponding to the first speech with the action 2742 corresponding to the second speech and deliver the state ID with a varied parameter to the application 2723. For example, the electronic device 2720 may compare the first action 2741 with the second action 2742 to identify portions which show differences, thereby determining the state to which to return.

For example, the initial action in the second action 2742 is executing a talk app, and the first action in the first action 2741 is executing a message app. The electronic device 2720 may determine that there is a difference between the two actions. The electronic device 2720 may determine that the state to which to return is the state before the first action of the first action 2741 corresponding to the difference in action, and after returning to the state, the electronic device 2720 may perform the first action in the second action 2742.

Figure 28:
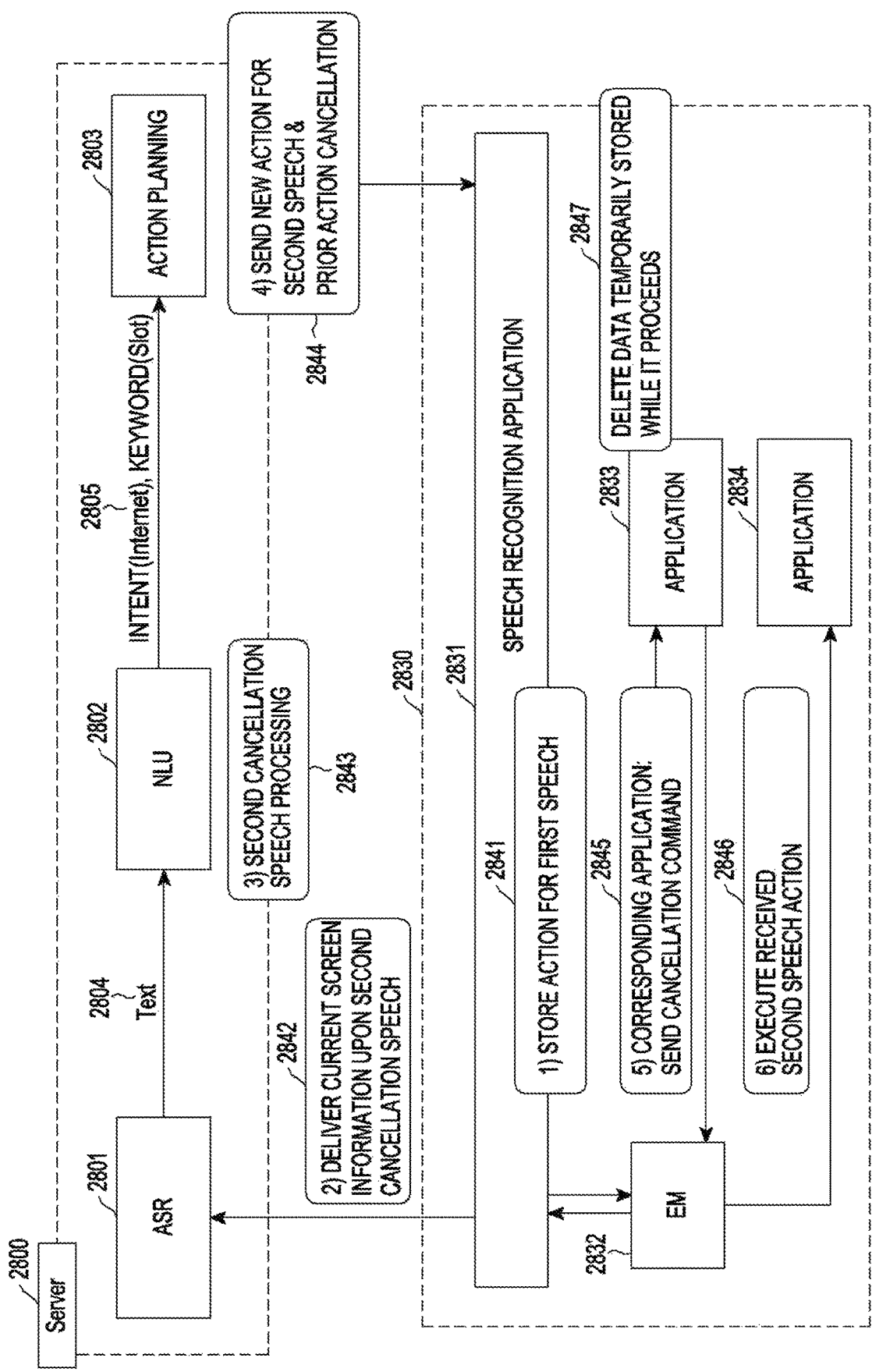
FIG. 28 illustrates processing user speech according to an embodiment of the present disclosure.

FIG. 28 illustrates processing user speech according to an embodiment of the present disclosure.

Referring to FIG. 28, an electronic device 2830 has sent first user speech, "text Uma I will be late," through a speech recognition application 2821 to a server 2800, the server 2800 has ASR-and-NLU processed and sent a corresponding task to the electronic device 2830, and the electronic device 2830 has already performed the task corresponding to the first user utterance.

The electronic device 2830 receives an action corresponding to the first speech from the server 2800. An EM 2832 transfers the received action corresponding to the first speech to an application 2833.

In step 2841, the electronic device 2830 stores the action for the first speech. The electronic device 2830 receives a second cancellation user speech.

In step 2842, the electronic device 2830 sends data for the second cancellation user speech along with current screen information, to an ASR manager 2801. According to an implementation, the current screen information may not be sent.

The ASR manager 2801 performs ASR processing and provides text 2804 to an NLU manager 2802. The NLU manager 2802 NLU-processes the text to process the second cancellation user speech in step 2843. The NLU manager 2802 provides an intent and keyword 2805 obtained as a result of the cancellation speech processing to an action planning manager 2803.

In step 2844, the action planning manager 2803 delivers a new action for the second speech and prior action cancellation to the electronic device 2803. For example, the new action may be performed by an application 2834, not the application 2833 that performed the prior action.

In step 2845, an EM 2832 transmits a cancellation command to the application 2833 which has performed the prior action.

In step 2846, the EM 2832 executes the received second speech action while delivering the second speech action to the other application 2834. The electronic device 2830 deletes the data that has temporarily been stored while proceeding with cancellation in step 2847.

Figure 29:
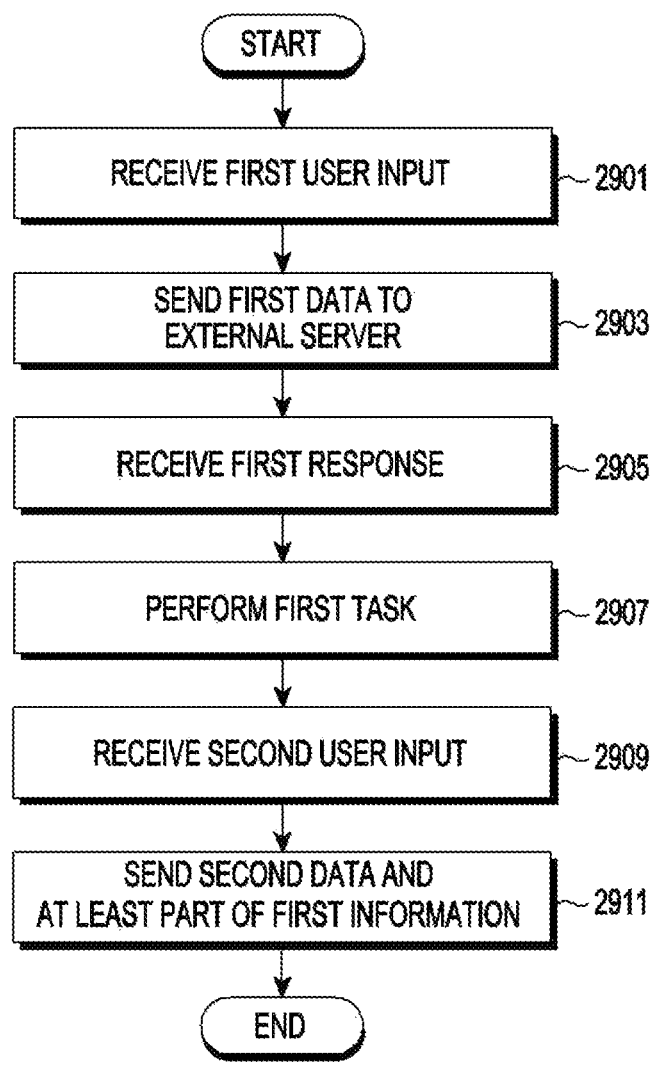
FIG. 29 is a flowchart illustrating a method for operating an electronic device according to an embodiment of the present disclosure.

FIG. 29 is a flowchart illustrating a method for operating an electronic device according to an embodiment of the present disclosure.

Referring to FIG. 29, in step 2901, the electronic device receives a first user input including a request for performing a first task using the electronic device. The electronic device may receive the first user input, e.g. a text or a speech through a touchscreen display or a microphone.

In step 2903, the electronic device sends first data associated with the first user input through the wireless communication circuit to the external server.

In step 2905, the electronic device receives a first response from the external server through the wireless communication circuit. The first response may include first information about a plurality of first states having an order for the electronic device to perform the first task.

In step 2907, the electronic device, after receiving the first response, performs the first task by allowing the electronic device to have the plurality of first states with the order.

In step 2909, the electronic device receives a second user input. The second user input may include a second request for allowing a second task to be performed using the electronic device. The electronic device may receive the second user input, e.g. a text or a speech through the touchscreen display or the microphone.

In step 2911, the electronic device sends second data associated with the second user input, along with at least part of the first information, through the wireless communication circuit to the external server. For example, as described above in connection with FIG. 27A, the electronic device may store the action for the first user speech, i.e., the first information.

Upon receiving the second cancellation user speech, i.e., the second user input, the electronic device sends at least part of the first information along with the second data associated with the second user input to the external server. The second user input may include a request for canceling at least part of the first task. The electronic device may return to any one state of the plurality of first states based on at least part of the second user input.

Figure 30:
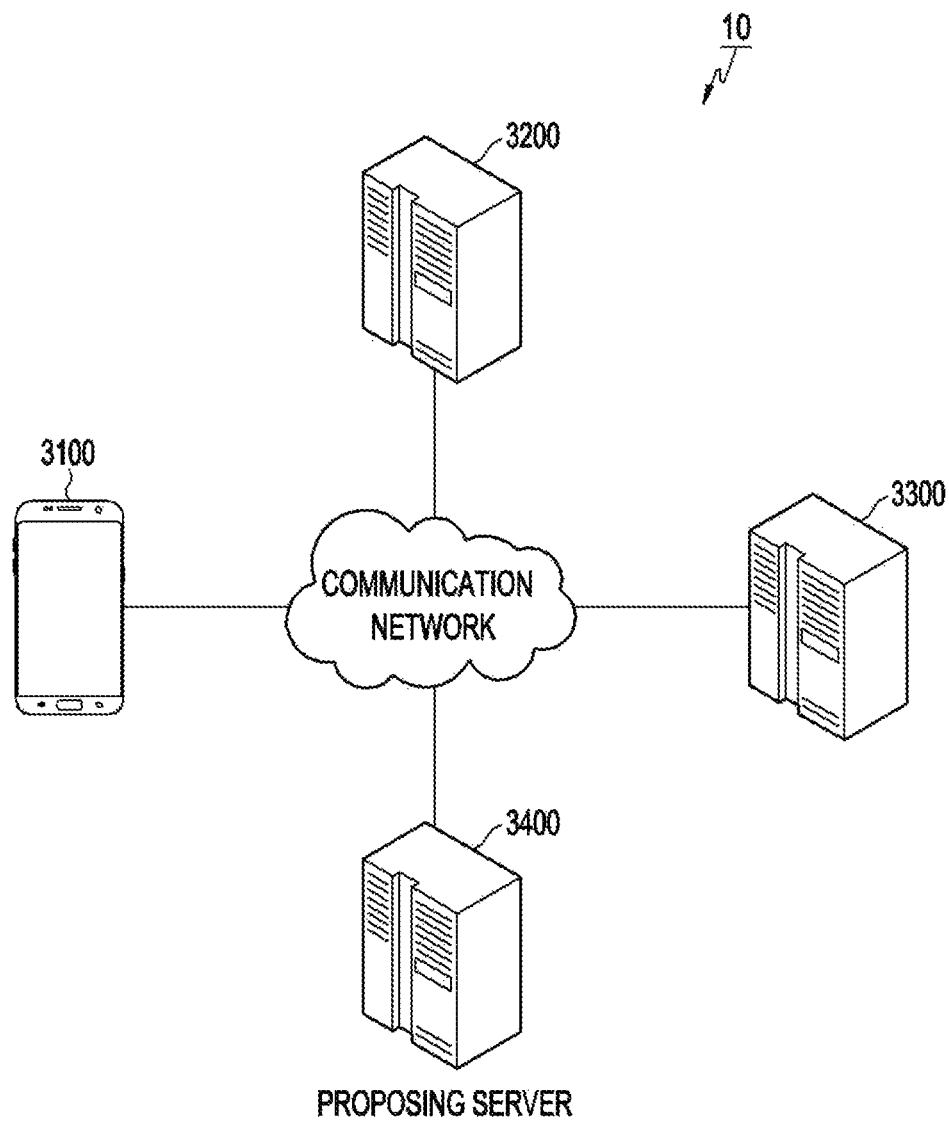
FIG. 30 illustrates an integrated intelligence system according to an embodiment of the present disclosure.

FIG. 30 illustrates an integrated intelligence system according to an embodiment of the present disclosure.

Referring to FIG. 30, an integrated intelligence system 10 includes a user terminal 3100, an intelligence server 3200, a personal information server 3300, and a proposing server 3400.

The UT 3100 may provide services for the user through an app (or application program) (e.g., an alarm app, message app, photo (gallery) app, etc.) stored in the user terminal 3100. The user terminal 3100 may execute and operate another app through an intelligent app (or speech recognition app) stored in the user terminal 3100. The intelligent app of the user terminal 3100 may receive user inputs to execute and operate the other app through the intelligent app. The user inputs may be received through a physical button, touchpad, voice input, remote input, etc.

The user terminal 3100 may receive user speech as input. The user terminal 3100 may receive the user speech and generate a command to operate the app based on the user speech. Accordingly, the user terminal 3100 may operate the app using the command.

The intelligence server 3200 may receive the user speech from the user terminal 3100 through a communication network and convert the speech into text data. The intelligence server 3200 may generate (or select) a path rule based on the text data. The path rule may include information about actions (or operations) to perform the functions of the app or information about parameters for executing the operations. Further, the path rule may include an order of the operations of the app. The user terminal 3100 may receive the path rule, select an app according to the path rule, and execute the operations included in the path rule on the selected app.

The user terminal 3100 may execute the operation and display, on the display, the screen corresponding to the state of the user terminal 3100 having performed the operation. The user terminal 3100 may also execute the operation, but abstain from displaying the results of performing the operation on the display. The user terminal 3100 may execute a plurality of operations and display, on the display, only some results of the plurality of operations. The user terminal 3100 may display, on the display, the results of executing only the last operation, or the user terminal 3100 may receive a user input and display the results of executing the operation on the display.

The personal information server 3300 may include a database storing user information. The personal information server 3300 may receive user information (e.g., context information or app execution) from the user terminal 3100 and store the user information in the database. The intelligence server 3200 may receive the user information from the personal information server 3300 through the communication network and use the received information in creating a path rule for user inputs. The user terminal 3100 may receive user information from the personal information server 3300 through the communication network and use the received user information for managing the database.

The proposing server 3400 may include a database that stores information about functions to be provided or introductions of applications or functions in the user terminal 3100. For example, the proposing server 3400 may receive user information of the user terminal 3100 from the personal information server 3300 and include a database for functions that the user may use. The user terminal 3100 may receive the information about functions to be provided from the proposing server 3400 through the communication network and provide the information to the user.

Figure 31:
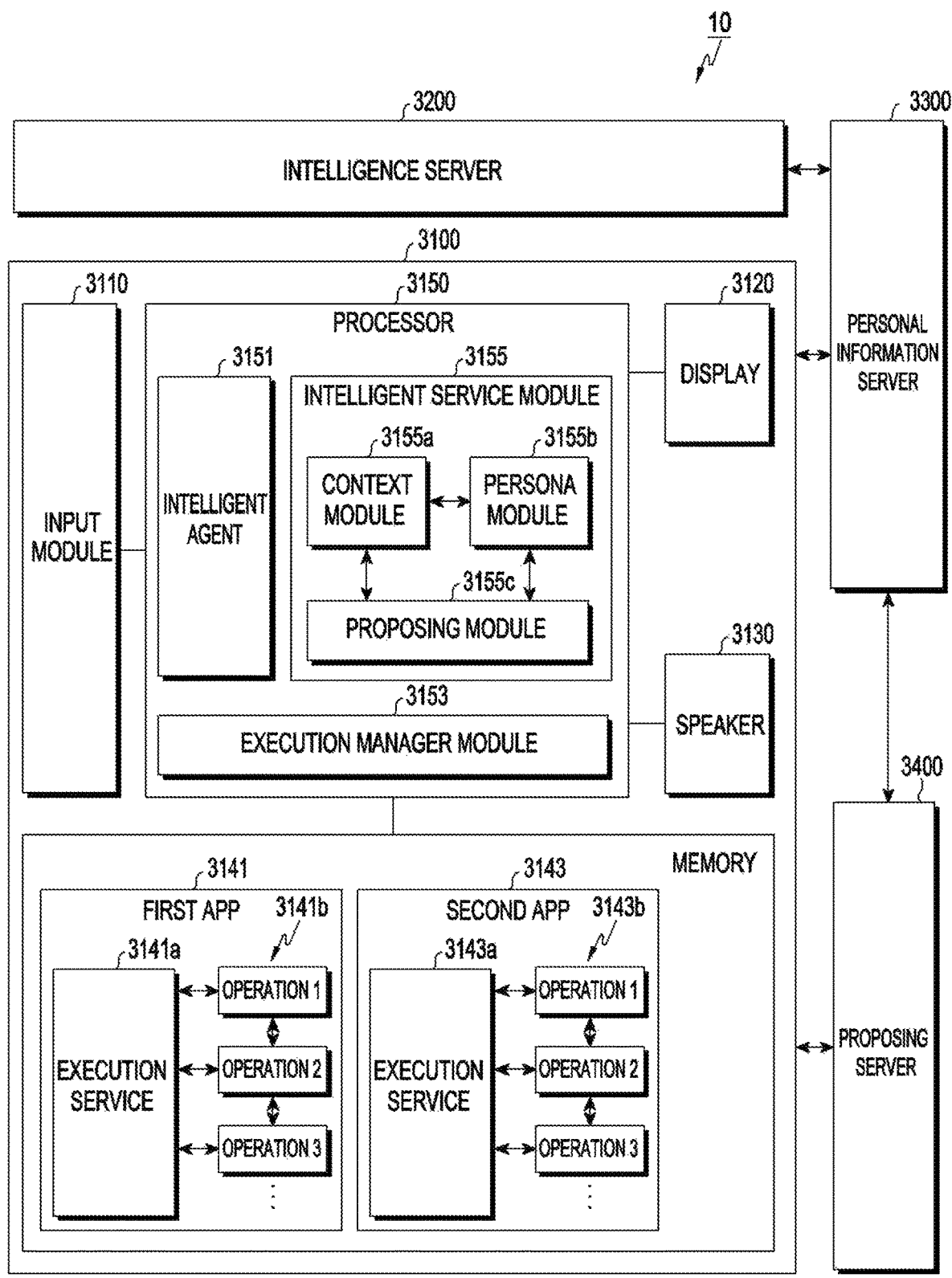
FIG. 31 illustrates a user terminal in an integrated intelligence system according to an embodiment of the present disclosure.

FIG. 31 illustrates a user terminal in an integrated intelligence system according to an embodiment of the present disclosure.

Referring to FIG. 31, the user terminal 3100 includes an input module 3110, a display 3120, a speaker 3130, a memory 3140, and a processor 3150. The user terminal 3100 may further include a housing. The components of the user terminal 3100 may be positioned in or on the housing.

The input module 3110 may receive user inputs from the user. For example, the input module 3110 may receive a user input from an external device (e.g., a keyboard or headset) connected thereto. The input module 3110 may include a touchscreen combined with the display 3120 (e.g., a touchscreen display), and/or a hardware key (e.g., a physical key) positioned in the user terminal 3100 (or the housing of the user terminal 3100).

The input module 3110 may include a microphone for receiving user speech as voice signals. The input module 3110 may include a speech input system and receive user speech as voice signals through the speech input system.

The display 3120 may display images, videos, and/or application execution screens. For example, the display 3120 may display a GUI of an app.

The speaker 3130 may output sounds include voice signals generated from inside the user terminal 3100.

The memory 3140 stores a plurality of apps 3141 and 3143. The plurality of apps 3141 and 3143 stored in the memory 3140 may be selected, executed, and operated according to a user input.

The memory 3140 may include a database that may store information necessary to recognize user inputs. For example, the memory 3140 may include a log database for storing log information, and/or a persona database for storing user information.

The plurality of apps 3141 and 3143 may be loaded and operated, e.g., by the execution manager module 3153. The plurality of apps 3141 and 3143 include execution services 3141*a* and 3143*a* and a plurality of operations (or unit operations) 3141*b* and 3143*b* performing functions. The execution services 3141*a* and 3143*a* may be generated by the execution manager module 3153 of the processor 3150 and may execute the plurality of operations 3141*b* and 3143*b*.

When the operations 3141*b* and 3143*b* of the apps 3141 and 3143 are executed, the execution state screens corresponding to the execution of the operations 3141*b* and 3143*b* may be displayed on the display 3120. The execution state screens may be screens in the state of the operations 3141*b* and 3143*b* having been completed. The execution state screens may be screens in the state of the execution of the operations 3141*b* and 3143*b* having been stopped (partial landing) (e.g., where parameters required for the operations 3141*b* and 3143*b* are not inputted).

The execution services 3141*a* and 3143*a* may execute the operations 3141*b* and 3143*b* as per a path rule. For example, the execution services 3141*a* and 3143*a* may be activated by the execution manager module 3153, receive an execution request as per the path rule from the execution manager module 3153, and execute the operations 3141*b* and 3143*b* of the apps 3141 and 3143 according to the execution request. The execution services 3141*a* and 3143*a*, when the execution of the operations 3141*b* and 3143*b* is complete, may send completion information to the execution manager module 3153.

When the plurality of operations 3141*b* and 3143*b* are executed on the apps 3141 and 3143, the plurality of operations 3141*b* and 3143*b* may sequentially be executed. When the execution of one operation (operation 1) is complete, the execution services 3141*a* and 3143*a* may open the next operation (operation 2) and send completion information to the execution manager module 3153. Here, "open an operation" indicates transitioning the operation into an executable state or preparing for the execution of the operation. Unless the operation is open, the operation cannot be executed.

Upon receiving the completion information, the execution manager module 3153 may send execution requests for the next operations 3141*b* and 3143*b* to the execution service (e.g., operation 2). When the plurality of apps 3141 and 3143 are executed, the plurality of apps 3141 and 3143 may sequentially be executed. For example, when the execution of the last operation of the first app 3141 is complete, and completion information is sent, the execution manager module 3153 may send an execution request for the first operation of the second app 3143 to the execution service 3143*a*.

When the plurality of operations 3141*b* and 3143*b* are executed on the apps 3141 and 3143, the resultant screens of execution of the plurality of operations 3141*b* and 3143*b* may be displayed on the display 3120. Alternatively, only some of the plurality of resultant screens of execution of the plurality of operations 3141*b* and 3143*b* may be displayed on the display 3120.

The memory 3140 may store an intelligent app (e.g., a speech recognition app) interworking with the intelligent agent 3151. The app interworking with the intelligent agent 3151 may receive user speech as a voice signal and process the same. The app interworking with the intelligent agent 3151 may be operated by particular inputs entered through the input module (e.g., inputs through the hardware key or touchscreen, or particular voice inputs).

The processor 3150 may control the overall operation of the user terminal 3100. For example, the processor 3150 may control the input module 3110 to receive user inputs, may control the display 3120 to display images, may control the speaker 3130 to output voice signals, and may control the memory 3140 to fetch or store necessary information.

The processor 3150 includes the intelligent agent 3151, the execution manager module 3153, and the intelligent service module 3155. The processor 3150 may execute commands stored in the memory 3140 to drive the intelligent agent 3151, the execution manager module 3153, and the intelligent service module 3155.

Several modules mentioned according to various embodiments of the present disclosure may be implemented in hardware or software. Operations performed by the intelligent agent 3151, the execution manager module 3153, and the intelligent service module 3155 may be appreciated as operations performed by the processor 3150.

The intelligent agent 3151 may generate commands to operate apps based on voice signals received as user inputs. The execution manager module 3153 may receive commands generated by the intelligent agent 3151 to select, execute, and operate the apps 3141 and 3143 stored in the memory 3140. The intelligent service module 3155 may be used to manage user information to process user inputs.

The intelligent agent 3151 may send user inputs received through the input module 3110 to the intelligence server 3200 for processing.

The intelligent agent 3151 may pre-process the user inputs before sending the user inputs to the intelligence server 3200. The intelligent agent 3151 may include an AEC module, an NS module, an EPD module, and/or an AGC module to pre-process the user inputs. The AEC module may remove echoes mixed in the user inputs. The NS module may suppress background noise mixed in the user inputs. The EPD module may detect end points of user voices contained in the user inputs to find where the user voices are present. The AGC module may recognize the user inputs and adjust the volume of the user inputs to be properly processed.

Although the intelligent agent 3151 may include all of the pre-processing components described above to provide a better performance, the intelligent agent 3151 may alternatively include only some of the pre-processing components to be operated at reduced power.

The intelligent agent 3151 may include a wake-up recognition module to recognize a user command. The wake-up recognition module may recognize a user's wake-up command through the speech recognition module, and upon receiving the wake-up command, the wake-up recognition module may activate the intelligent agent 3151 to receive user inputs. The wake-up recognition module of the intelligent agent 3151 may be implemented in a low-power processor (e.g., a processor included in an audio codec). The intelligent agent 3151 may be activated by a user input through the hardware key. When the intelligent agent 3151 is activated, an intelligent app (e.g., a speech recognition app) interworking with the intelligent agent 3151 may be executed.

The intelligent agent 3151 may include a speech recognition module to execute user inputs. The speech recognition module may receive user inputs to execute operations on the app. For example, the speech recognition module may recognize limited user (voice) inputs (e.g., the "Click" sound made when the capturing operation is executed on the camera app) for executing operations, such as the wake-up command on the apps 3141 and 3143. The speech recognition module assisting the intermediate screen in recognizing user inputs may recognize user commands that may be processed in the user terminal 3100 and quickly process the user commands. The speech recognition module to execute user inputs of the intelligent agent 3151 may be implemented in an app processor.

The speech recognition module (including the speech recognition module of the wake-up recognition module) of the intelligent agent 3151 may recognize user inputs using an algorithm for recognizing voice. The algorithm used to recognize voice may be at least one of a hidden Markov model (HMM) algorithm, an artificial neural network (ANN) algorithm, and a dynamic time warping (DTW) algorithm.

The intelligent agent 3151 may convert user speech into text data. The intelligent agent 3151 may deliver the user speech to the intelligence server 3200 and receive converted text data. Accordingly, the intelligent agent 3151 may display the text data on the display 3120.

The intelligent agent 3151 may receive a path rule from the intelligence server 3200. The intelligent agent 3151 may send the path rule to the execution manager module 3153.

The intelligent agent 3151 may send an execution result log as per the path rule received from the intelligence server 3200 to the intelligent service module 3155. The execution result log sent may be accrued and managed in user preference information of a persona manager 3155B.

The execution manager module 3153 may receive the path rule from the intelligent agent 3151, execute the apps 3141 and 3143, and allow the apps 3141 and 3143 to perform the operations 3141*b* and 3143*b* contained in the path rule. For example, the execution manager module 3153 may send command information to execute the operations 3141*b* and 3143*b* to the apps 3141 and 3143 and receive completion information about the operations 3141*b* and 3143*b* from the apps 3141 and 3143.

The execution manager module 3153 may send or receive command information to execute the operations 3141*b* and 3143*b* of the apps 3141 and 3143 between the intelligent agent 3151 and the apps 3141 and 3143. The execution manager module 3153 may bind the apps 3141 and 3143 to be executed according to the path rule and send the command information about the operations 3141*b* and 3143*b* included in the path rule to the apps 3141 and 3143. For example, the execution manager module 3153 may sequentially send the operations 3141*b* and 3143*b* included in the path rule to the apps 3141 and 3143 and sequentially execute the operations 3141*b* and 3143*b* of the apps 3141 and 3143 according to the path rule.

The execution manager module 3153 may manage the execution states of the operations 3141*b* and 3143*b* of the apps 3141 and 3143. For example, the execution manager module 3153 may receive information about the execution states of the operations 3141*b* and 3143*b* from the apps 3141 and 3143. When the execution states of the operations 3141*b* and 3143*b* are partial landing states (e.g., when no parameters required for the operations 3141*b* and 3143*b* are entered yet), the execution manager module 3153 may send information about the partial landing states to the intelligent agent 3151. The intelligent agent 3151 may request the user to enter information (e.g., parameter information) using the received information. When the execution states of the operations 3141*b* and 3143*b* are operation states, speech may be received from the user, and the execution manager module 3153 may send information about the apps 3141 and 3143*s* being executed and information about the execution states to the intelligent agent 3151. The intelligent agent 3151 may receive parameter information about the user speech through the intelligence server 3200 and send the received parameter information to the execution manager module 3153. The execution manager module 3153 may change the parameters of the operations 3141*b* and 3143*b* into new parameters using the received parameter information.

The execution manager module 3153 may deliver the parameter information included in the path rule to the apps 3141 and 3143. When the plurality of apps 3141 and 3143 are sequentially executed according to the path rule, the execution manager module 3153 may delivery the parameter information contained in the path rule from one app to the other.

The execution manager module 3153 may receive a plurality of path rules. The execution manager module 3153 may select a plurality of path rules based on a user utterance. For example, when user speech specifies a certain app 3141 for executing an operation 3141*a*, but does not specify another app 3143 to execute another operation 3143*b*, the execution manager module 3153 may receive a plurality of different path rules by which the same app 3141 (e.g., gallery app) to execute the operation 3141*a* is executed and a different app 3143 (e.g., message app or telegram app) to execute the other operation 3143*b* is executed. The execution manager module 3153 may execute the same operations 3141*b* and 3143*b* (e.g., the same continuous operations 3141*b* and 3143*b*) of the plurality of path rules. When the same operations have been executed, the execution manager module 3153 may display, on the display 3120, the state screen in which the different apps 3141 and 3143 are each included in a respective one of the plurality of path rules in order to be selected.

The intelligent service module 3155 includes a context module 3155*a*, a persona manager 3155*b*, and a proposing module 3155*c*.

The context module 3155*a* may gather current states of the apps 3141 and 3143 from the apps 3141 and 3143. For example, the context module 3155*a* may receive context information indicating the current states of the apps 3141 and 3143 to gather the current states of the apps 3141 and 3143.

The persona manager 3155*b* may manage personal information of the user of the user terminal 3100. For example, the persona manager 3155*b* may gather user information and execution results for the user terminal 3100 to manage the user's personal information.

The proposing module 3155*c* may predict the user's intent in order to recommend commands. For example, the proposing module 3155*c* may recommend commands given the user's current state (e.g., time, place, context, or app).

Figure 32:
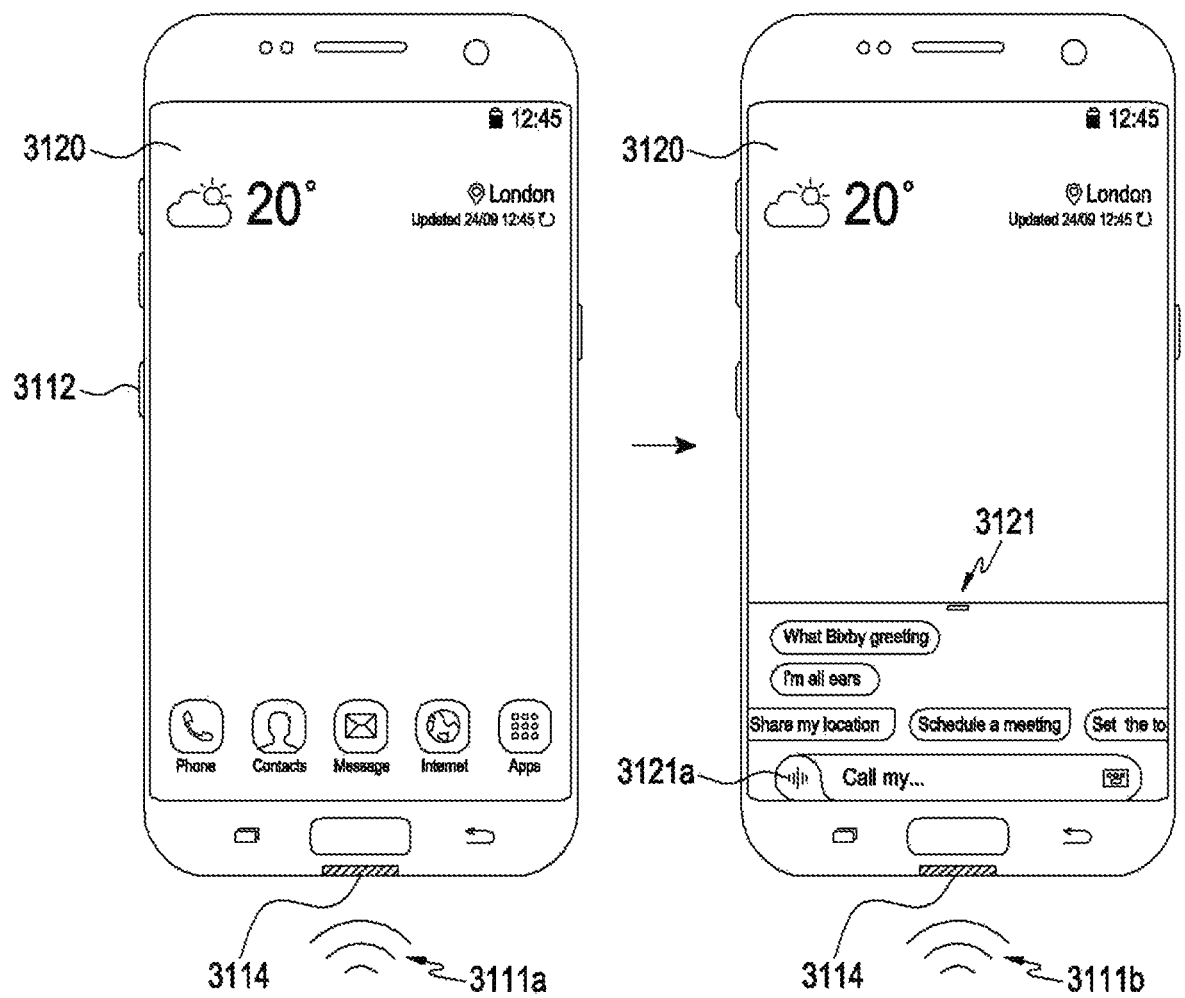
FIG. 32 illustrates example screen images displayed when executing an intelligence application on a user terminal according to an embodiment of the present disclosure.

FIG. 32 illustrates example screen images displayed when executing an intelligence application on a user terminal according to an embodiment of the present disclosure. Specifically, FIG. 32 illustrates an example in which a user terminal receives user inputs and execute an intelligent app (e.g., a speech recognition app) interworking with an intelligent agent.

Referring to FIG. 32, the user terminal executes an intelligent app to recognize voice through the hardware key 3112. For example, when the user terminal receives user inputs through the hardware key 3112, the user terminal display a UI 3121 for the intelligent app on the display 3120. The user may touch a speech recognition button 3121*a* in the UI 3121 of the intelligent app for voice entry 3111*b* with the intelligent app UI 3121 displayed on the display 3120. The user may continuously press the hardware key 3112 for voice entry 3111*b*.

The user terminal may execute an intelligent app to recognize voice through the microphone 3114. For example, when a designated voice command (e.g., "wake up!") is entered 3111*a* through the microphone 3114, the user terminal displays the intelligent app UI 3121 on the display 3120.

Figure 33:
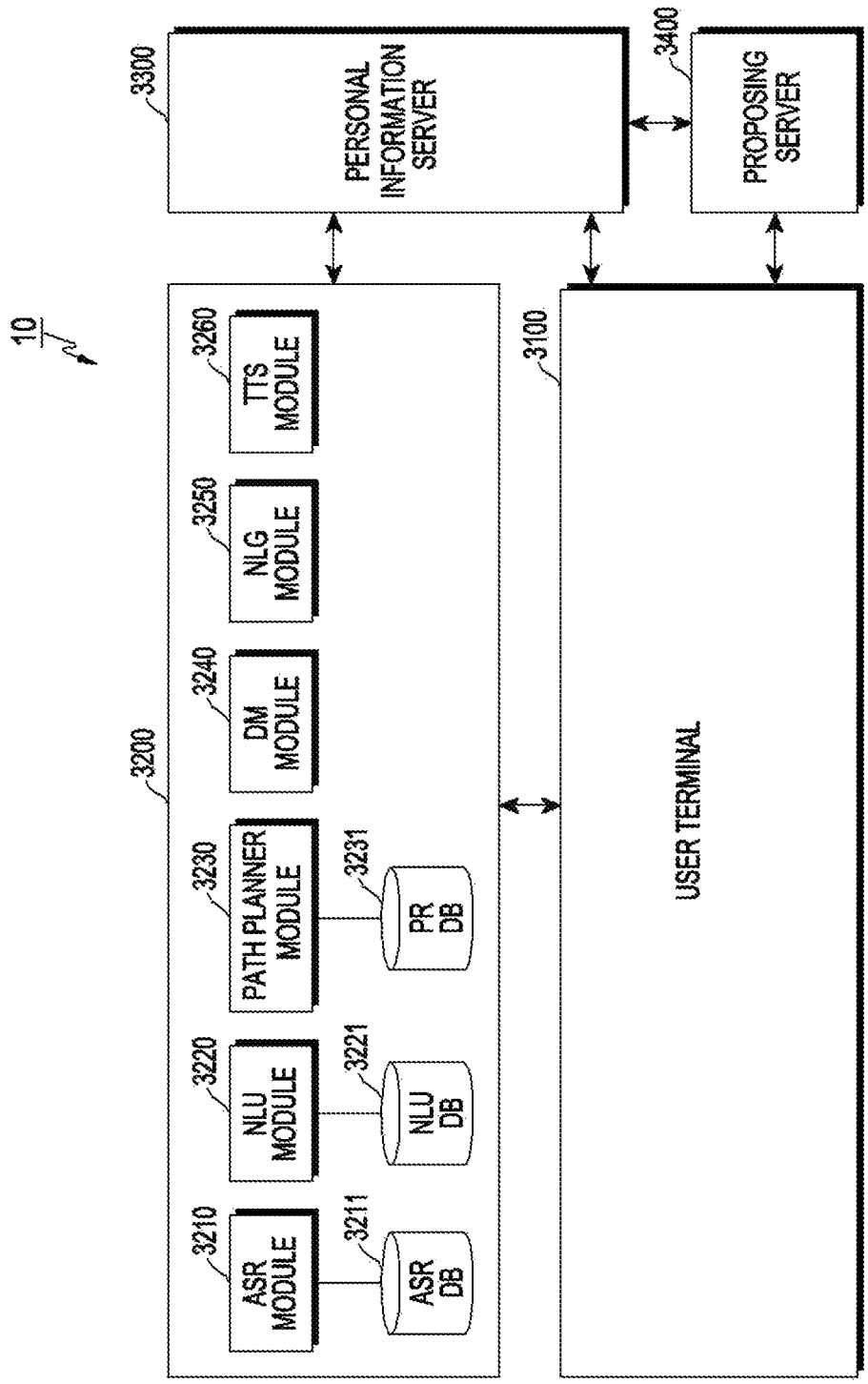
FIG. 33 illustrates an intelligence server in an integrated intelligence system according to an embodiment of the present disclosure.

FIG. 33 illustrates an intelligence server in an integrated intelligence system according to an embodiment of the present disclosure.

Referring to FIG. 33, an intelligence server 3200 includes an ASR module 3210, an NLU module 3220, a path planner module 3230, a DM module 3240, an NLG module 3250, and a TTS module 3260.

The NLU module 3220 or the path planner module 3230 of the intelligence server 3200 may generate a path rule.

The ASR module 3210 may convert user inputs received from the user terminal 3100 into text data. For example, the ASR module 3210 may include a speech recognition module. The speech recognition module may include an acoustic model and a language model. The acoustic modem may include vocalization-related information, and the language model may include unit phonemic information and combinations of pieces of unit phonemic information. The speech recognition module may convert user speech into text data using the vocalization-related information and unit phonemic information. Information about the acoustic model and the language model may be stored in an ASR data base (DB) 3211.

The NLU module 3220 may perform syntactic analysis or semantic analysis to identify a user's intent. As per the syntactic analysis, the user input may be divided into syntactic units (e.g., words, phrases, or morphemes) in order to identify syntactic elements in the syntactic units. The semantic analysis may be performed using semantic matching, rule matching, and/or formula matching. Thus, the NLU module 3220 may obtain a domain, intent, or parameters (or slots) to represent the intent for the user input.

The NLU module 3220 may determine the user's intent and parameters using the matching rule, which has been divided into the domain, intent, and parameters (or slots) for identifying the intent. For example, one domain (e.g., an alarm) may include a plurality of intents (e.g., alarm settings or releasing alarm), and one intent may include a plurality of parameters (e.g., time, repetition count, or alarm sound). The plurality of rules may include one or more essential element parameters. The matching rule may be stored in an NLU DB 3221.

The NLU module 3220 may identify the meaning of a word extracted from the user input using linguistic features (e.g., syntactic elements) such as morphemes or phrases, match the identified meaning of the word to the domain and intent, and determine the user's intent. For example, the NLU module 3220 may calculate how many words extracted from the user input are included in each domain and intent to thereby determine the user's intent. The NLU module 3220 may determine the parameters of the user input using the word, which is a basis for identifying the intent.

The NLU module 3220 may determine the user's intent using the NLU DB 3221 storing the linguistic features for identifying the intent of the user input. The NLU module 3220 may determine the user's intent using a personal language model (PLM).

For example, the NLU module 3220 may determine the user's intent using personal information (e.g., contacts list or music list). The PLM may be stored in the NLU DB 3221. The ASR module 3210 may also recognize the user's voice by referring to the PLM stored in the NLU DB 3221.

The NLU module 3220 may generate a path rule based on the intent of the user input and parameters. For example, the NLU module 3220 may select an app to be executed based on the intent of the user input and determine operations to be performed on the selected app. The NLU module 3220 may determine parameters corresponding to the determined operations to generate a path rule. The path rule generated by the NLU module 3220 may include information about the app to be executed, the operations to be executed on the app, and the parameters for executing the operations.

The NLU module 3220 may generate one or more path rules based on the parameters and intent of the user input. For example, the NLU module 3220 may receive a path rule set corresponding to the user terminal 3100 from the path planner module 3230, map the parameters and intent of the user input to the received path rule set, and determine the path rule.

The NLU module 3220 may determine the app to be executed, operations to be executed on the app, and parameters for executing the operations based on the parameters and intent of the user input, thereby generating one or more path rules. For example, the NLU module 3220 may generate a path rule by arranging the app to be executed and the operations to be executed on the app in the form of ontology or a graph model according to the user input using the information of the user terminal 3100. The generated path rule may be stored through the path planner module 3230 in a path rule database (PR DB) 3231. The generated path rule may be added to the path rule set of the database 3231.

The NLU module 3220 may select at least one of a plurality of path rules generated. For example, the NLU module 3220 may select the optimal one of the plurality of path rules. Alternatively, the NLU module 3220 may select a plurality of path rules when some operations are specified based on the user speech. The NLU module 3220 may determine one of the plurality of path rules by the user's additional input.

The NLU module 3220 may send the path rule to the user terminal 3100 at a request for the user input. For example, the NLU module 3220 may send one path rule corresponding to the user input to the user terminal 3100. As another example, the NLU module 3220 may send a plurality of path rules corresponding to the user input to the user terminal 3100. When only some operations are specified based on the user speech, the plurality of path rules may be generated by the NLU module 3220.

The path planner module 3230 may select at least one of the plurality of path rules. The path planner module 3230 may deliver a path rule set including the plurality of path rules to the NLU module 3220. The plurality of path rules in the path rule set may be stored in the form of a table in the path rule database 3231 connected with the path planner module 3230. For example, the path planner module 3230 may deliver a path rule set corresponding to information (e.g., OS information or app information) of the user terminal 3100, which is received from the intelligent agent 3151 to the NLU module 3220. The table stored in the path rule database 3231 may be stored per domain or per domain version. Path rule planning may also be referred to as action sequence planning according to an implementation.

The path planner module 3230 may select one or more path rules from the path rule set and deliver the same to the NLU module 3220. For example, the path planner module 3230 may match the user's intent and parameters to the path rule set corresponding to the user terminal 3100 to select one or more path rules and deliver them to the NLU module 3220.

The path planner module 3230 may generate one or more path rules using the user's intent and parameters. For example, the path planner module 3230 may determine an app to be executed and operations to be executed on the app based on the user's intent and parameters to generate one or more path rules. The path planner module 3230 may store the generated path rule in the path rule database 3231.

The path planner module 3230 may store the path rule generated by the NLU module 3220 in the path rule database 3231. The generated path rule may be added to the path rule set stored in the path rule database 3231.

The table stored in the path rule database 3231 may include a plurality of path rules or a plurality of path rule sets. The plurality of path rule or the plurality of path rule sets may reflect the kind, version, type, and/or nature of the device performing each path rule.

The DM module 3240 may determine whether the user's intent identified by the path planner module 3230 is clear. For example, the DM module 3240 may determine whether the user's intent is clear based on whether parameter information is sufficient. The DM module 3240 may determine whether the parameters determined by the NLU module 3220 are sufficient to perform a task. When the user's intent is unclear, the DM module 3240 may perform feedback to send a request for information to the user. For example, the DM module 3240 may perform feedback to send a request for parameter information to identify the user's intent.

The DM module 3240 may include a content provider module. When the operation can be performed based on the intent and parameters identified by the NLU module 3220, the content provider module may generate the results of performing the task corresponding to the user input. The DM module 3240 may send the results generated by the content provider module to the user terminal 3100 in response to the user input.

The NLG module 3250 may convert designated information into text. The text information may be in the form of a natural language speech. The designated information may be information about an additional input, information indicating that the operation corresponding to the user input is complete, or information indicating the user's additional input (e.g., feedback information for the user input). The text information may be sent to the user terminal 3100 and displayed on the display 3120, or the text information may be sent to the TTS module 3260 and converted into a voice.

The TTS module 3260 may convert text information into voice information. The TTS module 3260 may receive the text information from the NLG module 3250, convert the text information into voice information, and send the voice information to the user terminal 3100. The user terminal 3100 may output the voice information through the speaker 3130.

The NLU module 3220, the path planner module 3230, and the DM module 3240 may be implemented in a single module to determine the user's intent and parameter and to generate a response (e.g., a path rule) corresponding to the determined user's intent and parameters. Accordingly, the generated response may be transmitted to the user terminal 3100.

Figure 34:
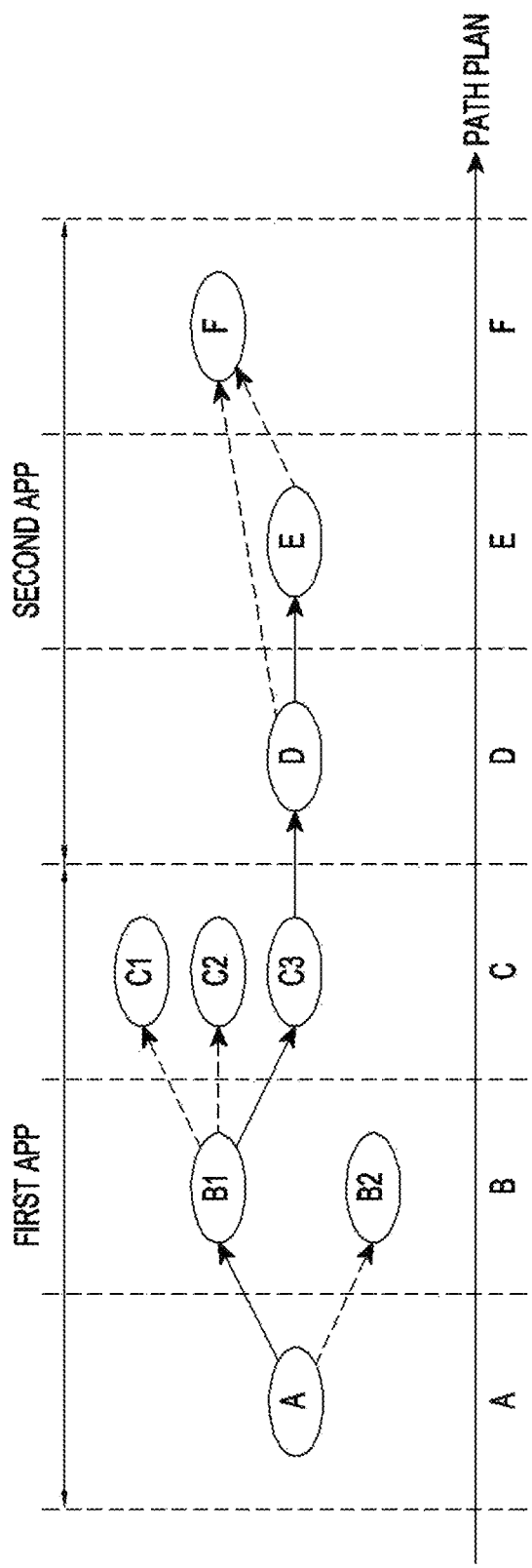
FIG. 34 illustrates a method for generating a path rule by a path NLU module according to an embodiment of the present disclosure.

FIG. 34 is a view illustrating a method for generating a path rule by a path NLU module according to an embodiment of the present disclosure.

Referring to FIG. 34, the NLU module separates functions of an app into unit operations A to F and stores in a path rule database. For example, the NLU module stores a path rule set including a plurality of path rules A-B1-C1, A-B1-C2, A-B1-C3-D-F, and A-B1-C3-D-E-F in the path rule database.

The path rule database of a path planner module may store the path rule set to perform the functions of the app. The path rule set may include a plurality of path rules including the plurality of operations. The plurality of path rules include operations executed sequentially according to parameter inputted for each of operations. The plurality of path rules may be configured in the form of ontology or a graph model and stored in the path rule database.

The NLU module may select an optimal path rule, e.g., A-B1-C3-D-F, of the plurality of path rules A-B1-C1, A-B1-C2, A-B1-C3-D-F, and A-B1-C3-D-E-F corresponding to the parameters and the intent of the user input.

The NLU module may deliver the plurality of path rules to the user terminal unless there is a path rule perfectly matching the user input. For example, the NLU module may select the path rule (e.g., A-B1) partially corresponding to the user input. The NLU module may select one or more path rules (e.g., A-B1-C1, A-B1-C2, A-B1-C3-D-F, and/or A-B1-C3-D-E-F) including the path rule (e.g., A-B1) partially corresponding to the user input and deliver the same to the user terminal.

The NLU module may select one of the plurality of path rules based on an additional input of the user terminal and deliver the selected path rule to the user terminal. For example, the NLU module may select one (e.g., A-B1-C3-D-F) among the plurality of path rules (e.g., A-B1-C1, A-B1-C2, A-B1-C3-D-F, and A-B1-C3-D-E-F) as per an additional user input (e.g., an input to select C3) of the user terminal and send the selected path rule to the user terminal.

The NLU module may determine the user's intent and parameters corresponding to the additional user input (e.g., an input to select C3) to the user terminal through the NLU module and send the user's intent or parameters determined to the user terminal. The user terminal may select one (e.g., A-B1-C3-D-F) among the plurality of path rules (e.g., A-B1-C1, A-B1-C2, A-B1-C3-D-F, and A-B1-C3-D-E-F) based on the parameters or intent sent.

Accordingly, the user terminal may complete the operations of the applications, e.g., apps 3141 and 3143 as illustrated in FIG. 31, by the selected path rule.

When a user input having insufficient information is received by an intelligence server, an NLU module may generate a path rule partially corresponding to the received user input. For example, the NLU module may send the partially corresponding path rule to the intelligent agent 3151. An intelligent agent may send the partially corresponding path rule to an execution manager module, and the execution manager module may execute a first app as per the path rule. The execution manager module may send information about the insufficient parameters to the intelligent agent while executing the first app. The intelligent agent may send a request for additional input to the user using the information about the insufficient parameters.

Upon receiving an additional input from the user, the intelligent agent may send the same to the intelligence server for processing. The NLU module may generate an added path rule based on the parameter information and intent of the additional user input and send the path rule to the intelligent agent. The intelligent agent may send the path rule to the execution manager module to execute a second app.

When a user input having some missing information is received by the intelligence server, the NLU module may send a request for user information to the personal information server. The personal information server may send, to the NLU module, information about the user who has entered the user input stored in the persona database. The NLU module may select a path rule corresponding to the user input having some missing operations using the user information. Accordingly, although a user input having some missing information is received by the intelligence server, the NLU module may send a request for the missing information and receive an additional input, or the NLU module may use the user information, determining a path rule corresponding to the user input.

Figure 35:
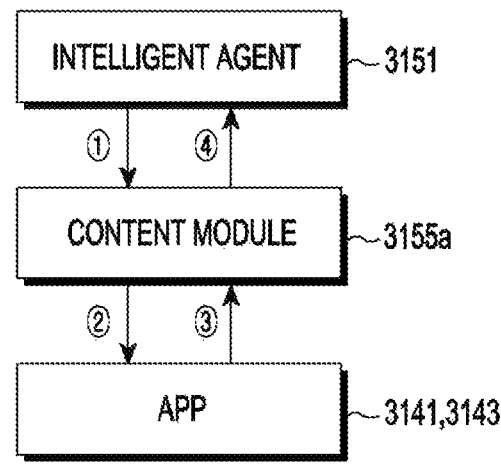
FIG. 35 illustrates gathering current states by a context module of a processor according to an embodiment of the present disclosure.

FIG. 35 illustrates gathering current states by a context module of a processor according to an embodiment of the present disclosure.

Referring to FIG. 35, upon receiving (①) a context request from the intelligent agent 3151, a context module 3155a sends a request (②) for context information indicating the current states to the apps 3141 and 3143. The context module 3155a receives (③) the context information from the apps 3141 and 3143 and sends (④) to the intelligent agent 3151.

The context module 3155a may receive a plurality of pieces of context information through the apps 3141 and 3143. For example, the context information may be information about the apps 3141 and 3143 most recently executed. For example, the context information may be information about the current states of the apps 3141 and 3143 (e.g., when a photo is viewed in a gallery, information about the photo).

The context module 3155a may also receive the context information indicating the current state of the user terminal 3100 from a device platform, not only from the apps 3141 and 3143. The context information may include normal context information, user context information, and/or device context information.

The normal context information may include normal information about the user terminal. The normal context information may be identified by receiving data through, e.g., a sensor hub of the device platform, and by an internal algorithm. The normal context information may include information about the current time/space, e.g., information about the current time or the current position of the user terminal. The current time may be identified by a clock of the user terminal, and the information about the current position may be identified by the GPS. For example, the normal context information may include information about physical motion. The information about physical motion may include information about walking, running, and/or driving. The physical motion information may be identified by a motion sensor. The driving information may be identified by the motion sensor. A bluetooth connection in a vehicle may be detected so that getting aboard and parking may be identified. The normal context information may include user activity information, such as information about commuting, shopping, and/or traveling. The user activity information may be identified using information about a place which has been registered in the database by the user or app.

The user context information may include information about the user. For example, the user context information may include information about the user's emotional state. The emotional state information may include information about the user's happiness, sadness, and/or anger.

Further, the user context information may include information about the user's current state, e.g., information about interests or intents (e.g., shopping).

The device context information may include information about the state of the user terminal. For example, the device context information may include information about the path rule executed by an execution manager module. As another example, the device information may include battery information, which may be identified through a charged or discharged state of the battery. Further, the device information may include information about a network or a connected device, which may be identified through the communication interface connected with the device.

Figure 36:
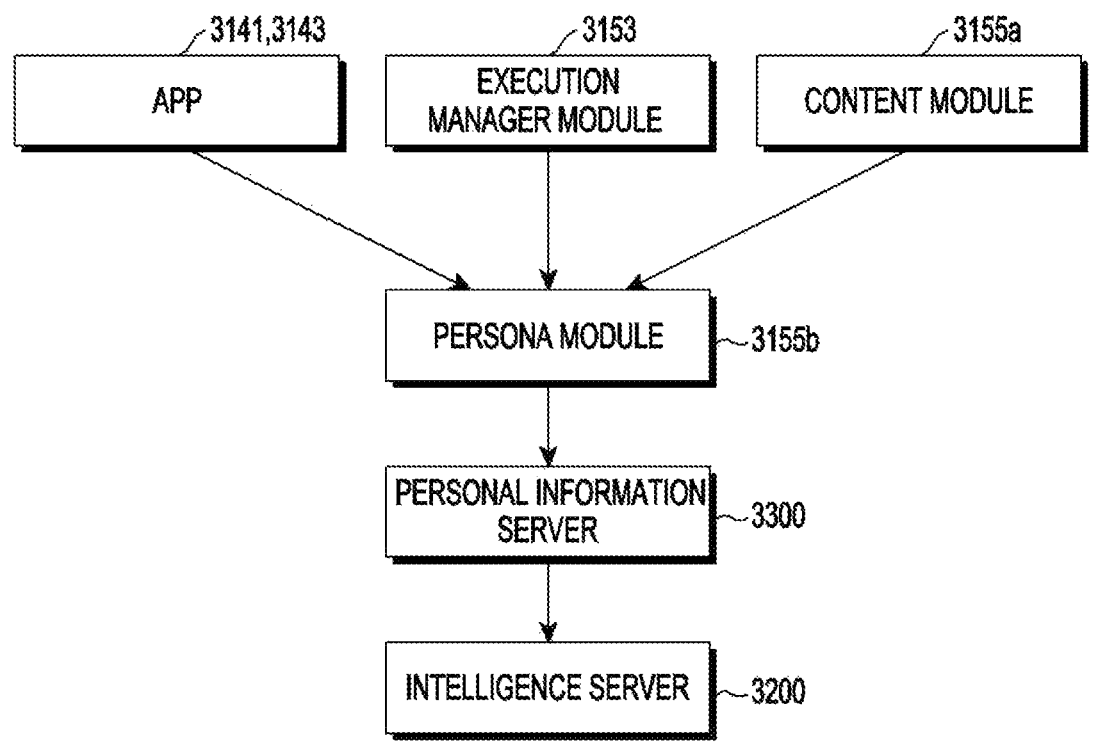
FIG. 36 illustrates user information management by a persona module according to an embodiment of the present disclosure.

FIG. 36 illustrates managing user information by a persona module according to an embodiment of the present disclosure.

Referring to FIG. 36, the persona module 3155b may receive information about the user terminal 3100 from the apps 3141 and 3143, execution manager module 3153, and/or the context module 3155a. The apps 3141 and 3143 and the execution manager module 3153 may store resultant information of execution of the app operations 3141b and 3143b in the operation log database. The context module 3155a may store information about the current state of the user terminal 3100 in the context database. The persona module 3155b may receive the stored information from the operation log database or the context database. The data stored in the operation log database and the context database may be analyzed by, e.g., an analysis engine, and sent to the persona module 3155b.

The persona module 3155b may send the information received from the apps 3141 and 3143, the execution manager module 3153, and/or the context module 3155a to the proposing module 3155c. For example, the persona module 3155b may send the data stored in the operation log database or context database to the proposing module 3155c.

The persona module 3155b may send the information received from the apps 3141 and 3143, the execution manager module 3153, and/or the context module 3155a to the personal information server 3300. For example, the persona module 3155b may periodically send the data accrued in the operation log database or context database to the personal information server 3300.

The persona module 3155b may send the data stored in the operation log database or context database to the proposing module 3155c. User information generated by the persona module 3155b may be stored in a persona database. The persona module 3155b may periodically send user information stored in the persona database to the personal information server 3300. The information sent by the persona module 3155b to the personal information server 3300 may be stored in the persona database. The personal information server 3300 may determine user information for generating a path rule of the intelligence server 3200 using the information stored in the persona database.

The user information determined using the information sent from the persona module 3155b may include profile information or preference information. The profile information or the preference information may be determined from the user's account and accrued information.

The profile information may include the user's personal information. The profile information may include the user's population statistics information. The population statistics information may include the user's gender or age.

As another example, the profile information may include life event information. The life event information may be determined by comparing log information with a life event model, and reinforced by analyzing the behavior pattern.

As another example, the profile information may include interest information. The interest information may include shopping goods of interest or field of interest (e.g., sports or politics).

Further, the profile information may include activity region information. The activity region information may include information about a home or a work place. The activity region information may also include information about regions recorded with priorities based on the accrued time of stay and visit count.

The profile information may also include activity time information, which may include information about a wake-up time, a commute time, and/or a sleep time. The commute time information may be determined using the activity region information (e.g., information about home or working place). The sleep time information may be determined through unused time of the user terminal.

The preference information may include information about the user's preferences. For example, the preference information may include information about app preferences. The app preferences may be determined through a record of use of an app (e.g., use record per time or place). The app preference may be used to determine an app to be executed according to the user's current state (e.g., time or place).

The preference information may also include information about a contacts preference. The contacts preference may be determined by analyzing information about how frequently the user has contacted with a person, e.g., per time or place. The contacts preference may be used to determine contacts according to the user's current state (e.g., contact to overlapping names).

As another example, the preference information may include setting information, which may be determined by analyzing how frequent particular settings are made, e.g., per time or place. The setting information may be used to make particular settings according to the user's current state (e.g., time, place, or context).

Further, the preference information may include a place preference, which may be determined through a record of visit to a particular place (e.g., a record of visit per time). The place preference may be used to determine the place that the user is visiting at the current time.

Further, the preference information may include a command preference, which may be determined through frequency of use of commands (e.g., use frequency per time or place). The command preference may be used to determine a command pattern to be used according to the user's current state (e.g., time or place). In particular, the command preference may include information about the menu most often chosen by the user in the current state of the app executed through analysis of log information.

Figure 37:
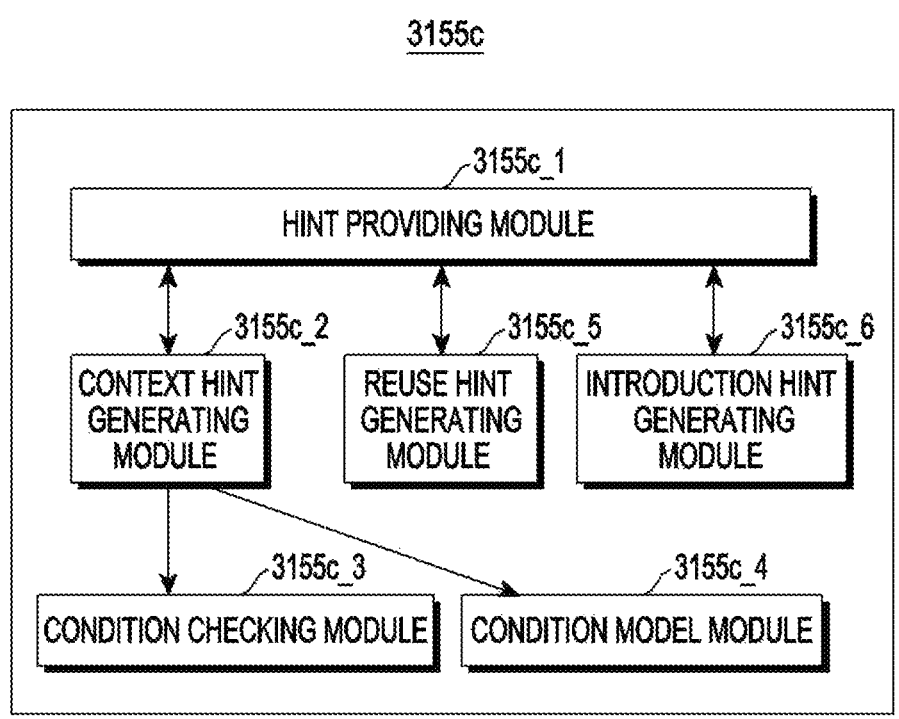
FIG. 37 illustrates a proposing module according to an embodiment of the present disclosure.

FIG. 37 illustrates a proposing module according to an embodiment of the present disclosure.

Referring to FIG. 37, the proposing module 3155c includes a hint providing module 3155c_1, a context hint generating module 3155c_2, a condition checking module 3155c_3, condition model module 3155c_4, a reuse hint generating module 3155c_5, and an introduction hint generating module 3155c_6.

The hint providing module 3155c_1 may provide hints to the user. For example, the hint providing module 3155c_1 may receive generated hints from the context hint generating module 3155c_2, the reuse hint generating module 3155c_5, and/or introduction hint generating module 3155c_6 and provide the hints to the user.

The context hint generating module 3155c_2 may generate hints recommendable according to the current state through the condition checking module 3155c_3 and/or the condition model module 3155c_4. The condition checking module 3155c_3 may receive information corresponding to the current state through the intelligent service module 3155, and the condition model module 3155c_4 may set a condition model using the received information. For example, the condition model module 3155c_4 may identify the time, location, context, and/or app being used, when the hints are provided to the user, and provide the user with the hints highly likely to be used in a descending order of priority.

The reuse hint generating module 3155c_5 may generate recommendable hints given the use frequency according to the current state. For example, the reuse hint generating module 3155c_5 may generate hints considering the user's use pattern.

The introduction hint generating module 3155c_6 may generate hints to introduce the user to new functions or functions that other users frequently use. For example, a hint to introduce new functions may include an introduction to the intelligent agent (e.g., a method to operate).

The context hint generating module 3155c_2, condition checking module 3155c_3, condition model module 3155c_4, reuse hint generating module 3155c_5, and/or introduction hint generating module 3155c_6 of the proposing module 3155c may be included in the personal information server. For example, the hint providing module 3155c_1 of the proposing module 3155c may receive hints from the context hint generating module 3155c_2, reuse hint generating module 3155c_5, and/or introduction hint generating module 3155c_6 of the personal information server and provide the received hints to the user.

The user terminal may provide hints according to a series of processes as follows. For example, upon receiving a provide hint request from the intelligent agent 3151, the hint providing module 3155c_1 may send a generate hint request to the context hint generating module 3155c_2.

Upon receiving the generate hint request, the context hint generating module 3155c_2 may use the condition checking module 3155c_3 to receive information corresponding to the current state from the context module 3155a and persona module 3155b. The condition checking module 3155c_3 may send the received information to the condition model module 3155c_4, and the condition model module 3155c_4 may assign priorities to the hints provided to the user in descending order of availability using the information. The context hint generating module 3155c_2 may identify the condition and generate hints corresponding to the current state. The context hint generating module 3155c_2 may send the generated hints to the hint providing module 3155c_1. The hint providing module 3155c_1 may sort the hints according to a designated rule and transmit the hints to the intelligent agent.

The hint providing module 3155c_1 may generate a plurality of context hints and assign priorities to the plurality of context hints as per a designated rule. The hint providing module 3155c_1 may first provide the user with a hint with the highest priority among the plurality of context hints.

The user terminal may propose hints according to use frequency.

For example, upon receiving a provide hint request from the intelligent agent, the hint providing module 3155c_1 may send a generate hint request to the reuse hint generating module 3155c_5. The reuse hint generating module 3155c_5, upon receiving the generate hint request, may receive user information from the persona module 3155b. For example, the reuse hint generating module 3155c_5 may receive the path rule included in the user's preference information, parameters included in the path rule, frequency of execution of app, and information about the time/space where the app has been used, from the persona module. The reuse hint generating module 3155c_5 may generate hints corresponding to the received user information. The reuse hint generating module 3155c_5 may send the generated hints to the hint providing module 3155c_1. The hint providing module 3155c_1 may sort the hints and transmit the hints to the intelligent agent 3151.

The user terminal may also propose hints for new functions.

For example, upon receiving a provide hint request from the intelligent agent, the hint providing module 3155c_1 may send a generate hint request to the introduction hint generating module 3155c_6. The introduction hint generating module 3155c_6 may send a provide introduction hint request from a proposing server and receive information about functions to be introduced from the proposing server. For example, the proposing server may store the information about the functions to be introduced. A hint list for the functions to be introduced may be updated by the service operator. The introduction hint generating module 3155c_6 may send the generated hints to the hint providing module 3155c_1. The hint providing module 3155c_1 may sort the hints and transmit the hints to the intelligent agent.

Accordingly, the proposing module 3155c may provide hints generated by the context hint generating module 3155c_2, reuse hint generating module 3155c_5, and/or introduction hint generating module 3155c_6 to the user. For example, the proposing module 3155c may display the generated hints on the app that operates the intelligent agent and receive inputs to select the hints from the user through the app.

According to an embodiment of the present disclosure, a method for operating an electronic device includes receiving a first user input including a request to perform tasks using the electronic device, sending data associated with the first user input to an external server, receiving, from the external server, a response including information about a plurality of states having an order of the electronic device to perform the tasks, after receiving the response, performing the tasks according to the order, receiving a second user input including a request for canceling at least some of the tasks performed, and returning to one of the plurality of states, based on the second user input.

The method may further include sending data for the second user input and receiving another response from the external server. The other response instruct the electronic device to return to the one state of the plurality of states.

Performing the tasks by the electronic device may include displaying at least one of screens or images associated with the plurality of states having the order.

The method may further include, when the second user input includes a request for canceling all of the tasks performed, returning to a state before the electronic device has the plurality of states having the order based on the second user input.

According to an embodiment of the present disclosure, a method for operating an electronic device includes receiving a first user input including a request for performing a first task, sending first data associated with the first user input to an external server, receiving, from the external server, a first response including first information about a plurality of first states having an order of the electronic device to perform the first task, after receiving the first response, performing the first task by allowing the electronic device to have the plurality of first states of the order, receiving a second user input including a second request for performing a second task, and sending second data associated with the second user input, along with at least part of the first information, to the external server.

The second user input may include a request for canceling at least part of the first task performed.

The method may further include returning to one of the plurality of first states based on at least part of the second user input.

According to an embodiment of the present disclosure, a method for operating an electronic device include displaying a first screen, obtaining first user speech while displaying the first screen, displaying, instead of the first screen, a second screen associated with a first task among a plurality of tasks corresponding to the first user speech, displaying, instead of the second screen, a third screen associated with a second task among the plurality of tasks corresponding to the first user speech, obtaining a command to cancel at least some of the plurality of tasks while displaying the third screen, selecting one of the first screen or the second screen using a result of analyzing the cancellation command, and displaying the selected screen.

The cancellation command may include a request for canceling all of the plurality of tasks. Selecting one of the first screen or the second screen using the result of analyzing the cancellation command and displaying the selected screen may include canceling all of the plurality of tasks and displaying the first screen.

The cancellation command may further include a request for performing at least one other task, at least partially, different from the plurality of tasks. Selecting one of the first screen or the second screen using the result of analyzing the cancellation command and displaying the selected screen may include canceling all of the plurality of tasks and displaying the first screen, and then displaying, instead of the first screen, a fourth screen associated with the, at least one, other task.

The cancellation command may include a request for canceling some of the plurality of tasks. Selecting one of the first screen or the second screen using the result of analyzing the cancellation command and displaying the selected screen may include canceling some of the plurality of tasks and displaying the second screen.

The cancellation command may further include a request for performing at least one other task, at least partially, different from the plurality of tasks. Selecting one of the first screen or the second screen using the result of analyzing the cancellation command and displaying the selected screen may include canceling all of the plurality of tasks and displaying the first screen, and then displaying, instead of the first screen, a fourth screen associated with the, at least one, other task.

The cancellation command may further include a request for performing at least one other task, at least partially, different from the plurality of tasks. Selecting one of the first screen or the second screen using the result of analyzing the cancellation command and displaying the selected screen may include canceling some of the plurality of tasks, and while canceling the tasks, displaying, instead of the second screen, a sixth screen for performing another task.

The second screen may be any one of a screen displayed immediately before the third screen is displayed, a screen corresponding to a state requiring an additional user input to perform another task, and a screen immediately after an application used is varied.

The method may further include sending data for the first user speech to the external server, receiving the plurality of tasks corresponding to the first user speech, sending data for the cancellation command to the external server, and receiving a result of analyzing the cancellation command.

The method may further include performing an ASR process on data for the first user speech to obtain first text and performing an NLU process on the first text to obtain the plurality of tasks.

Each of the aforementioned components of the electronic device may include one or more parts, and a name of the part may vary with a type of the electronic device. The electronic device may include at least one of the aforementioned components, omit some of them, or include other additional component(s). Some of the components may be combined into an entity, but the entity may perform the same functions as the components may do.

According to an embodiment of the present disclosure, a storage medium may be provided for storing commands configured to, when executed by at least one processor, enable the at least one processor to perform at least one operation that may receiving a first user input including a request for allowing tasks to be performed using the electronic device, sending data associated with the first user input to an external server, receiving, from the external server, a response including information about a plurality of states having an order of the electronic device to perform the tasks, after receiving the response, performing the tasks by allowing the electronic device to have the plurality of states of the order, receiving a second user input including a request for canceling at least some of the tasks performed, and returning to one of the plurality of states having the order based on, at least, the second user input.

The at least one operation may include receiving a first user input including a request for performing a first task, sending first data associated with the first user input to an external server, receiving, from the external server, a first response including first information about a plurality of first states having an order of the electronic device to perform the first task, after receiving the first response, performing the first task by allowing the electronic device to have the plurality of first states of the order, receiving a second user input including a second request for performing a second task, and sending second data associated with the second user input, along with at least part of the first information, to the external server.

The at least one operation may include displaying a first screen, obtaining a first user speech while displaying the first screen, displaying, instead of the first screen, a second screen associated with a first task among a plurality of tasks corresponding to the first user speech, displaying, instead of the second screen, a third screen associated with a second task among the plurality of tasks corresponding to the first user speech, obtaining a command to cancel at least some of the plurality of tasks while displaying the third screen, selecting one of the first screen or the second screen using a result of analyzing the cancellation command, and displaying the selected screen.

The at least one operation may include displaying a first screen on the touchscreen display, obtaining a first user speech through the microphone while displaying the first screen, displaying a third screen associated with a last task of a plurality of tasks corresponding to the first user speech instead of the first screen on the touchscreen display, obtaining a command to cancel at least some of the plurality of tasks while displaying the third screen, selecting one of the first screen or a second screen associated with a task prior in order to the last task among the plurality of tasks using a result of analyzing the cancellation command, and displaying the selected screen on the touchscreen display.

As is apparent from the foregoing description, according to embodiments of the present disclosure, there may be provided an electronic device that may cancel at least one of a plurality of tasks previously performed corresponding to user speech and a method for operating the same.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device, comprising:
   a housing;
   a touchscreen display disposed in the housing and exposed through a first portion of the housing;
   a microphone disposed in the housing and exposed through a second portion of the housing;
   at least one speaker disposed in the housing and exposed through a third portion of the housing;
   a wireless communication circuit disposed in the housing;
   at least one processor disposed in the housing and electrically connected with the touchscreen display, the microphone, the speaker, and the wireless communication circuit; and
   a memory disposed in the housing and electrically connected with the processor, wherein the memory stores instructions executed to enable the at least one processor to:
      receive a first user input through the touchscreen display or the microphone, the first user input including a request to perform tasks using the electronic device,
      send data associated with the first user input through the wireless communication circuit to an external server,
      receive a response from the external server through the wireless communication circuit, the response including information about a plurality of states of the electronic device to perform the tasks in an order,
      perform the tasks by causing the electronic device to have the plurality of states having the order after receiving the response,
      receive a second user input through the touchscreen display or the microphone, the second user input including a request to cancel at least one of the performed tasks,
      identify a first state of the plurality of states corresponding to the at least one of the performed tasks based on the second user input, and
      cancel the at least one of the performed tasks by causing the electronic device to return to the first state of the plurality of states.

2. The electronic device of claim 1, further comprising a physical button exposed on the housing, wherein the instructions are executed to enable the processor to receive the second user input through the physical button.

3. The electronic device of claim 2, wherein the physical button is disposed on a surface, of the housing, where the touchscreen display is disposed.

4. The electronic device of claim 2, wherein the physical button is disposed on a surface, of the housing, where the touchscreen display is not disposed.

5. The electronic device of claim 1, wherein the instructions, when executed, further instruct the processor to:
   receive the second user input through the microphone,
   send data for the second user input to the external server through the wireless communication circuit, and receive another response from the external server through the wireless communication circuit, and
wherein the another response causes the electronic device to return to the first state of the plurality of states.

6. The electronic device of claim 1, wherein the instructions, when executed, further instruct the processor to display, on the display, at least one of a screen or an image associated with the plurality of states.

7. The electronic device of claim 1, wherein the second user input includes a request for canceling all of the performed tasks, and
wherein the instructions, when executed, further instruct the processor to cause the electronic device to return to a state before the electronic device has the plurality of states, based on the second user input.

8. An electronic device, comprising:
a housing;
a touchscreen display disposed in the housing and exposed through a first portion of the housing;
a microphone disposed in the housing and exposed through a second portion of the housing;
at least one speaker disposed in the housing and exposed through a third portion of the housing;
a wireless communication circuit disposed in the housing;
at least one processor disposed in the housing and electrically connected with the touchscreen display, the microphone, the speaker, and the wireless communication circuit; and
a memory disposed in the housing and electrically connected with the processor, wherein the memory stores instructions executed to enable the at least one processor to:
receive a first user input through the touchscreen display or the microphone, the first user input including a request for the electronic device to perform a first task,
send first data associated with the first user input through the wireless communication circuit to an external server,
receive a first response from the external server through the wireless communication circuit, the first response including first information about a plurality of first states having an order for the electronic device to perform the first task,
perform the first task by causing the electronic device to have the plurality of first states having the order after receiving the first response,
receive a second user input through the touchscreen display or the microphone, the second user input including a second request for the electronic device to perform a second task, and
send second data associated with the second user input, along with at least part of the first information, to the external server, through the wireless communication circuit, and
receive a second response from the external server through the wireless communication circuit, the second response including second information about at least part of the first information for the electronic device to perform the second task.

9. The electronic device of claim 8, wherein the second user input includes a request for canceling at least part of the first task performed.

10. The electronic device of claim 9, wherein the instructions, when executed, further instruct the processor to cause the electronic device to return to one of the plurality of first states, based on at least part of the second user input.

11. An electronic device, comprising:
a housing;
a touchscreen display disposed in the housing and exposed through a first portion of the housing;
a microphone disposed in the housing and exposed through a second portion of the housing;
at least one speaker disposed in the housing and exposed through a third portion of the housing;
a wireless communication circuit disposed in the housing;
at least one processor disposed in the housing and electrically connected with the touchscreen display, the microphone, the speaker, and the wireless communication circuit; and
a memory disposed in the housing and electrically connected with the processor, wherein
the memory stores instructions executed to enable the at least one processor to:
control the touchscreen display to display a first screen,
obtain first user speech through the microphone while displaying the first screen,
control the touchscreen display to display a second screen associated with a first task of a plurality of tasks corresponding to the first user speech instead of the first screen,
control the touchscreen display to display a third screen associated with a second task of the plurality of tasks corresponding to the first user speech, instead of the second screen,
obtain a cancellation command to cancel at least one of the plurality of tasks, while displaying the third screen,
identify a task prior in order to the last task among the plurality of tasks based on a result of analyzing the cancellation command,
select the first screen or the second screen associated with the identified task, and
control the touchscreen display to display the selected screen.

12. The electronic device of claim 11, further comprising a hardware button,
wherein the instructions, when executed, cause the processor to obtain the cancellation command through at least one of the hardware button, the microphone, or the touchscreen display.

13. The electronic device of claim 11, wherein the cancellation command includes a request to cancel all of the plurality of tasks, and
wherein the instructions, when executed, instruct the processor to:
cancel all of the plurality of tasks, and
control the touchscreen display to display the first screen.

14. The electronic device of claim 13, wherein the cancellation command further includes a request to perform at least one third task, at least partially different from the plurality of tasks, and
wherein the instructions, when executed, further instruct the processor to:
cancel all of the plurality of tasks,
control the touchscreen display to display the first screen, and
control the touchscreen display to display a fourth screen associated with the at least one third task, instead of the first screen.

15. The electronic device of claim 11, wherein the cancellation command includes a request to canceling at least one of the plurality of tasks, and wherein the instructions, when executed, further instruct the processor to:
cancel the at least one of the plurality of tasks, and
control the touchscreen display to display the second screen.

16. The electronic device of claim 15, wherein the cancellation command further includes a request for performing at least one fourth task, at least partially different from the plurality of tasks, and
wherein the instructions, when executed, further instructs the processor to:
cancel the at least one of the plurality of tasks,
control the touchscreen display to display the second screen, and
control the touchscreen display to display a fifth screen associated with the at least one fourth task, instead of the second screen.

17. The electronic device of claim 15, wherein the cancellation command further includes a request to perform at least one fourth task, at least partially different from the plurality of tasks, and
wherein the instructions, when executed, further instruct the processor to:
cancel the at least one of the plurality of tasks, and
while canceling, display a sixth screen for performing the at least one fourth task.

18. The electronic device of claim 15, wherein the second screen comprises one of:
a screen displayed immediately before the third screen is displayed;
a screen corresponding to a state for inputting an additional user input to perform another task, and
a screen displayed immediately after a used application is varied.

19. The electronic device of claim 11, wherein the instructions, when executed, further instruct the processor to:
send data for the first user speech to an external server through the wireless communication circuit,
receive the plurality of tasks corresponding to the first user speech through the wireless communication circuit,
send data for the cancellation command to the external server through the wireless communication circuit, and
receive the result of analyzing the cancellation command through the wireless communication circuit.

20. The electronic device of claim 11, wherein the instructions, when executed, further instruct the processor to:
perform an automatic speech recognition (ASR) process on data for the first user speech to obtain first text, and
perform a natural language understanding (NLU) process on the first text to obtain the plurality of tasks.

21. An electronic device, comprising:
a housing;
a touchscreen display disposed in the housing and exposed through a first portion of the housing;
a microphone disposed in the housing and exposed through a second portion of the housing;
at least one speaker disposed in the housing and exposed through a third portion of the housing;
a wireless communication circuit disposed in the housing;
at least one processor disposed in the housing and electrically connected with the touchscreen display, the microphone, the speaker, and the wireless communication circuit; and
a memory disposed in the housing and electrically connected with the processor, wherein the memory stores instructions executed to enable the at least one processor to:
control the touchscreen display to display a first screen,
obtain first user speech through the microphone while displaying the first screen,
control the touchscreen display to display a third screen associated with a last task of a plurality of tasks corresponding to the first user speech, instead of the first screen,
obtain a cancellation command to cancel at least one of the plurality of tasks, while displaying the third screen,
identify a task prior in order to the last task among the plurality of tasks based on a result of analyzing the cancellation command,
select the first screen or a second screen associated with the identified task, and
control the touchscreen display to display the selected screen.

* * * * *